United States Patent
Karau et al.

(10) Patent No.: US 6,473,502 B1
(45) Date of Patent: *Oct. 29, 2002

(54) SYSTEM, METHOD AND COMPUTER PROGRAM PRODUCT FOR ACHIEVING LOCAL NUMBER PORTABILITY COSTING AND NETWORK MANAGEMENT SUPPORT

(75) Inventors: John Karau; Greg Usiskin, both of Alpharetta; Anne Turner, Atlanta, all of GA (US); Deborah Bauer, Leesburg, VA (US)

(73) Assignee: Worldcom, Inc., Clinton, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/386,594

(22) Filed: Aug. 31, 1999

(51) Int. Cl.[7] .............................. H04M 3/42; G09G 5/00
(52) U.S. Cl. .............. 379/221.13; 345/700; 379/221.14
(58) Field of Search ................................. 345/700, 762, 345/764; 379/221.13, 221.14, 201.01, 207.02

(56) References Cited

U.S. PATENT DOCUMENTS

| | | |
|---|---|---|
| 5,218,632 A | 6/1993 | Cool |
| 5,325,290 A | 6/1994 | Cauffman et al. |
| 5,333,183 A | 7/1994 | Herbert |
| 5,384,822 A | 1/1995 | Brown et al. |
| 5,546,574 A | 8/1996 | Grosskopf et al. |
| 5,566,235 A | 10/1996 | Hetz |
| 5,606,600 A | 2/1997 | Elliot et al. |
| 5,625,681 A | 4/1997 | Butler, II |
| 5,625,816 A | 4/1997 | Burdick et al. |
| 5,703,939 A | 12/1997 | Bushnell |
| 5,715,303 A | 2/1998 | Marks et al. |
| 5,717,745 A | 2/1998 | Vijay et al. |
| 5,717,749 A | 2/1998 | Sneed, Jr. et al. |
| 5,734,705 A | 3/1998 | Scholossman et al. |
| 5,757,895 A | 5/1998 | Aridas et al. |
| 5,761,272 A | 6/1998 | Williams et al. |
| 5,764,745 A | 6/1998 | Chan et al. |
| 5,765,172 A | 6/1998 | Fox |
| 5,774,532 A | 6/1998 | Gottlieb et al. |
| 5,784,443 A | 7/1998 | Chapman et al. |
| 5,787,147 A | 7/1998 | Gundersen |
| 5,793,861 A | 8/1998 | Haigh |
| 5,809,108 A | 9/1998 | Thompson et al. |
| 5,832,068 A | 11/1998 | Smith .................... 379/114.14 |
| 5,835,497 A | 11/1998 | Litzenberger et al. |
| 5,835,757 A | 11/1998 | Oulid-Aissa et al. |
| 5,854,834 A | 12/1998 | Gottlieb et al. |
| 5,883,948 A | 3/1999 | Dunn |
| 5,896,440 A | 4/1999 | Reed et al. |
| 5,901,215 A | 5/1999 | Dezenno |
| 5,903,632 A | 5/1999 | Brandon |
| 5,910,983 A | 6/1999 | Dezonno et al. |
| 5,912,962 A | 6/1999 | Bosco |
| 5,933,489 A | 8/1999 | Sensabaugh et al. |
| 5,940,492 A | 8/1999 | Galloway et al. |
| 5,949,867 A | 9/1999 | Sonnenberg |
| 5,951,654 A | 9/1999 | Avsan et al. |
| 5,978,464 A | 11/1999 | Sonnenberg |
| 5,987,114 A | 11/1999 | Sonnenberg |
| 6,047,045 A | 4/2000 | Sommers et al. ......... 379/26.01 |
| 6,058,175 A | 5/2000 | Schultz |
| 6,064,887 A | 5/2000 | Kallioniemi et al. |
| 6,067,354 A | 5/2000 | Bauer et al. |
| 6,122,362 A | 9/2000 | Smith et al. ......... 379/221.13 X |
| 6,169,793 B1 | 1/2001 | Godwin et al. ......... 379/221.13 |

FOREIGN PATENT DOCUMENTS

EP      0710042 A2    5/1996    ............ H04Q/3/00

OTHER PUBLICATIONS

Lane, M., Data Communication Software Design,, Boyd & Fraser Publishing Company, 1985, pp 116–117.
Newton, "Newton's Telecom Dictionary," Flatiron Publishing, Inc., 1994, p. 714.

*Primary Examiner*—Harry S. Hong

(57) ABSTRACT

A system, method and computer program product for achieving local number portability (LNP) costing and network management support is disclosed. The disclosure includes a LNP graphical user interface (GUI) implemented as, for example, a WEB or Internet based tool to audit related charges, and to enable users to determine ported number status on a real-time basis.

52 Claims, 51 Drawing Sheets

1.13. SV Screen: Query
1.13.1. Criteria Tab

FIG. 4B 1.14. SV Screen: Query Details 1.14.1. General Tab frmMain

User SPID: 7229

- Maintain SV
- Query
  - Create as Gaining
  - Create as Losing
  - Modify
  - Activate
  - Cancel
  - Cancel Acknowledge
  - Resolve Conflict
  - Disconnect
- View Notifications
- Maintain NPAC Audit
- Maintain NPA-NXX
- Maintain LRN
- Maintain SP
- Security

[New Window] [Logoff]

Subscription Version Details (SOA)

| General | SV History | Additional Info | Partial Failure SP List |

- 360 / 362 / 364 / 366

TN: 6132366604  — 360N
Subscription Version ID: 101  — 360M

Service Provider — 360D
- New SP ID: MCIT  — 360B
- Old SP ID: AT&T  — 360C

New SP Due Date/Time: 1999/04/15 08:49:56  — 360A
Old SP Due Date/Time:  — 360E
LRN: 1231231231  — 360H
Switch CLLI:  — 360I
Ready to Activate: NO  — 360J Region: Western  — 360L
SV Status: Sending  — 360G
Porting to Original: YES  — 360K
Old SP Authorization: NO  — 360F
Remarks: YES  — 360I
LEC NPA-NXX: 613236  — 360O

FIG. 4D 1.14.2. SV History Tab frmMain

User SPID: 7229

- Maintain SV
  - Query
  - Create as Gaining
  - Create as Losing
  - Modify
  - Activate
  - Cancel
  - Cancel Acknowledge
  - Resolve Conflict
  - Disconnect
- View Notifications
- Maintain NPAC Audit
- Maintain NPA-NXX
- Maintain LRN
- Maintain SP
- Security New Window | Logoff

Subscription Version Details (SOA) — 362

| General | SV History | Additional Info | Partial Failure SP List |

| Date/Time — 362A | Activity — 362B |
|---|---|
| 1999/04/15 17:12:27 | Broadcast |
| 1999/04/15 17:12:27 | Modified |
| 1997/01/19 18:15:22 | New SP Creation |
| 1997/01/19 18:15:22 | New SP Cancellation |
| 1997/01/19 18:15:22 | New SP Conflict Resolution |
| 1997/01/19 18:15:22 | Old SP Authorization |
| 1997/01/19 18:15:22 | Old SP Cancellation |
| 1997/01/19 18:15:22 | Old SP Conflict Resolution |
| 1997/01/19 18:15:22 | Activation |
| 1997/01/19 18:15:22 | Conflict |
| 1997/01/19 18:15:22 | Effective Release |
| 1997/01/19 18:15:22 | Disconnect Complete |
| 1997/01/19 18:15:22 | Cancellation |
| 1997/01/19 18:15:22 | Old |
| 1997/01/19 18:15:22 | Old SP Creation |
| 1997/01/19 18:15:22 | Customer Disconnect |

FIG. 4E 1.14.3. Additional Info

FIG. 4F 1.8. SV Screen: Maintain 1.8.1. SV Screen: Create As Gaining Tab frmMain

User SPID: 7229

- Maintain SV
  Query
  Create as Gaining
  Activate
  Modify
  Cancel
  Create as Losing
  Disconnect
  Cancel Acknowledge
  Resolve Conflict
- View Notifications
- Maintain SV Audit
  Maintain NPA-NXX
  Maintain LRN
- Maintain SP
- Security New Window | Logoff

Create As Gaining

Specify:
Telephone Number: 613-236-6600  Through: 6601
Region: Western

Create | Clear

Create As Gaining | Additional

Old BP: MCIT
Customer Name: Customer 1
Billing ID: 999999
Reserved TN: No
Work Order: w1
Service Order: s1
ILEC NPA-NXX: 613236

Port to Original: No
Due Date: 1999/04/12
Switch CLLI: BLTMMDDNDS1
LRN: 6132366600
Remarks: This is a remark

FIG. 4H 1.8.2. SV Screen: Create As Gaining Additional Tab

FIG. 4I 1.8.5.2. Modify as New: Additional Tab frmMain

User SPID: 7228

- Maintain SV
  - Query
  - Create as Gaining
  - Activate
- Modify
  - Cancel
  - Create as Losing
  - Disconnect
  - Cancel Acknowledge
  - Resolve Conflict
- View Notifications
- Maintain SV Audit
- Maintain NPA-NXX
- Maintain LRN
- Maintain SP
- Security

Modify Subscription Version

Specify:
Telephone Number: 6132366604   Through: 6605
Subscription Version Status: Pending
Or:
Subscription Version ID: 1231231231   Region: Western

[Modify]  [Clear]

◉ Modify as New Service Provider   ○ Modify as Old Service Provider

| Modify as New | Additional | — 394 |

GTT Data — 394B
| | CLASS | LIDB | CNAM | ISVM — 394H |
|---|---|---|---|---|
| DPC: | 001.001.001 | 002.002.002 | 003.003.003 | 004.004.004 |
| SSN: | 111 — 394C | 122 — 394E | 133 — 394G | 144 — 394I |
| | 394D | 394F | | |

End User Location — 394J
Value: value       Type: ty — 394K

[Lookup] — 394N

[New Window]
[Logoff]

FIG. 4M

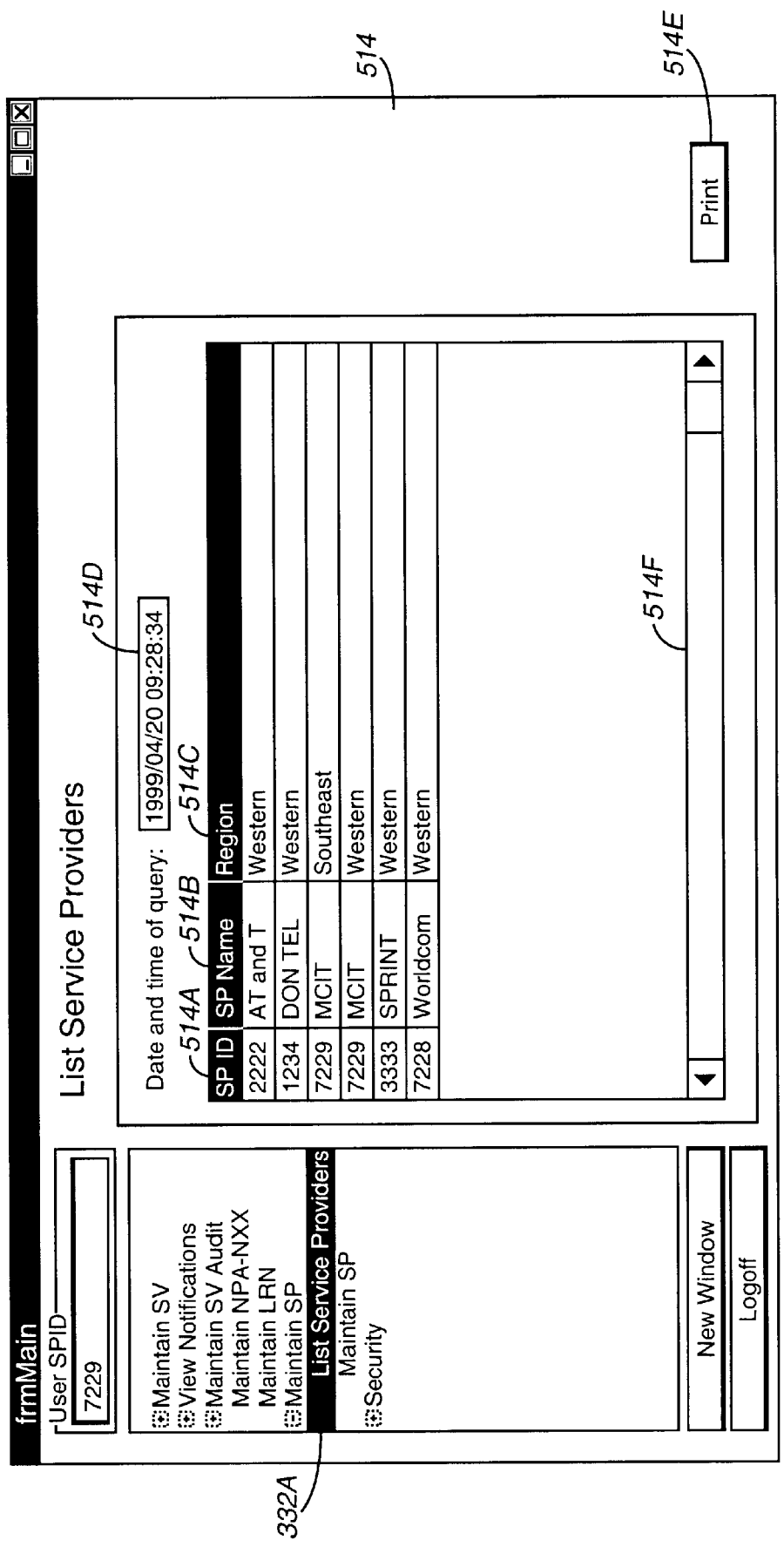

1.7.4. NPA-NXX Screen: Create 1.7.5. LRN Screen: Maintain 1.16.3.2. Discrepancy Report Tab 1.16.3.3. Scope of Audit Tab frmMain

User SPID: 7229

- Maintain SV
- View Notifications
- Maintain SV Audit
- Query Audits
  - Initiate Audit
  - Maintain NPA-NXX
  - Maintain LRN
  - Maintain SP
- Security

Audit Details

Audit ID: _____ 550B — 540D Audit Name:
User ID: _____ 550A   SPID: _____ 550C

550 — Results Report | Discrepancy Report | Scope of Audit

☐ Class  ☐ CNAM  ☐ LIDB  ☐ SVM  ☐ LRN  ☐ All
 550I    550M    550L    550J   550K    550N Telephone Number Range
From: _____ 550E
Through: _____ 550F Activation Date Range
From: _____ 550G
Through: _____ 550H Region: _____ 550O New Window Logoff

FIG. 4AC 1.15.3. Notification Screen: Donor SP Customer Disconnect Date

FIG. 4AF

1.15.5. Notification Screen: New SP Create

FIG. 4AG

1.15.6. Notification Screen: Old SP Concurrence

FIG. 4AH 1.15.7. Notification Screen: Status Change 1.15.7.1 Notification Results Tab 1.15.7.2. Failed SP List Tab frmMain User's Service Provider
7229

⊞ Maintain SV
⊞ View Notifications
　　NPAC Downtime
　　Cancel Acknowledge
　　Customer Disconnect
　　Create Request
　　Concurrence Request
SV Status Change
　　Final Concurrence
　　First Use of NPA-NXX
⊞ Maintain NPAC Audit
　　Maintain NPA-NXX
　　Maintain LRN
⊞ Maintain SP
⊞ Security New Window Logoff Status Change Notification Date/Time Range
From: 1990/04/06 13:02:42
To:   1999/04/09 13:02:42

TN Range
Start: 613-236-6604
End:

Region: Western ▶
SV Status: All ▶

/ 618

| Notification Results | Failed SP List |

SP ID        SP Name 618A          618B

Query    Print    Clear

FIG. 4AJ 1.15.8. Notification Screen: Final Concurrence Window Expiration frmMainFrance

User SPID: 7229

- ⊞ Maintain SV
- ⊟ View Notifications
  - Operational Info
  - Cancel Acknowledge
  - Customer Disconnect
  - Create Request
  - Concurrence Request
  - SV Status Change
  - Final Concurrence
    - First Use of NPA-NXX
- ⊞ Maintain SV Audit
- ⊞ Maintain NPA-NXX
- ⊞ Maintain LRN
- ⊞ Maintain SP
- ⊞ Security New Window | Logoff

Final Concurrence Window Expiration Notification

Date/Time Range
From: 1998/04/06 12:28:21
To: 1999/04/09 12:28:21

TN Range
Start:
End:

Region: Multiple ▼

| Region | Notification Receipt Date/Time | Telephone Number | SV ID |
|---|---|---|---|
| Midwest | 1999/04/01 14:44:52 | 819-669-6736 | 55 |
| Western | 1999/03/30 16:12:37 | 613-728-8200 | 29 |
| Southeast | 1999/03/22 08:34:51 | 418-970-3355 | 74 |
| Western | 1999/03/17 11:09:21 | 613-236-9734 | 44 |
| Midatlantic | 1999/03/11 15:06:11 | 819-246-7835 | 98 |
| Western | 1999/03/02 10:22:04 | 613-236-6604 | 35 |

Query | Print | Clear

FIG. 4AK 1.15.4. Notification Screen: First TN Port For NPA-NXX frmMain

User SPID: 7229

- ⊞ Maintain SV
- ⊞ View Notifications
  - Operational Info
  - Cancel Acknowledge
  - Customer Disconnect
  - Create Request
  - Concurrence Request
  - SV Status Change
  - Final Concurrence
  - First Use of NPA-NXX
- ⊞ Maintain SV Audit
- ⊞ Maintain NPA-NXX
- ⊞ Maintain LRN
- ⊞ Maintain SP
- ⊞ Security First TN Port For NPA-NXX Notification Date/Time Range
From: 1990/04/06 13:03:40
To: 1999/04/09 13:03:40

Region: Multiple ▶

| Region | Notification Receipt Date/Time | NPA-NXX | SP ID | Effective Date/Time |
|---|---|---|---|---|
| Midatlantic | 1999/04/01 00:00:00 | 444444 | SP44 | 1999/04/01 00:00:00 |
| Midwest | 1999/03/01 00:00:00 | 333333 | SP33 | 1999/03/01 00:00:00 |
| Southeast | 1999/02/01 00:00:00 | 222222 | SP22 | 1999/02/01 00:00:00 |
| Western | 1999/01/01 00:00:00 | 111111 | SP11 | 1999/01/01 00:00:00 |

[Query] [Print] [Clear]

[New Window]
[Logoff]

FIG. 4AL 1.5. Security Screen: Create/Query/Maintain User

FIG. 4AO 1.6. Security Screen: Create/Query/Maintain Profile
1.6.1. Security Groups Tab

SYSTEM, METHOD AND COMPUTER PROGRAM PRODUCT FOR ACHIEVING LOCAL NUMBER PORTABILITY COSTING AND NETWORK MANAGEMENT SUPPORT

CROSS-REFERENCES TO RELATED APPLICATIONS

This application is related to U.S. patent application Ser. No. 08/897,906, filed Jul. 21, 1997, and entitled "System and Method for Achieving Local Number Portability," U.S. patent application Ser. No. 09/167,956, filed Oct. 6, 1998, and entitled "A System and Method for Achieving Local Number Portability," U.S. patent application Ser. No. 09/169,466, filed Oct. 9, 1998, and entitled "A System and Method for Achieving Local Number Portability," now U.S. Pat. No. 6,067,354, U.S. patent application Ser. No. 09/169,491, filed Oct. 9, 1998, and entitled "A System and Method for Achieving Local Number Portability," U.S. patent application Ser. No. 09/170,636, filed Oct. 13, 1998, and entitled "A System and Method for Achieving Local Number Portability," U.S. patent application Ser. No. 09/169,081, filed Oct. 9, 1998, and entitled "A System and Method for Achieving Local Number Portability," now U.S. Pat. No. 6,047,045, and U.S. patent application Ser. No. 09/170,635, filed Oct. 13, 1998, and entitled "A System and Method for Achieving Local Number Portability," all of which are incorporated herein by reference. This application is also related to co-pending patent applications U.S. Ser. No. 09/386,874, entitled "System, Method And Computer Program Product For Achieving Local Number Portability Network Management Support", and U.S. Ser. No. 09/386,595, entitled "System, Method And Computer Program Product For Achieving Local Number Portability Costing Support", both filed concurrently herewith (Aug. 31, 1999), and both incorporated herein by reference.

BACKGROUND OF THE INVENTION

1. Field of the Invention

The present invention relates generally to the field of telecommunications and more specifically to a method, system and computer program product for local number portability costing and network management support.

2. Discussion of the Background

Without limiting the invention, its background is described in connection with local telephone services and providers of such services. In addition, provided herein, for convenience, at Appendix I is a glossary of terms of art and acronyms used throughout this disclosure.

In general, the telecommunications industry has evolved into a highly competitive and sophisticated network of equipment manufacturers and service providers. Since the early 1980s, the industry has seen a shift from pure analog techniques useful for transmitting signals over copper wire to digital techniques useful for transmitting signals over optical fiber. Today, customers can choose from a large array of consumer telecommunications services including local and long distance calling, 800 and 900 calling accounts, TCP/IP (i.e., the "Internet" or world wide web "WEB") and others.

Typically, a telecommunications customer obtains access to such services by establishing an account with a service provider. The service provider, in turn, will assign to the customer a telephone number for inbound calls or provide the customer with a dial-up number for outbound calls. For example, the number can be the local telephone number where the customer can be reached such as a home or business. The number can also be the local dial-in to an automated system for a switched connection to a network element such as a domain server. Other examples include, but are not limited to, a customer's facsimile machine, cell phone number or voice mail.

At the same time industry deregulation has brought about the entry of multiple service providers within single geographic regions. In addition to competition, the number and variety of telecommunications services continues to increase. Typically, a category of service is tied to a single unique number so that any one customer may require a host of numbers to accommodate a host of services. Thus, a common situation has evolved wherein a single customer will have a home number, an office number, a facsimile machine number, a cell phone number, an Internet account number and possibly others.

Today's service providers employ advanced information technology systems using sophisticated equipment such as routers, switches and digital cross-connects. At a minimum, the equipment must be configured to ensure calls reach their destination regardless of the service provider. While standards and communications protocols have been adopted by the industry, cooperation amongst service providers has been critical to implementing a reliable network. Today, a customer can place a clear noise free call from almost anywhere in the world.

The Public Switched Telephone Network (PSTN) comprises the telecommunications backbone for most voice/data traffic in the world. For most local and long distance telephone calls a local telephone company acts as a local entry point to the PSTN. Typically, a Local Routing Number (LRN) is used to route the call from a point of origination to a point of destination on the PSTN. This is true regardless of who is servicing the call at either point.

This infrastructure, however, does not always accommodate a change in the service needs of an end customer. For example, often a customer desires to switch service providers to take advantage of a more attractive rate plan. The problem lies in that the customer is not guaranteed to maintain the same local number even if the customer remains at the same location. Thus, until recently, there was no way to port a customer's number from one service provider to another within the same local region.

In short, as competition for communications services has grown so has the value attached to a customer's telephone number. At present, call routing is based on a number associated with the switch used to handle the local call. Moreover, service providers have not developed a means for reliable call routing when a switch from one provider to another is made. Previously, the only solution was to assign a new telephone number not already in use by another customer.

While long distance carriers have enacted portability solutions on a regional or even national basis for certain classes of services, such as 800 and 900 accounts, the local portability problem has not, until the present invention, been squarely addressed. Moreover, prior art efforts at local number portability have not been widespread. For example, an industry task force was formed, pursuant to the Illinois Commerce Commission Order on Customers First Plan (Docket 94-0096 dated Apr. 7, 1995), to develop a permanent number portability solution for Illinois. While the task force made progress in defining the problem and resolving certain issues related to implementing local number portability, it did not resolve the problem on a nationwide basis. Nor did the commission establish the hardware and software interfaces required to implement a nationwide portability solution.

Systems for achieving local number portability on a nationwide basis and for allowing sharing a single telephone number over different local exchange carriers are disclosed, for example, in U.S. patent application Ser. No. 08/897,906, filed Jul. 21, 1997, and entitled "System and Method for Achieving Local Number Portability," and the other cross-referenced applications indicated above as being related to the present application.

Local number portability typically requires use of an external entity, the Number Portability Subscription Manager (NPSM), to handle the porting of local telephone numbers between Competitive Local Exchange Carriers (CLECs).

However, use of the NPSM service typically requires (i) payment for transactions which are typically billed monthly, and (ii) monitoring user (e.g., telecommunications service provider) and NPSM activity to insure that the user's network traffic successfully completes. In addition, it is desirable to monitor user (e.g., telecommunications service provider), competitor and NPSM activity to insure that the user can more fully address the local number porting market opportunity. In addition, current user interfaces fail to combine full functionality, ease of use, and Year 2000 (Y2K) compliance.

SUMMARY OF THE INVENTION

Accordingly, an object of this invention is to provide a novel method, system and computer program product for providing local number portability costing and network management support.

It is a further object of this invention to provide a novel method, system and computer program product for a WEB or Internet based tool for auditing local number portability charges.

It is a further object of this invention to provide a novel method, system and computer program product for a WEB or Internet based tool for network management support.

The above and other objects are achieved according to the present invention by providing a novel process, system and computer readable medium for interfacing to a local number portability (LNP) network, including coupling a graphical user interface (GUI) to an engine interface via a communications link; transmitting data, via the engine interface, from the LNP network to the GUI via the communications link and transmitting data received from the GUI to the LNP network; providing screen displays to a user, via the GUI, for performing LNP network maintenance functions including at least one of maintaining a service provider (SP), maintaining a numbering plan area-telephone number exchange (NPA-NXX), and maintaining local routing number (LRN); and providing screen displays to a user, via the GUI, for performing LNP subscription version (SV) maintenance functions including at least one of creating as a gaining SV, creating as a losing SV, activating a SV, modifying a SV, cancelling a SV, disconnecting a SV, acknowledging cancellation of a SV, resolving a conflict with a SV, and querying a SV.

In another aspect of the present invention, there is provided a novel process, system and computer readable medium for interfacing to a local number portability (LNP) network, including coupling a graphical user interface (GUI) to an engine interface via a communications link; transmitting, via the engine interface, data from the LNP network to the GUI via the communications link and transmitting data received from the GUI to the LNP network; providing screen displays to a user, via the GUI, for performing reconciling with a number portability administration center (NPAC) functions including at least one of initiating a NPAC audit, and querying a NPAC audit; and providing screen displays to a user, via the GUI, for performing viewing of LNP notifications functions including at least one of viewing operational information notifications, viewing cancellation acknowledge notifications, viewing customer disconnect notifications, viewing create request notifications, viewing concurrence request notifications, viewing subscription version (SV) status change notifications, viewing final concurrence notifications, and viewing a first use of numbering plan area-telephone number exchange (NPA-NXX) notifications.

In another aspect of the present invention, there is provided a novel process, system and computer readable medium for interfacing to a local number portability (LNP) network, including coupling a graphical user interface (GUI) to a engine interface via a communications link; transmitting data, via the engine interface, from the LNP network to the GUI via the communications link and transmitting data received from the GUI to the LNP network; providing screen displays to a user, via the GUI, for performing LNP network maintenance functions including at least one of maintaining a service provider (SP), maintaining a numbering plan area-telephone number exchange (NPA-NXX), and maintaining local routing number (LRN); providing screen displays to a user, via the GUI, for performing LNP subscription version (SV)maintenance functions including at least one of creating as a gaining SV, creating as a losing SV, activating a SV, modifying a SV, cancelling a SV, disconnecting a SV, acknowledging cancellation of a SV, resolving a conflict with a SV, and querying a SV; providing screen displays to a user, via the GUI, for performing reconciling with a number portability administration center (NPAC) functions including at least one of initiating a NPAC audit, and querying a NPAC audit; and providing screen displays to a user, via the GUI, for performing viewing of LNP notifications functions including at least one of viewing operational information notifications, viewing cancellation acknowledge notifications, viewing customer disconnect notifications, viewing create request notifications, viewing concurrence request notifications, viewing SV status change notifications, viewing final concurrence notifications, and viewing a first use of numbering plan area-telephone number exchange (NPA-NXX) notifications.

The present invention provides a hardware and software platform to effect local number portability costing or charge auditing and network management support. The systems and subsystems of the invention are designed to communicate with a Number Portability Administration Subscription Manager (NPSM).

In addition, the systems and subsystems of the invention are designed to communicate with a Service Order Administration (SOA) engine which is later described. The above and other functions are performed by a Local Number Portability (LNP) Graphical User Interface (GUI) to upstream users (e.g., telecommunications service providers), according to the present invention.

With respect to local number portability costing support, the LNP GUI is structured as, for example, a WEB or Internet based tool to audit related charges. Users can quickly determine potential liability by accessing LNP GUI screens that detail porting activity. The information is updated on a real-time basis to insure accurate pricing and forecasting. In this way, accuracy of Number Portability Administration Center (NPAC) charges can be easily determined. The NPAC receives and stores updated customer routing information and makes it available to participating service providers. The NPAC contains a record of all ported numbers and a history file of all transactions relating to the porting of a number. The above-noted LNP GUI costing support dramatically reduces the amount of time necessary to audit invoices and simplifies the dispute process. Additionally, the LNP GUI costing support can be of use to other companies in monitoring and auditing NPAC expenses.

With respect to local number portability network management support, the LNP GUI is structured as, for example, a WEB or Internet based tool to enable, for example, the National Network Management Center (NNMC) to determine ported number status on a real-time basis. The NNMC can quickly determine potential call completion risks by accessing LNP GUI screens that detail, for example, telecommunications service providers' porting activity. The information is updated on a real-time basis to insure accurate analysis and trouble shooting. In this way, NNMC staff can easily determine call completion exposures to, for example, telecommunications service providers' customers. This dramatically reduces the amount of time necessary to perform porting network audits and simplifies the customer support resolution process. Additionally, the LNP GUI can be of use to external companies in monitoring and trouble shooting network outages associated with local number porting activities.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Throughout the following description, the terms "interface", "line", "lines", "link", "communications link", "inbound link" and/or "outbound link" can mean a channel, signal pathway, data path, circuit, or other similar mechanism whether physical, virtual or logical, which can be used for the transfer and communication of data by system applications and programs, whether external or internal. The terms "outbound link" and "inbound link" can also mean "pipes" in the context of the Oracle database structure and associated protocols, or "sockets" in the context of the UNIX operating system structure and associated protocols. The term "database" refers to a file of records having fields together with a set of operations on the records. Such conventions are well known to those skilled in the art.

Figure 1A:
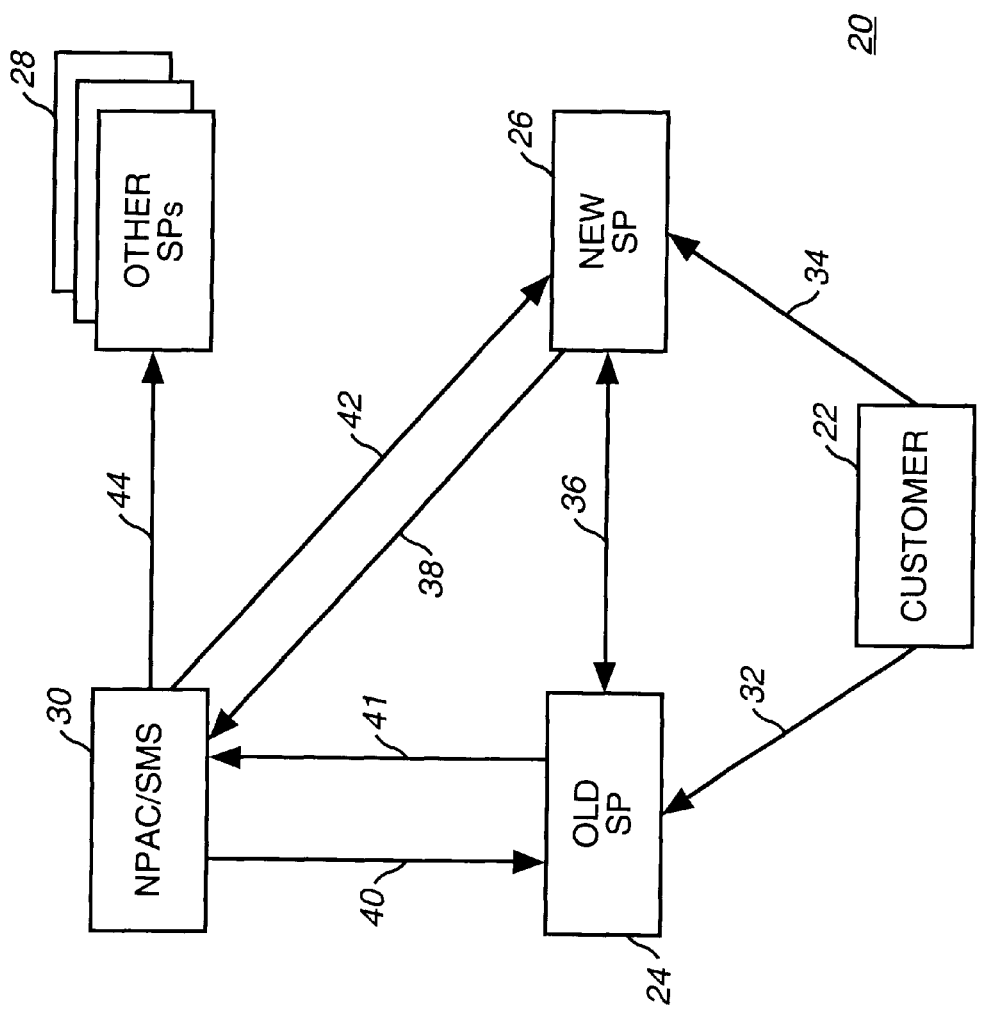
FIG. 1A is an overall process flow diagram for transferring a customer's port data from an old service provider to a new service provider.
Figure 1B:
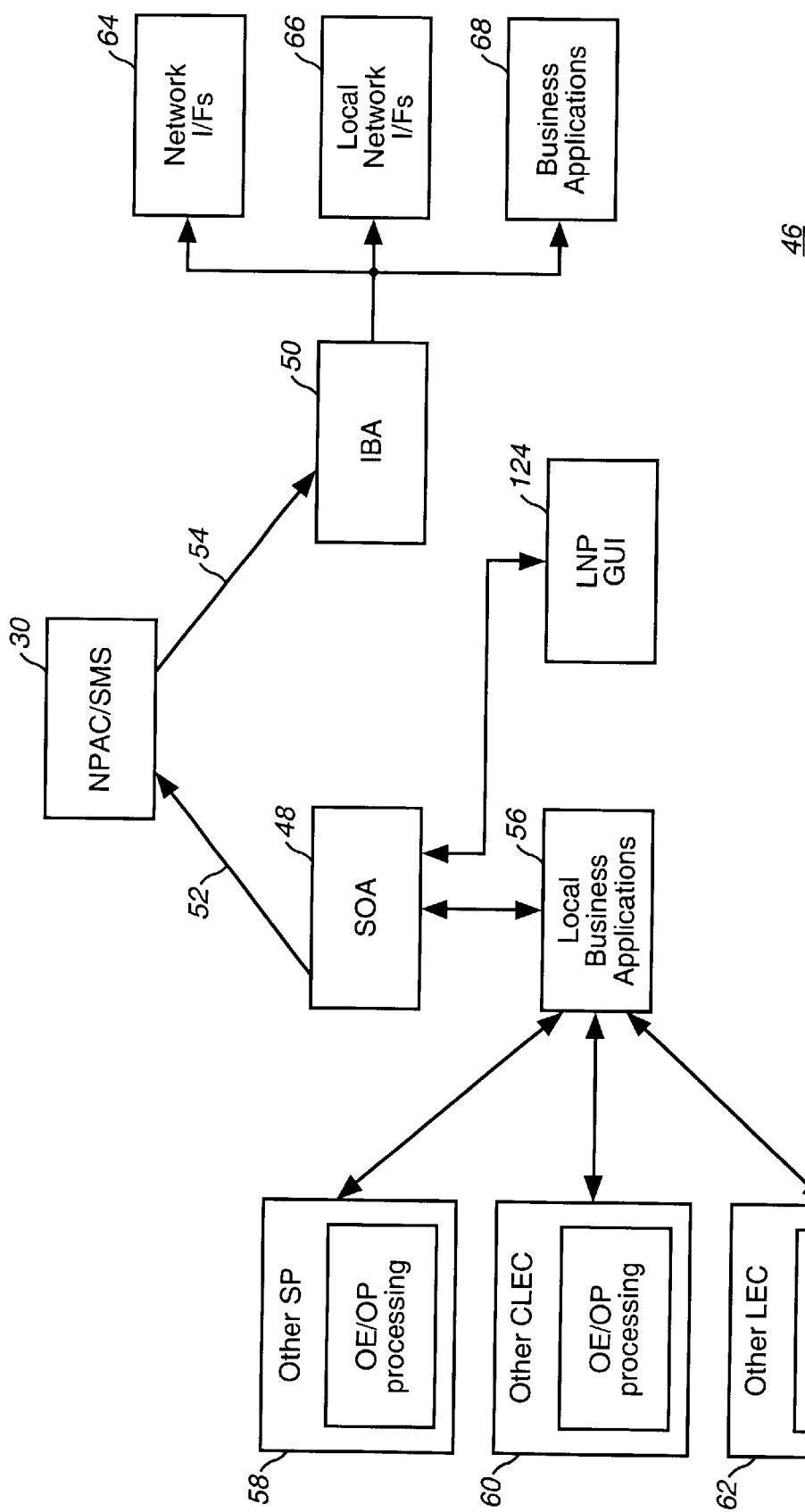
FIG. 1B is a high level block diagram for an interface between a Service Order Administration (SOA), an Interface Broadcast Agent (IBA) and a regional number portability administration center.
Figure 1C:
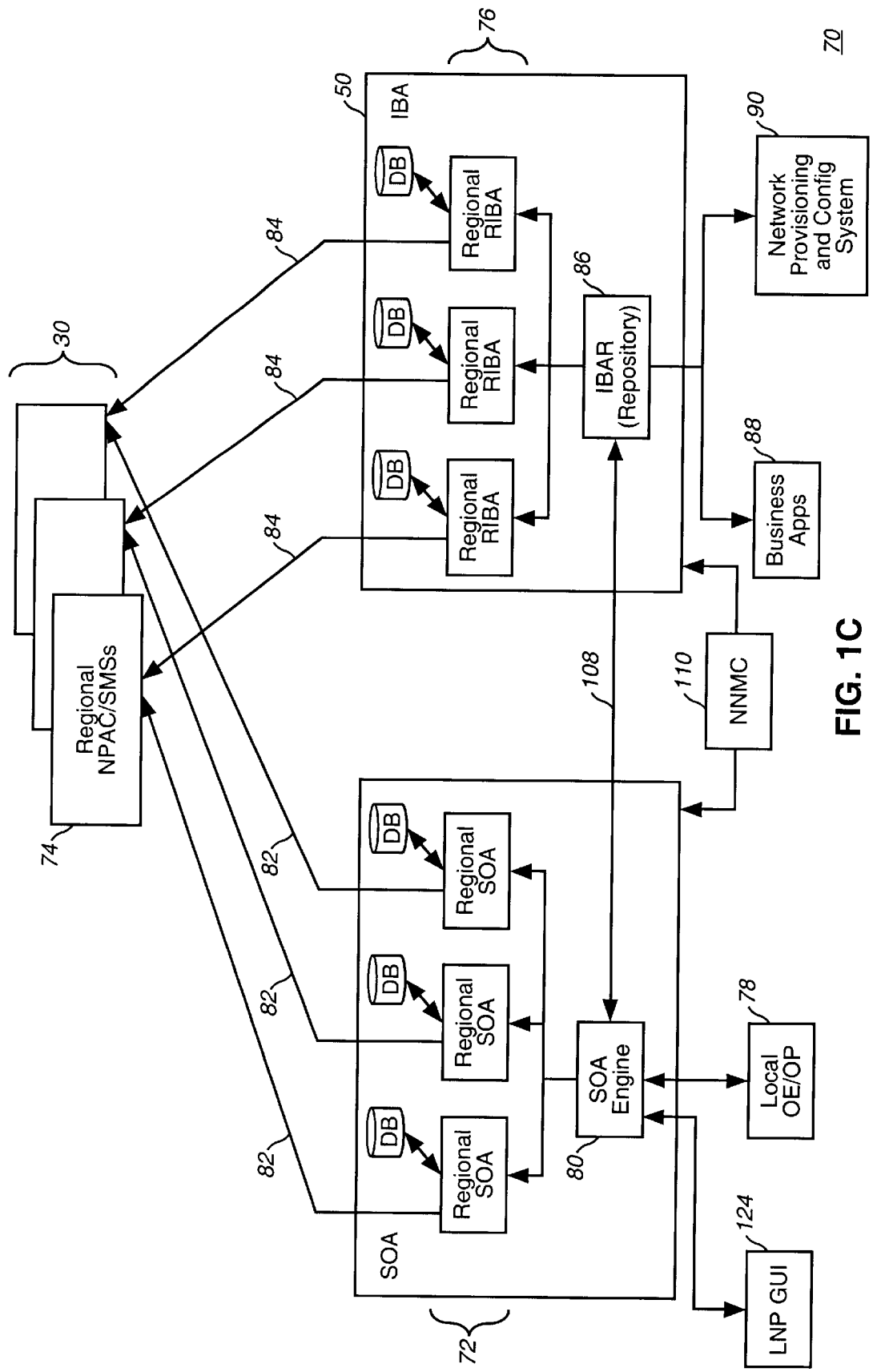
FIG. 1C is a block diagram of the novel SOA and IBA Subsystems and their interface to various business applications.

Referring now to the drawings, wherein like reference numerals designate identical or corresponding parts throughout the several views, and more particularly to FIG. 1A thereof, there is illustrated a flow diagram of a telephone number porting process, denoted generally as 20. FIGS. 1A–1C and the accompanying discussion briefly describes the overall system in which the present invention is implemented. For a detailed discussion of the overall system see, for example, U.S. patent application Ser. No. 09/170,635, filed Oct. 13, 1998, and entitled "A System and Method for Achieving Local Number Portability" and the other cross-referenced applications mentioned above.

In general, the telephone number porting process 20, which achieves Local Number Portability (LNP), is used by a customer 22 to port or transfer his or her telephone number from an old service provider 24 to a new service provider 26. The customer 22 initiates the telephone number porting process 20 by submitting a port request to either the old service provider 24 as denoted by line 32, or the new service provider 26 as denoted by line 34, to arrange the port or transfer of the customer's telephone number from the old service provider 24 to the new service provider 26. The port request may include a due date for the port transfer. Thereafter, the old service provider 24 and new service provider 26 arrange the port details for the customer's telephone number as denoted by line 36. The port details may include the due date for the port transfer.

Once the new service provider 26 obtains the customer's port request, the new service provider 26 notifies a Number Portability Administration Center and Service Management System (NPAC/SMS) 30, which maintains a centralized regional number database for all customers in a given region, of the pending port or transfer, as denoted by line 38. Alternatively, the old service provider 24 can notify the NPAC/SMS 30 of the pending port, as denoted by line 41.

When the NPAC/SMS 30 receives a notification of a pending port or transfer, it performs certain validation checks and procedures. The NPAC/SMS 30 determines if it has received a notification from both of the involved service providers. If the NPAC/SMS 30 only received a notification from one of the involved service providers, either the old service provider 24 or the new service provider 26, the NPAC/SMS 30 will notify the service provider that failed to send a notification that the NPAC/SMS 30 is expecting such a notification. If the NPAC/SMS 30 receives the missing notification and the notifications from the two service providers 24 and 26 indicate agreement, the NPAC/SMS 30 activates the port of the customer's telephone number when the new service provider due date is reached or when the new service provider 26 sends an activation notice to the NPAC/SMS 30.

The NPAC/SMS 30 activates the port of the customer's telephone number by sending the new port data to the old service provider 24, as denoted by line 40, to the new service provider 26, as denoted by line 42, and to all other service providers 28, as denoted by line 44. This ensures proper call routing to the customer because all the service providers in the region 24, 26, and 28 can update their networking equipment accordingly.

If, during the validation process described above, the old service provider 24 failed to respond to the notification of the pending port, the NPAC/SMS 30 will log the failure to respond and allow the new service provider 26 to proceed with the port when the due date is reached. On the other hand, if it was the new service provider 26 that failed to respond, the NPAC/SMS 30 will log the failure to respond, cancel the notification and notify both service providers 24 and 26 of the cancellation. If there is any disagreement among any of the service providers 24, 26 or 28 as to who will provide the new service to the customer 22, the NPAC/SMS 30 will place the notification in a "conflict" state and notify the conflicting service providers 24, 26 or 28 of the conflict status. The conflicting service providers 24, 26 or 28 will determine who will serve the customer 22 using appropriate internal conflict resolution procedures. If the conflict is resolved, the NPAC/SMS 30 will remove the notification from the "conflict" status once it is notified of the resolution after which the port process proceeds as described above. Alternatively, the new service provider 26 can cancel the port request.

Turning now to FIG. 1B, a block diagram of a system for achieving local number portability is shown and denoted generally as 46. The NPAC/SMS 30 is communicably linked to two functional subsystems, a Service Order Administration (SOA) Subsystem 48 and an Interface Broadcast Agent (IBA) Subsystem 50 via communication interfaces 52 and 54, respectively.

The SOA Subsystem 48 is the application responsible for sending the customer's port data from one service provider to another service provider. Likewise, the IBA Subsystem 50 is the application responsible for receiving, processing, storing and transmitting customer port data to the local networks. The SOA 48 and IBA 50 Subsystems work together with the NPAC/SMS 30 to send and receive customer porting data from regional call routing centers and data sources to more centralized information sources and applications. This configuration 46 provides a distributed architecture that allows the porting of data to the local applications and networking equipment maintained by service providers for appropriate call routing and processing.

The SOA Subsystem 48 is communicably linked to one or more local applications 56, which are maintained by the local service provider. Examples of the local applications 56 include, but are not limited to, residential and business lines for voice, data and fax communications. The local applications 56, in turn, are communicably linked and used by the customer Order Entry and Order Processing (OE/OP) systems of other service providers 58, other Complex Local Exchange Carriers (CLEC) 60, and other Local Exchange Carriers (LEC) 62, depending on the existing network of service providers. The SOA Subsystem 48 acts as an intermediary between the local applications 56 and the NPAC/SMS 30, thus providing a smooth non-intrusive solution for local number portability. The Local Number Portability Graphical User Interface (LNP GUI) 124, as will be later described, provides a novel user interface to the SOA Subsystem 48.

Likewise, the IBA Subsystem 50 provides the interface between the regional NPAC/SMS 30 and a plurality of other network entry systems 64, 66 and 68. The specific functionality of the network entry systems 64, 66 and 68 may vary, but in general, they form a platform for receiving, storing, and routing customer port data. Examples of services that use the port data include local and long distance networks and 800 services.

For example, business applications 68 can comprise a database of records for all provider systems needing access to the customer porting data, such as the Automatic Number Identifier (ANI) reference information system. The local network interfaces 66 can be an intelligent network architecture that supports routing queries during call processing. The network interface 64 can include the Metro Intelligent Network Architecture, which is sold by Northern Telecom, that forms a tie-in into available communications services. Such services may include an 800 or 900 service or other similar offerings that may require access to the port data through a regional toll switch network from the NPAC/SMS 30 for correct call servicing and routing.

Turning now to FIG. 1C, the interaction between the NPAC/SMS 30, the SOA Subsystem 48 and the IBA Subsystem 50 will be described. The Local Number Portability System of FIG. 1C is denoted generally as 70. Local Customer Order Entry and Order Processing (OE/OP) Systems (collectively referred to as the "Front End") 78 send and receive LNP transactions or messages to and from a local SOA Engine 80. The SOA Engine 80 is an interface that routes the LNP transactions or messages to their appropriate destinations, such as the Regional SOA Subsystems 72 located in various parts of the country. The SOA Engine 80 also routes database queries to the Regional Interface Broadcast Agent (RIBA) 76 and Interface Broadcast Agent Repository (IBAR) 86 Subsystems. The Regional SOA 72 and SOA Engine 80 Subsystems form the SOA Subsystem 48, which provides the means for submitting customer service order changes to the Regional NPAC/SMSs 74. The LNP GUI 124, as will be later described, provides a novel user interface to the SOA Engine 80.

Each Regional SOA Subsystem 72 is connected to a corresponding Regional NPAC/SMS 74 by communication interface 82, and all of the Regional NPAC/SMSs 74 form the NPAC/SMS 30. Similarly, each Regional NPAC/SMS 74 is connected to a corresponding RIBA Subsystem 76 by communication interface 84. Communication interfaces 82 and 84 conform to recognized industry standards, such as the North American Council Functional Requirements Specifications and the "NPAC/SMS Interoperable Interface Specification" by Lockheed Martin IMS Corporation. Communication interface 82 utilizes a Common Management Interface Protocol (CMIP) and communication interface 84 utilizes both CMIP and File Transfer Protocols (FTP).

Preferably some method of access control is provided to manage security issues that arise from communications between the SOA 72 and RIBA 76 Subsystems and the NPAC/SMS 74. An access control field is included in messages flowing between the SOA 72 and RIBA 76 Subsystems and the NPAC/SMS 74 and carries a digital signature.

The NPAC/SMS 30 then relays the port data in a predefined message format to the IBA Subsystem 50 through interfaces 84. Like the SOA Subsystem 48, the IBA Subsystem 50 comprises a plurality of Regional IBA Subsystems 76 that update a single IBAR Subsystem 86. As shown in FIG. 1C, the IBAR Subsystem 86 is accessible by a plurality of downstream applications, such as business applications 88, and network provisioning and configuration systems 90.

FIG. 1C also shows a National Network Management Center (NNMC) 110. The NNMC 110 is a stand-alone subsystem designed for basic querying of database information on the SOA 48 and IBA 50 Subsystems. Accordingly, the NNMC 110 is connected through communication interfaces to the various databases in the LNP System 70: the SOA Engine Subsystem 80; the SOA Subsystem 72; and the IBAR Subsystem 86.

While FIG. 1C depicts the use of three (3) Regional SOA Subsystems 72, three (3) Regional NPAC/SMSs 74, and three (3) Regional IBA Subsystems 76, each region providing local number portability, regardless of number, will have a corresponding SOA Subsystem 72, NPAC/SMS 74 and Regional IBA Subsystem 76.

Figure 1D:
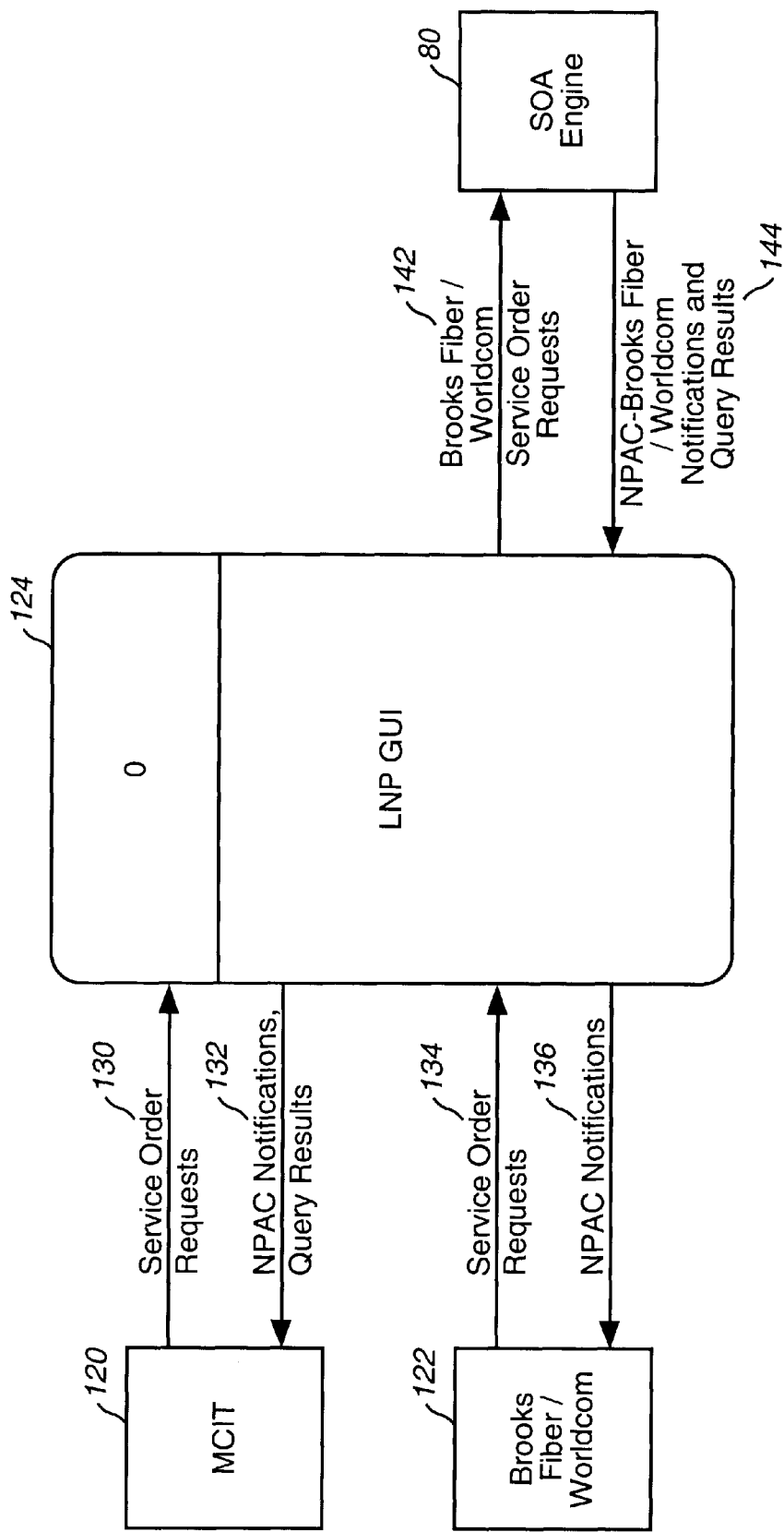
FIG. 1D is a high level external context diagram for the novel Local Number Portability Graphical User Interface (LNP GUI) between, for example, a first telecommunications service provider, and a second telecommunications service provider and a SOA engine according to the present invention.

Turning now to FIG. 1D, there is illustrated a high level external context diagram for the novel LNP GUI 124 between, for example, a first telecommunications service provider (MCIT) 120 and a second telecommunications service provider (BF/W) 122 and the SOA engine 80 according to the present invention. The LNP GUI 124 solves problems with current user interfaces into the SOA engine 80 and the IBAR 86, while combining the full functionality, ease of use, and Year 2000 compliance. The LNP GUI 124 was developed using state of the art development tools, which leverage the transportability of, for example, Java™ to create a rapid deployment, three-tier solution.

Since the architecture three-tiered, at the first tier, the user can access the LNP GUI 124 application through, for example, their favorite web browser, or bypass the web browser entirely. The middle tier, for example, comprises the application server and web server. The third tier is assumed to host, for example, an Oracle Relational Database Management System (DBMS).

The LNP GUI 124 application is, for example, an applet, which is downloaded automatically one time and cached until, for example, a new version of the LNP GUI 124 application is released. The LNP GUI 124 application implemented as, for example, a Java™ applet provides better handling of buffered database rows and navigation, without the time-consuming and annoying screen repaints typically found in HTML/CGI solutions. In addition, the LNP GUI 124 application's operational speed and rich features overshadow the applet's brief initialization delay.

Figure 4A:
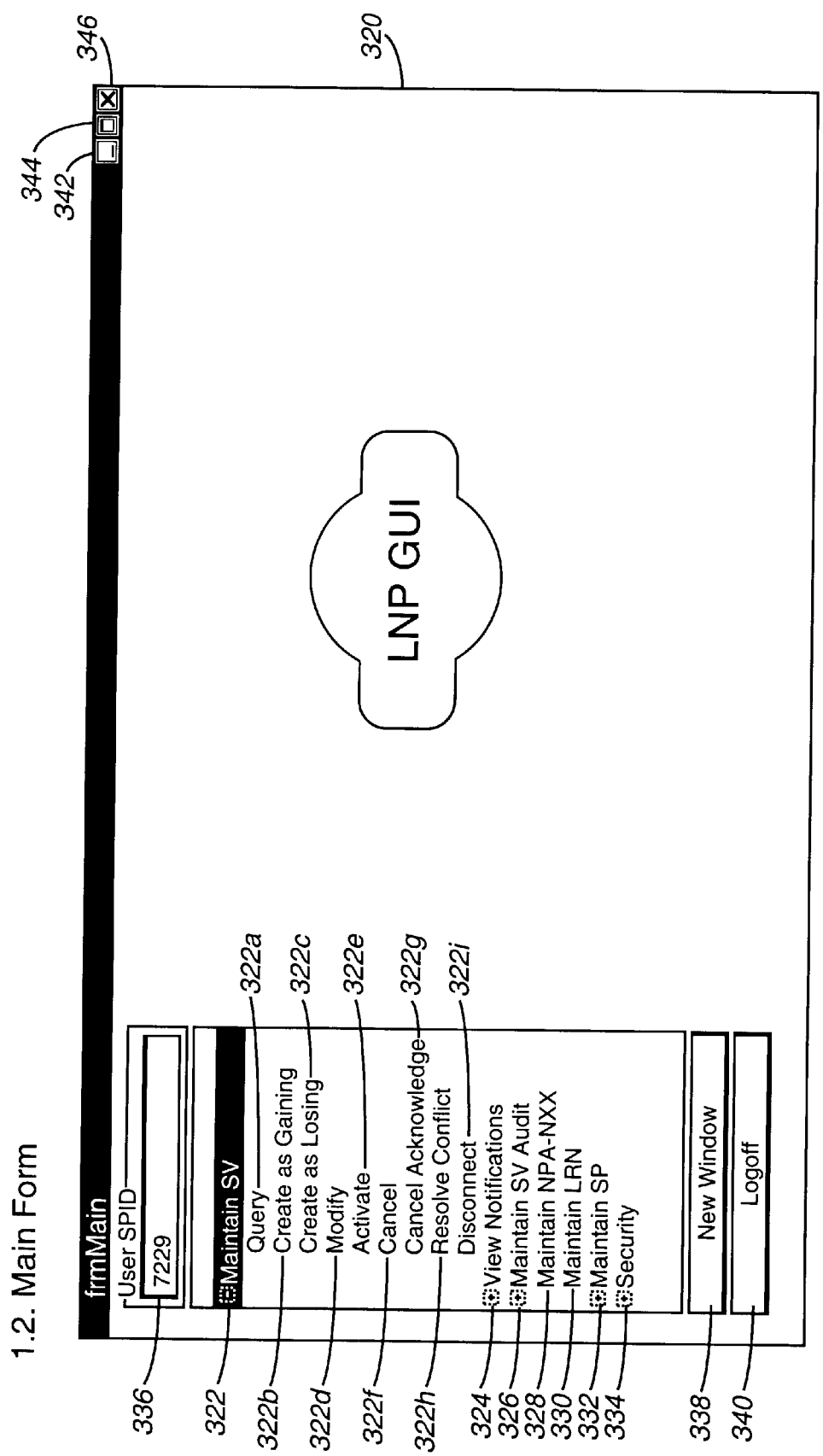
FIGS. 4A–4AQ are screen shots of the LNP GUI according to the present invention.

The middle tier logic is also written in, for example, Java™, but without the complexities of maintaining straight Java™ (or C++) code. The development tool and deployment platform is, for example, SilverStream™. Unlike a simple Java™ IDE, Silverstream™ is a complete solution that address the concerns of corporate IT, including failover and load-balancing. Exemplary LNP GUI 124 screen captures are illustrated in FIGS. 4A–4AQ as will be later described.

The following discussion introduces the context of the LNP GUI 124 and describes the business functions and system participants. The external context diagram of FIG. 1D, for example, is intended to identify external relationships that are supported by the LNP GUI 124. Each of the external entities and their relationships to the LNP GUI 124 will now be described.

The LNP GUI 124 will be used, for example, by three service providers: a first telecommunications service provider (MCIT) 120, and a second telecommunications service provider (BF/W) 122. MCIT 120 personnel will use some of the functions provided by the LNP GUI 124 to perform, for example, functions not currently available through an existing Activation Manager GUI. MCIT 120 personnel will, for example, use the Maintain SV functions of the LNP GUI 124 on an exception basis and all other functions on a regular basis. BF/W 122 personnel will, for example, use all LNP GUI 124 functions on a regular basis.

MCIT 120 Personnel

There are multiple user groups within the MCIT 120 community of users, for example: Local Initiatives (LI) Administration Operations (L1 Admin Ops), Order Coordination (OC), Order Entry (OE), Regional Operations Centers (ROCs)—Field Operations, and the Local Help Desk.

The LI Admin Ops user group is responsible for production operations support of the data in the IBA 50/SOA 48/NPSM systems. From the point at which LNP data enters the first telecommunications service provider's Order Entry (OE) group's Service Request Management System (SRMS), through the SOA 48 system to NPAC 30 to the IBA 50 system and ultimately to the first telecommunications service provider's switch network distribution point (e.g., INCP Data Access Point (DAP)), the LI Admin Ops group is responsible for providing up-to-the-minute status information for porting customer records, and for responding as required to ensure the proper flow of data through the NPAC 30 and IBA 50/SOA 48/NPSM systems.

The OC user group is responsible for the coordination of all activities involved with the installation or disconnect of service for first telecommunications service provider's customers. For LNP orders, currently this group has the ultimate responsibility for monitoring the automated flow of NPAC 30-required data through the automated NPSM feed. When this is not possible due to system outages or the current NPAC 30 restrictions of activating large Telephone Number (TN) ranges, the OC group manually enters the NPAC 30-required data through a GUI which feeds the SOA Engine 80. However, the GUI is not Year 2000 (Y2K)-compliant, hence an alternative means of manually feeding LNP data to NPAC 30 is provided by the LNP GUI 124.

The OE user group is responsible for entering LNP orders and is part of the overall order process.

The ROCs ire responsible for the actual cut-over of LNP orders. The ROCs use a GUI to activate TNs in the event the orders do not process through the Local Service Activity Tracker (LSAT) automated system. Additionally, the ROC personnel use the GUI to do Create As Gainings (CAGs) and other functions, such as "modify create" or "modify activates" when necessary. They frequently use the GUI to view the order status in the system.

The Local Help Desk provides hardware and software support for all local systems. All trouble tickets and questions for LNP orders route through this group.

BF/W 122 Personnel

The BF/W 122 community of users, for example, comprises the LNP Translations user group which is responsible for passing fWCOM and fBrooks LNP orders from the legacy WCOM Activation Manager (AM) system through the SOA 48 to the NPAC 30 systems. Previously, the fbrooks orders were being entered through the a GUI to fbrooks-specific regional SOAs 72 to NPAC 74, while fWCOM orders were being entered through the ESI SOA 72 system to NPAC 74.

Currently, both systems downstream feeds flow from NPAC into an ESI LSMS system which feeds the fWCOM/Brooks switch network via a Lucent Service Management System/Service Control Point (SMS/SCP), to be integrated into the first telecommunications service provider's IBA and INCP DAP systems. The second telecommunications service provider's LNP Translations requires a manual means of transmitting LNP orders to NPAC 30 that offers equal or superior functionality to that currently offered by the ESI SOA 72 system. Current plans are to automate the flow of LNP orders from the Activation Manager (AM) to NPAC 30 via a SOA Automation Adapter (SAA), targeted for future implementation, at which point the LNP GUI 124 will become primarily a back-up manual means of data transmission to NPAC 30.

In FIG. 1D, the LNP GUI 124 receives service order requests 130 from and transmits NPAC notifications and query results 132 to, for example, the MCIT 120. In the same way, the LNP GUI 124 receives service order requests 134 from and transmits NPAC notifications and query results 136 to, for example, the BF/W 122. Similarly, the LNP GUI 124 transmits the service order requests 142 to and receives the NPAC notifications and query results 144 from, for example, the SOA engine 80. It is noted that although the preferred embodiment of the LNP GUI 124 is described in terms of providing an interface between the MCIT 120 users, the BF/W 122 users and the SOA engine 80, the LNP GUI 124 may be used as an interface between other users and systems as will be apparent to those skilled in the computer arts.

Figure 2A:
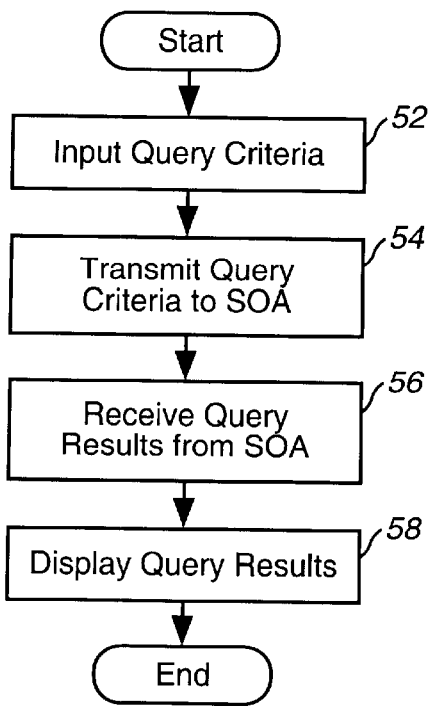
FIGS. 2A–2B are top level flow charts for various novel processes for the LNP GUI according to the present invention.

Turning now to FIG. 2A, there is illustrated a top level flow chart for various novel processes for the LNP GUI 124, such as querying Service Providers (SPs), LRNs, Numbering Plan Area-Telephone Number Exchanges (NPA-NXXs), Subscription Versions (SVs), Audit Status, etc., according to the present invention, as will be later described. In FIG. 2A, at step S2 the LNP GUI 124 inputs query criteria from the user. At step S4 the query criteria is transmitted to the SOA engine 80. The SOA engine 80 then transmits the query results which are received by the LNP GUI at step S6. At step S8 the LNP GUI 124 displays the query results completing the query operation.

Figure 2B:
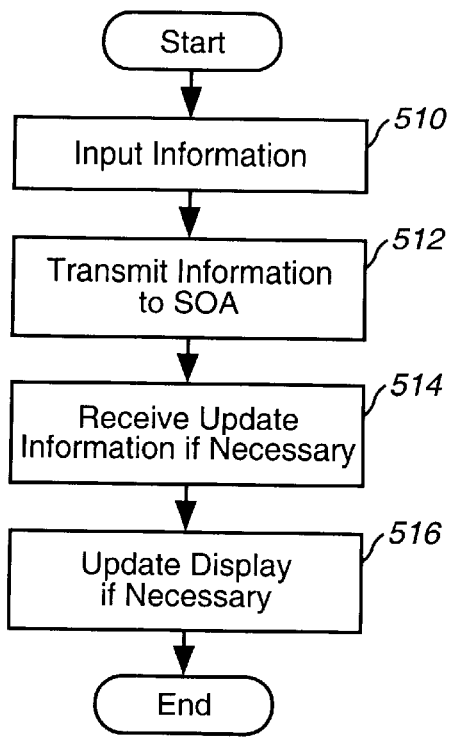

Turning now to FIG. 2B, there is illustrated a top level flow chart for various other novel processes for the LNP GUI 124, such as maintaining Service Providers, LRNs, NPA-NXXs, viewing Notifications, audit details, etc., according to the present invention, as will be later described. In FIG. 2B, at step S10 the LNP GUI 124 inputs information from the user regarding the above-noted processes. At step S12 the information is transmitted to the SOA engine 80. The SOA engine 80 then transmits the update information, such as Network information, SP information, etc., if necessary, which is received by the LNP GUI at step S14. At step S16 the LNP GUI 124 displays the update information, if necessary, completing the operation.

Figure 3:
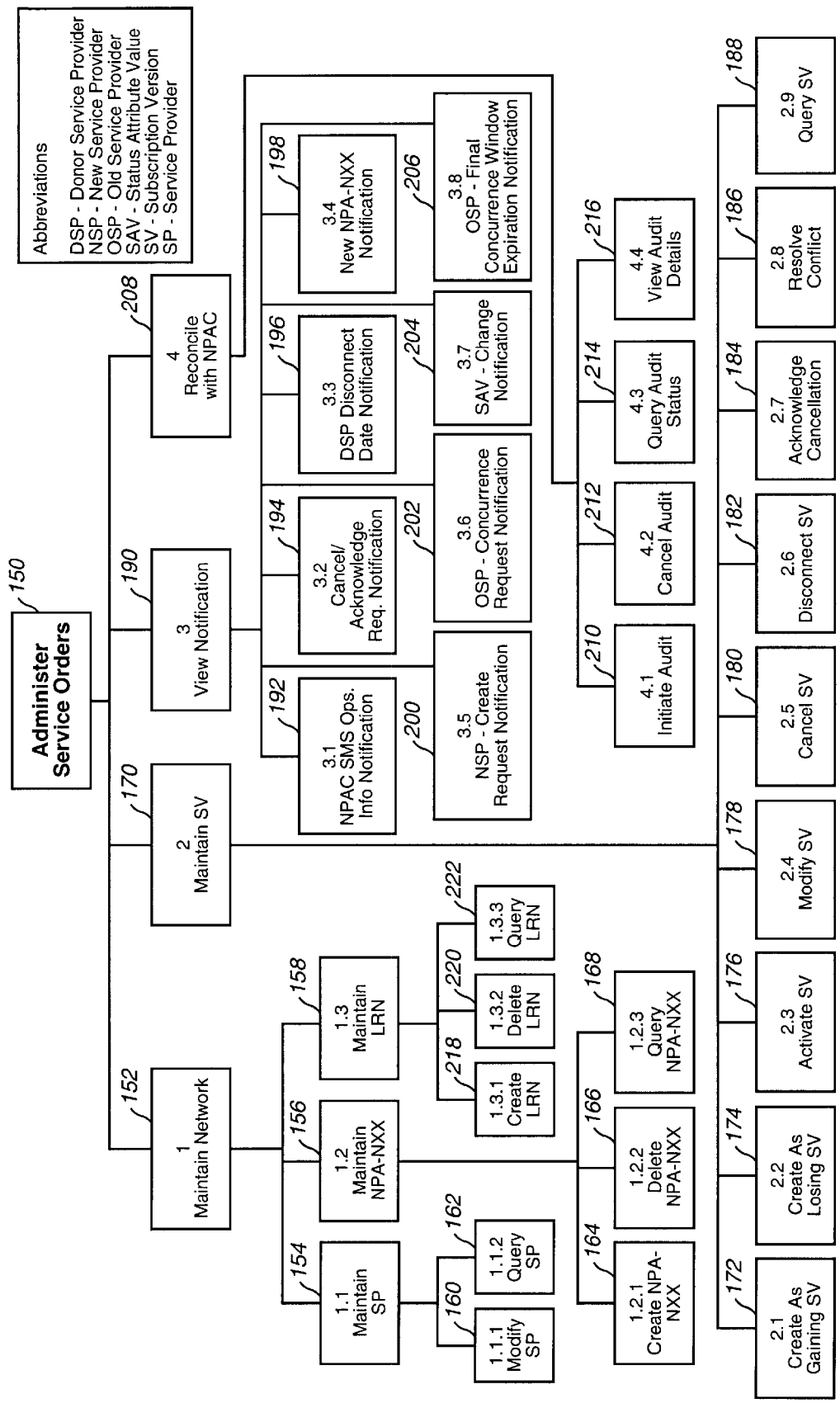
FIG. 3 is a functional decomposition diagram for business functions supported by the LNP GUI according to the present invention.

Turning now to FIG. 3, there is illustrated a functional decomposition diagram for business functions supported by the LNP GUI 124 according to the present invention. The functional decomposition diagram of FIG. 3 is intended to identify,. for example, business functions that will be supported by the LNP GUI 124. Each of the functions found at the lowest level can be performed through the LNP GUI 124. FIGS. 4A–4AQ, as will be later described, are exemplary screen shots of the lowest level functions performed by the LNP GUI 124.

The functions may operate differently based upon the group or service provider with whom the user is associated. For example, for one group, information may be obtained through accessing other external systems. For another group, the user may have to enter the information. In addition, business features pertaining to data edits within the LNP GUI 124 are not necessarily to be performed by the LNP GUI 124 module itself. The edits belong in the most logical sub-system so as to ensure consistency regardless of the data source (e.g., manually entered-vs-automatic flows from LSAT).

In FIG. 3. an Administer Service Orders function 150 includes, for example, a Maintain Network function 152, a Maintain Subscription Version (SV) function 170, a View Notification function 190 and a Reconcile with NPAC function 208. The Maintain Network function 152 and the Maintain Subscription Version (SV) function 170 and their corresponding sub-functions are referred to as LNP network management support. The View Notification function 190 and the Reconcile with NPAC fiction 208 and their corresponding sub-functions are referred to as LNP costing support.

The Maintain Network function 152 includes, for example, a Maintain Service Provider (SP) function 154, a Maintain Number Plan Area-Telephone Number Exchange (NPA-NXX) function 156 and a Maintain LRN function 158.

The Maintain SP function 154 includes, for example, a Modify SP function 160 and a Query SP function 162. The Maintain NPA-NXX function 156 includes, for example, a Create NPA-NXX function 164, a Delete NPA-NXX function 166 and a Query NPA-NXX function 168.

The Maintain LRN function 158 includes, for example, a Create LRN function 218, a Delete LRN function 220 and a Query LRN function 222.

The Maintain SV function 170 includes, for example, a Create As Gaining SV function 172, a Create As Losing SV function 174, an Activate SV function 176, a Modify SV function 178, a Cancel SV function 180, a Disconnect SV function 182, an Acknowledge Cancellation function 184, a Resolve Conflict function 186 and a Query SV function 188.

The View Notification function 190 includes, for example, a NPAC Service Management System (SMS) Operations Information Notification function 192, a Cancel/Acknowledge Request Notification function 194, a Donor Service Provider (DSP) Disconnect Date Notification function 196, a New NPA-NXX Notification function 198, a New Service Provider (NSP) Create Request Notification function 200, and Old Service Provider (OSP) Concurrence Request Notification Request function 202, a Status Attribute Value (SAV) Change Notification function 204, and an OSP Final Concurrence Window Expiration Notification function 206.

The Reconcile with NPAC function 208 includes, for example, an Initiate Audit function 210, a Cancel Audit function 212, a Query Audit Status function 214, and a View Audit Details function 216. The lowest level of the above functions will be later described with references to the exemplary screen shots of FIGS. 4A–4AQ.

The LNP GUI 124 General GUI Features

All user interface functionality of a preferred embodiment of the LNP GUI 124 uses, for example, full Queens English (Oxford Dictionary), including appropriate help text. However, other languages may be supported as will be apparent to those skilled in the software arts.

The LNP GUI 124 User Interface Features

In the preferred embodiment, the LNP GUI 124 conforms to telecommunications service provider's RIO guidelines for user interfaces (document name/id? version, date?), such that all functions developed for the LNP GUI 124 have consistent appearances and behaviors.

The LNP GUI 124 includes, for example, the following specific user interface features: (1) Any given user has the capability to access a tunable number of independent LNP GUI 124 work areas (e.g., one session each for northeast, midwest, southeast regions and two sessions for the southwest region), (2) the LNP GUI 124 provides scrolling capability when a list of results meeting the selection criteria extends beyond the length of the window, (3) the LNP GUI 124 requires confirmation from the user before proceeding with a delete or disconnect request, (4) the LNP GUI 124 limits the re-keying of frequently used data items, such as a telephone number, when navigating between windows, (5) the LNP GUI 124 provides a record count for a multi-record output (e.g., query results with a TN range selection criteria), (6) the LNP GUI 124 provides the ability for the user to go to a specific page of the query results, (7) the LNP GUI 124 displays the date and time that a query was requested, (8) the start-up LNP GUI 124 screen display default displays text names with icons (i.e., rather than symbol icons), and (9) all screens within the LNP GUI 124 are designated with a unique name for support purposes.

The LNP GUI 124 Language Support

In the preferred embodiment, the LNP GUI 124 supports, for example, English only. However, other languages may be supported as will be apparent to those skilled in the software arts.

The LNP GUI 124 Date/Time Support

In the preferred embodiment, the LNP GUI 124, for example: (1) accepts date/time entered by the user as being local date/time and converts the date/time to Greenwich Mean Time (GMT) prior to sending it to other subsystems/external systems, (2) the LNP GUI 124 converts date/time received from other subsystems/external systems from GMT to the users'local date/time as determined by the user's PC prior to displaying to the user, (3) the LNP GUI 124 supports one standard format for displaying or printing system date and time, which appear as follows: Date: ccyy/mm/dd; Time: hh:mm:ss:mmm, (4) the LNP GUI 124 converts the user-entered date into a 14 digit time stamp format of 'ccyymmddhhnmmss' where hhmmss is set to 000000 (if the user enters a date the time shall default to midnight), (5) the LNP GUI 124 handles leap years, following the quad-centennial rule "A year is a leap year if divisible by 4 but not divisible by 100, unless it is divisible by 400 (except for the year 3600)" (e.g., 1900 and 2100 are not leap years, but 2000 is).

The LNP GUI 124 User Interface Features

The user interface refers to the user-visible aspects of the LNP GUI 124.

The LNP GUI 124 Common Screen Elements

In the preferred embodiment, for example, the following elements appear on screen displays of the LNP GUI 124: (a) user Service Provider Identification (SPID), (b) screen name, and (c) NPAC 30 region name ('Multiple', if the screen covers multiple regions). It is noted that the NPAC 30 region varies based on TN/range or Numbering Plan Area-Telephone Number Exchange (NPA-NXX) involved.

The LNP GUI 124 Look-ups

In the preferred embodiment, for example, the LNP GUI 124 includes the following look-up features: (1) where the user is required to enter the SPID, the LNP GUI 124 provides a look-up feature allowing the user to look up the SPID by Service Provider Name, and (2) the LNP GUI 124 displays the Service Provider Name upon entry of the SPID by the user (It is noted that the SPID is pulled, for example, from IBAR 86 (or NPAS) for the MCIT 120 and IBAR 86 for the BF/W 122), (3) when the user belongs to MCIT 120 and is required to specify a network switch Common Language Location Identifier (CLLI), the LNP GUI 124 provides a look-up feature allowing the user to look up a CLLI by Incumbent Local Exchange Carrier (ILEC) NPA-NXX (It is noted that this feature is implemented, for example, by querying the NPAS database. Optionally, the "Homing To" DB may be used, as described in the Multiple Switch City functionality in NPSM 99.1.3 Release Requirements), (4) where the user is required to enter a date, the LNP GUI 124 allows the user the option of selecting the desired date from a monthly calendar, and (5) the NPSM 126 manages input from the LNP GUI 124 in the same manner that it currently manages similar. input from the present GUI.

The LNP GUI 124 Edits

In the preferred embodiment, for example, the LNP GUI 124 includes the following edit features: (1) screen validation including (a) type checking, (b) range checking, and (c) code list look-ups (e.g., to confirm a value entered is one of a pre-defined set); (2) the LNP GUI 124 validates data and selection criteria entered by the user according to a Data Validation Table; (3) the LNP GUI 124 accepts the wildcard character, %, at the end of any the following selection criteria values (i.e., the user has partially entered a value), (a) Customer Name, (b) TN, (c) LRN and (d) SV Remarks; (4) the LNP GUI 124 ensures the start telephone number is supplied if the end telephone number is supplied; and (5) the LNP GUI 124 ensures the end telephone number is greater than the start telephone number if the end telephone number is supplied.

The LNP GUI 124 Defaults

In the preferred embodiment, for example, the LNP GUI 124 includes the following default features: (1) the LNP GUI 124 provides the user with the capability to reset fields to their default values and remove any values from all other modifiable fields (e.g., screen refresh); (2) unless otherwise specified, the LNP GUI 124 applies the following general defaults when the user does not supply a value, (a) character values are set to spaces or null as appropriate depending on the field and (b) numeric values are set to zero or null as appropriate depending on the field; and (3) when specifying telephone numbers, if the user does not supply an end value, the LNP GUI 124 defaults the end value to null (i.e., single TN is specified by entering TN start only).

The LNP GUI 124 Error Handling

In the preferred embodiment, for example, the LNP GUI 124 includes the following error handling features: (1) when an error is encountered during user input, the LNP GUI 124 displays an error message to the user; (2) an error message displayed to the user contains a textual. description of the nature of the error (It is noted that an error message contains technical terminology and system language. This includes interpreting NPAC 30 messages where possible, e.g., instead of describing the error as "Z42", the error is described as "Due date mis-match"); (3) where possible, the corrective action to be taken on an error is provided; (4) after an error message is displayed to the user, the LNP GUI 124 gives the user an opportunity to correct the error where possible; (5) when the user specifies a range of TNs, the LNP GUI 124 displays/lists all the TNs (within the range) that failed an edit and indicates why each TN failed the edit; (6) during the period that the association between the local SOA 72 and any external systems is lost, the LNP GUI 124 advises the user that any dependent request issued by the user is rejected and provides the reason; and (7) the LNP GUI 124 displays English text error messages resulting from upstream systems, such as NRM, NPAS, etc. (It is noted that other languages may be supported as will be apparent to those skilled in the software arts).

The LNP GUI 124 Printing

In the preferred embodiment the LNP GUI 124, for example, supports the ability for the user to print multiple pages of output for a given print request.

The LNP GUI 124 Application Software Features

The following discussion described features of the LNP GUI 124 application software described with reference to FIGS. 3 and 4A–4AQ.

In FIGS. 4A–4AQ, there are illustrated exemplary screen shots of the lowest level functions of FIG. 3 performed by the LNP GUI 124 according to the present invention.

In FIG. 4A, an initial LNP GUI 124 screen 320 is shown and includes, for example, a Maintain SV hierarchical list 322 corresponding to the Maintain SV function 170, a View Notifications hierarchical list 324 corresponding to the View Notifications function 190, a Maintain SV audit hierarchical list 326 corresponding to the Reconcile with NPAC function 208, a Maintain NPA-NXX hierarchical list 328 corresponding to the Maintain NPA-NXX function 156 of the Maintain Network function 152, a Maintain LRN hierarchical list 330 corresponding to the Maintain LRN function 158 of the Maintain Network function 152, a Maintain SP hierarchical list 332 corresponding to the Maintain SP function 154 of the Maintain Network function 152, and a Security hierarchical list 334.

The screen 320 further includes User SPID entry 336, a New Window button 338, a Logoff button 340, a Minimize button 342, a Maximize button 344 and a Close application button 346. In addition, as shown in the screen 320, the Maintain SV hierarchical list 322 is in an expanded state as indicted by the "−" sign thereon while the remaining screen are not in an expanded form as indicated by their respective "+" signs thereon.

Accordingly, the Maintain SV hierarchical list 322 in its expanded form further includes a Query hierarchical list item 322a corresponding to the Query SV function 188, a Create As Gaining hierarchical list item 322b corresponding to the Create As Gaining SV function 172, a Create As Losing hierarchical list item 322c corresponding to the Create As Losing SV function 174, a Modify hierarchical list item 322d corresponding to the Modify SV function 178, an Activate hierarchical list item 322e corresponding to the Activate SV function 176, a Cancel hierarchical list item 322f corresponding to the Cancel SV function 180, a Cancel Acknowledge hierarchical list item 322g corresponding to the Acknowledge Cancellation function 184, a Resolve Conflict hierarchical list item 322h corresponding to the Resolve Conflict function 186, and a Disconnect hierarchical list item 322i corresponding to the Disconnect SV function 182.

The Maintain SV Function 170

In the preferred embodiment of the LNP GUI 124, the functionality of the Maintain SV function 170 relates to maintaining (e.g., creating, activating, modifying, disconnecting) subscription versions for LNP telephone numbers.

The Query SV Function 188 Features

The following discussion describes the features of the preferred embodiment of the LNP GUI 124 Query SV function 188 for querying subscription versions of LNP telephone numbers. When a user selects the Query hierarchical list item 322a corresponding to the Query SV function 188 of the LNP GUI 124, the screen 350 as shown, for example, in FIG. 4B is generated by the LNP GUI 124.

In FIG. 4B, the Query screen 350 includes, for example, a Criteria form 352 and a Results form 354. The Criteria form 352 includes, for example, various fields for entering various parameters for the query as shown in FIG. 4B. To query subscription version information, the user specifies the Source the information is to be obtained from, for example, from one of the following sources, (a) the local SOA 72, (b) the NPAC 74, and (c) the IBAR 86 via for example, selection buttons 352A shown in FIG. 4B.

SV Query from Local SOA Features

In the preferred embodiment to query SOA 72 subscription version information, the LNP GUI 124, for example, accepts the following selection criteria from the user as shown in FIG. 4B: (a) Telephone Number Start 352B, (b) Telephone Number End 352C, (c) Subscription Version ID 352D, (d) LRN 352E, (e) Subscription Version Status drop down list 352F, (f) LNP Type drop down list 352G, (g) New Service Provider Due Date Range 352H, (h) Old Service Provider Due Date Range 352I, (i) Old SP Authorization drop down list 352J, (j) Work Order Number 352K, (k) Service Order Number 352L, (l) Full or Partial Customer Name 352M, (m) Ready to Activate indicator drop down list 352O, (n) Region Indicator drop down list 352Q, (o) Sent to DAP drop down list 352U, and (p) a User ID entry 352V. In addition, the Criteria form 352 includes, for example, a Query button 352S to initiate the query, and a Clear button 352T to clear the entered fields.

The LNP GUI 124 performs, for example, the following validations on information supplied by the user: (a) at least one selection criteria must be specified. The query return is limited to a tunable number of records, initially set to, for example, 10,000 records. The LNP GUI 124, by default, displays the data sorted by, for example, Telephone Number, then by Subscription Version ID. The LNP GUI 124 provides the capability for the user to specify the primary sort sequence from any of the selection criteria. If the user specifies a primary sort criteria, for example, TN and SV ID are used as secondary and tertiary sort, respectively (see, e.g., FIG. 4C).

Figure 4C:
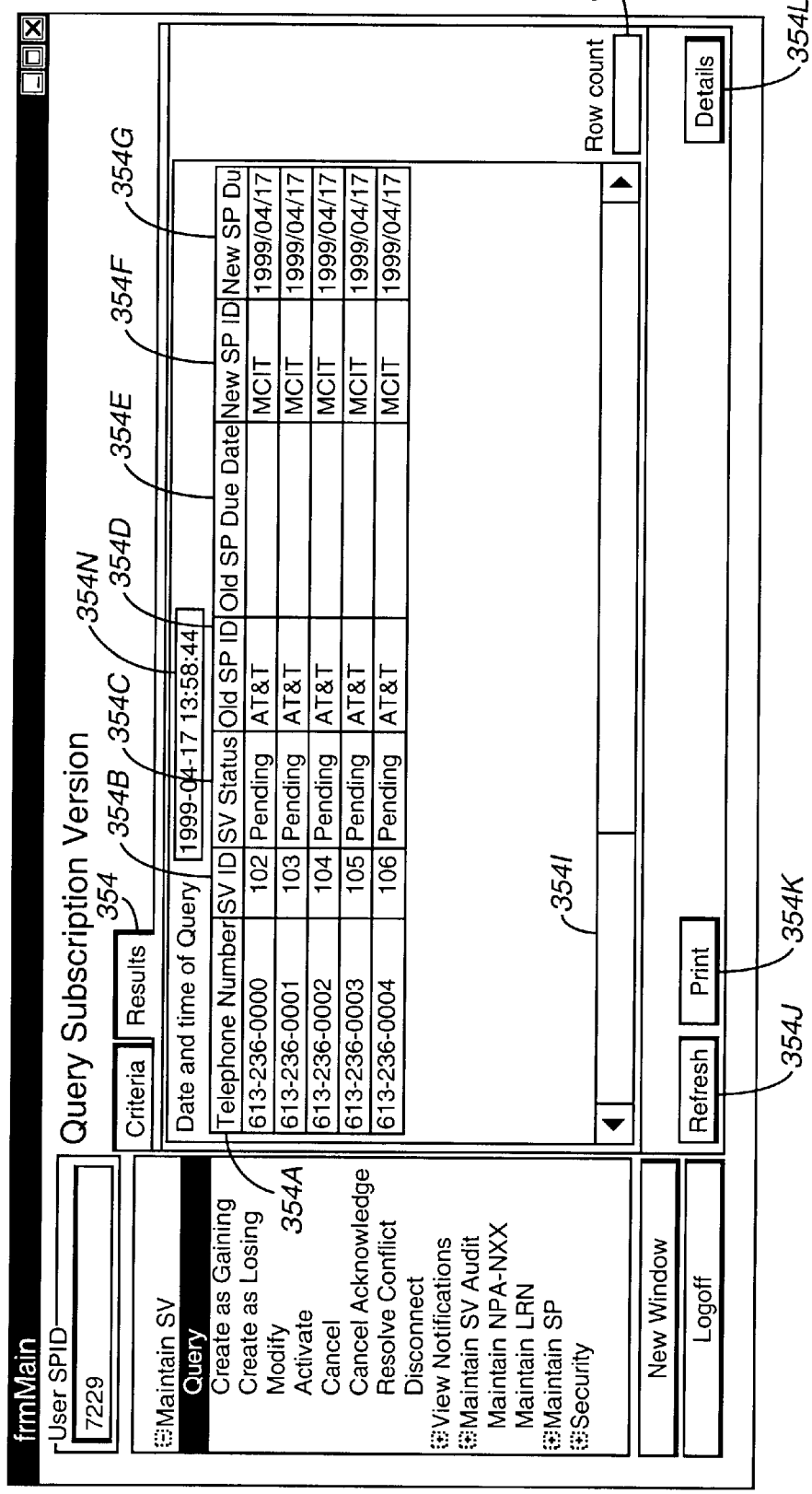

After the Query button 352S is selected, the LNP GUI 124 displays the following information for each subscription version/TN which meets the specified selection criteria as shown in, for example, FIG. 4C Results form 354: (a) TN 354A, (b) Subscription Version ID 354B, (c) Subscription Version Status 354C, (d) Old Service Provider ID 354D, (e) Old Service Provider Due Date 354E, (f) New Service Provider ID 354F, (g) New Service Provider Due Date 354G, (h) Old Service Provider Authorization (not shown), (i) Ready to Activate Indicator (not shown), and (j) Break in TN Sequence Indicator (not shown). In addition, the results screen 354 includes a horizontal scroll bar 354I, a Refresh button 354J for refreshing the query results, a Print button 354K for printing the results, a Details button 354K for viewing details of the query results, a Row count indicator 354M, and a Date and time of query indicator 354N.

Only the most current subscription version for each TN are displayed, wherein most current is defined, for example, as follows: (a) if the TN has only one SV associated with it, the LNP GUI 124 displays the most current SOA record for the TN, (b) if the TN has more than one SV associated with it, the LNP GUI 124 displays the most recent non-active SOA record for the TN, and (c) all other records associated with the TN are accessible from the displayed record's associated detail screen via Details button 354L.

The Break in TN Sequence indicator is populated, for example, only under the following conditions: (a) TN is primary sort, and (b) TN Start and TN End were selection criteria.

To display the detail information for a TN, the LNP GUI 124 allows the user to, for example, select a TN from the list of query results and show details thereof via selection of the Details button 354L of the Results form 354 of FIG. 4C. The LNP GUI 124 displays the following detail information for the selected subscription version as shown in, for example, a General form 360, a SV History form 362, an Additional Info form 364 and a Partial Failure SP List form 366 of FIGS. 4D–4G.

The General form 360 of FIG. 4D includes, for example, the following detail information: (a) LRN 360A; (b) New Service Provider ID 360B; (c) Old Service Provider ID 360C; (d) New Service Provider Due Date/Time 360D; (e) Old Service Provider Due Date/Time 360E; (f) Old Service Provider Authorization 360F; (g) Subscription Version Status 360G; (h) Switch CLLI 360H; (i) Subscription Version Remarks 360I; (j) Ready to Activate 360J; (k) Porting To Original SP 360K; (l) Region 360L; (m) Subscription Version ID 360M; (n)TN 360N; and (o) ILEC NPA-NXX 360O.

The SV History screen 362 of FIG. 4E includes, for example, the following detail information: (a) Date/Time 362A; and (b) Activity 362B. Timestamps 362A are included, for example, for the following activities 362B as shown in FIG. 4E: (a) Broadcast; (b) Modified; (c) New SP Creation; (d) New SP Cancellation; (e)New SP Conflict Resolution; (f) Old SP Authorization; (g) Old SP Cancellation; (h) Old SP Conflict Resolution; (i) Activation; (j) Conflict; (k) Effective Release Date; (l) Disconnect Complete; (m) Cancellation; (n) Old;(o) Old SP Creation; and (p) Customer Disconnect.

The Additional Info form 364 of FIG. 4F includes, for example, the following detail information: (a) LNP Type 364A; (b) User ID 364B; Pre-Cancellation Status 364C; (d) Work Order Number 364D; (e) SV Remarks 364E; (f) Service Order Number 364F; (g) Billing Id 364G; (h) Reserved TN 364H; (i) Customer Name 364I; (j) Custom Local Area Signaling Services (CLASS) Destination Point Code (DPC) 364J; (k) CLASS Subsystem Number (SSN) 364K; (l) Line Information Database (LIDB) DPC 364L; (m) LIDB SSN 364M; (n) Caller Id with Name (CNAM) DPC 364N; (o) CNAM SSN 364O; (p) Inter-Switch Voice Mail (ISVM) DPC 364P; (q) ISVM SSN 364Q; (r) End User Location Value 342R; and (s) End User Location Type 342S.

Figure 4G:
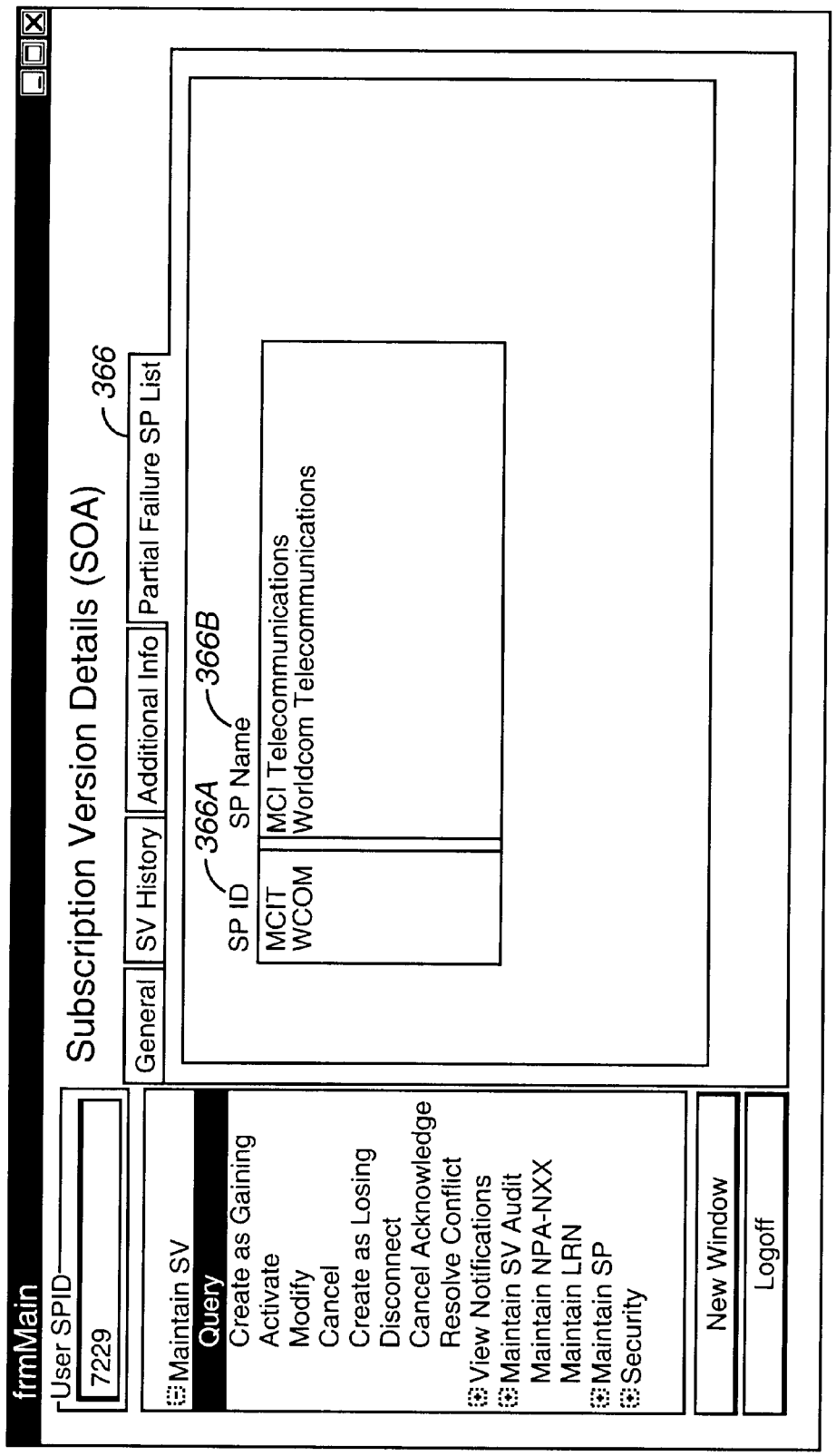

The Partial Failure SP List form 366 of FIG. 4G includes, for example, the following detail information: (a) SP ID 366A; and (b) SP Name 366B.

The user is taken directly from the Query SV function 188 to the other Maintain SV function(s) 170 for a single record. If multiple records are displayed, the user can double-click (or the like) on a record to proceed to the Maintain SV function 170 where subsequent actions can be performed as appropriate. The Partial Failure SP List form 366 is readily displayable in the LNP GUI 124 due to the noted screen arrangements. When displaying the detail information for a subscription version, for example, all query selection criteria remains visible (e.g., possibly compressed, or only non-null values displayed) while utilizing a near full-screen to display query results.

SV Query from NPAC Features

In the preferred embodiment to query NPAC 30 subscription version information via selection buttons 352A, the LNP GUI 124, for example, accepts all of the selection criteria previously described with respect to the SV Query from SOA except for: (a) the Work Order Number 352K, (b) the Service Order Number 352L, (c) the Full or Partial Customer Name 352M, (d) the Ready to Activate drop down list 352O and (o) the Sent to DAP drop down list 352U.

The LNP GUI 124 performs, for example, the following validations on information supplied by the user: (a) region indicator must be specified; and (b) at least one other selection criteria must be specified. The query return is limited to a tunable number of records, for example, initially set to 1,000. The LNP GUI 124, by default, displays the data sorted by, for example, Telephone Number, then by Subscription Version ID.

After the Query button 352S is selected, the LNP GUI 124 displays the same information for each subscription version/ TN which meets the specified selection criteria as shown in, for example, FIG. 4C Results form 354 previously discussed with respect to the SV Query from SOA except: (a) the Ready to Activate indicator (not shown); and the (b) Break in TN Sequence Indicator (not shown).

Only the most current subscription version for each TN is displayed as previously discussed with respect to the SV Query from SOA. To display the detail information for a TN, the LNP GUI 124 allows the user to select a TN from the list of query results.

The LNP GUI 124 displays detail information as previously discussed with respect to the SV Query from SOA except for the following fields: (a) Work Order Number 364D; (b) Service Order Number 364F;(c) SV Remarks 364E and indicator 360I; (d) Reserved TN 364H; (e) Switch CLLI 360H; and (f) ILEC NPA-NXX 360O.

The user is taken directly from the Query SV function 188 to the Maintain SV function(s) 170 for a single record. If multiple records are displayed, the user can double-click (or the like) on a record to proceed to the Maintain SV function 170 where subsequent actions can be performed as appropriate. The Partial Failure SP List form 366 is readily displayable in the LNP GUI 124 due to the noted screen arrangements. Any NPAC 30 returned values that do not match SOA 72 values are. for example, highlighted on the corresponding subscription version maintenance screen. If the query results reflect one or more discrepancies between SOA 72 and NPAC 30, the user is prompted (i.e., given the option) to update SOA 72 to conform to NPAC 30 values for the displayed record. When displaying the detail information for a subscription version, for example, all query selection criteria remains visible (e.g., possibly compressed, or only non-null values displayed) while utilizing a near full-screen to display query results.

SV Query from IBAR Features

In the preferred embodiment to query IBAR 86 subscription version information, the LNP GUI 124, for example, accepts all of the selection criteria previously described with respect to the SV Query from SOA except for: (a) the New Service Provider Due Date Range 352H, (b) Old Service Provider Due Date Range 352I, (c) Old SP Authorization drop down list 352J, (d) Work Order Number 352K, (e) Service Order Number 352L, (f) Full or Partial Customer Name 352M, (g) Ready to Activate indicator drop down list 352O. In addition, to query IBAR 86 subscription version information, the LNP GUI 124, for example, accepts an Activation Date Range 352R and the Sent to DAP drop down list 352U of Criteria form 352 of FIG. 4B.

The LNP GUI 124 performs, for example, the following validations on information supplied by the user: (a) at least one selection criteria must be specified. The query return is limited to a tunable number of records, initially set to, for example, 100,000 records. The LNP GUI 124, by default. displays the data sorted by, for example, Telephone Number, then by Subscription Version ID. The LNP GUI 124 provides the capability for the user to specify the primary sort sequence from any of the selection criteria. If the user specifies a primary sort criteria, for example. TN and SV ID are used as secondary and tertiary sort, respectively (see, e.g., FIG. 4C).

After the Query button 352S is selected, the LNP GUI 124 displays the same information for each subscription version/ TN which meets the specified selection criteria as shown in, for example, FIG. 4C Results form 354 previously discussed with respect to the SV Query from SOA except for: (a) the Old Service Provider ID 354D, (b) the Old. Service Provider Due Date 354E, (c) the New Service Provider ID 354F, (d) the New Service Provider Due Date 354G, (h) Old Service Provider Authorization (not shown), and (e) Ready to Activate Indicator (not shown). ID. addition, the LNP GUI 124 displays in the Results form 354 a Current Service Provider ID (not shown) and an Activation Date (not shown).

Only the most current subscription version for each TN is displayed as previously discussed with respect to the SV Query from SOA. To display the detail information for a TN, the LNP GUI 124 allows the user to select a TN from the list of query results.

The LNP GUI 124 displays detail information as previously discussed with respect to the SV Query from SOA except for the following fields: (a) the Old Service Provider 360C; (b) the New Service Provider Due Date 360D; (d) the Old Service Provider Due Date 360E; (e) the Old Service Provider Authorization 360F; (f) the Pre-Cancellation Status 364C; (g) the Partial Failure SP List form 366 consisting of the following: (i) the Service Provider ID 366A, and the (ii) Service Provider Name 366B; (h) the Ready to Activate Indicator (not shown); (i) the Work Order Number 364D; (j) the Service Order Number 364F; (k) the Customer Name 364I; (l) the Reserved TN Indicator 364H; (m) the Switch CLLI 360H; (n) the ILEC NPA-NXX 3600; (o) the SV ID 360M: (p) the TN 360N; and (q) the User ID 364B.

In addition the following Timestamps 362A for the following activities 362B as shown in FIG. 4E are not displayed: (a) New SP Cancellation; (b) New SP Conflict Resolution Timestamp; (c) Old SP Authorization; (d) Old SP Cancellation; (e) Old SP Conflict Resolution; (f) Conflict; (g) Old; and (h) Old SP Creation.

The user is taken directly from the Query SV function 188 to the Maintain SV function(s) 170 for a single record. If multiple records are displayed, the user can double-click (or the like) on a record to proceed to the Maintain SV function 170 where subsequent actions can be performed as appropriate. When displaying the detail information for a subscription version, for example, all query selection criteria remains visible (e.g., possibly compressed, or only non-null values displayed) while utilizing a near full-screen to display query results.

Create SV Functions 172 and 174 Features

In the preferred embodiment, the LNP GUI 124 includes, for example, the Create As Gaining SV function 172 and the Create As Losing SV function 174 for creating subscription versions for LNP telephone numbers. A subscription version can be created if the TN is available for porting. A subscription version created as "gaining" refers to when a service provider gains a customer. A subscription version created as "losing" refers to when a service provider loses the customer. This latter scenario is sometimes also referred to as a "release."

Create SV Functions 172 and 174 Features

In the preferred embodiment, the LNP GUI 124 includes, for example, the following features: (1) the LNP GUI 124 accepts a user request to create a subscription version (SV); (2) the user is able to specify whether this is a "Create As Gaining" or "Create As Losing" subscription version; and (3) the user is able to maintain user-defined remarks, stored locally by TN.

Create As Gaining SV Function 172

The following discussion describes the features of the preferred embodiment of the LNP GUI 124 Create As Gaining SV function 172. When a user selects the Create as Gaining hierarchical list item 322b corresponding to the Create As Gaining SV function 172 of the LNP GUI 124, the screen 370 as shown, for example, in FIG. 4H is generated by the LNP GUI 124.

In FIG. 4H, the Create As Gaining screen 370 includes, for example, a Create As Gaining form 372 and an Additional form 374. The Create As Gaining form 372 includes, for example, various fields for entering various parameters as shown in FIG. 4H.

In the preferred embodiment of the Create As Gaining SV function 172, the LNP, GUI 124 accepts, for example, the following information from the user in fields as shown in the Create As Gaining screen 370 of FIG. 4H: (a) Telephone Number Start 370B;(b) Telephone Number End 370C; and (c) Region drop down list 370Q. In addition, the Create As Gaining screen 370 includes a Create button 370R to initiate creation, and a Clear button 370U to clear the entered values.

In the preferred embodiment, the LNP GUI 124 accepts, for example, the following information from the user in fields as shown in the Create As Gaining form 372: (a) Old Service Provider ID drop down list 372D; (b) Due Date 372E; (c) Port to Original drop down list 372F; (d) LRN 372A (e.g., mandatory); (e) Customer Name 372H; (f) Work Order Number 3721; (g) Service Order Number 372J; (h) Subscription Version Remarks 372K; (i) Reserved TN drop down list 372L; (j) Switch CLLI drop down list 372M; (k) Billing ID 372N; and (l) ILEC NPA-NXX 372O.

In the preferred embodiment of the Create As Gaining SV function 172, the LNP GUI 124, for example, sets/defaults the New Service Provider to the Service Provider ID associated with the User ID and sets/defaults the Old Service Provider ID drop down list 372D as follows: (a) if the TN is a current active ported TN on the IBAR 86, set to the Service Provider ID associated with the ported TN; (b) if the TN is not a current active ported TN on the IBAR 86, and the Number Plan Area (NPA) of the TN is portable, set to the Service Provider ID associated with the NPA-NXX of the TN found in the IBAR 86; (c) if the TN is not a current active ported TN on the IBAR 86, and the NPA of the TN is not portable (i.e. cannot be defaulted), the LNP GUI 124: (i) advises the user of the error, indicating that the NPA-NXX of the TN is not portable, and (ii) requires that the user specify the Old Service Provider ID; (d) if Create As Gaining is for a TN range, use the first TN in the range for the old SP lookup steps referenced above.

In the preferred embodiment of the Create As Gaining SV function 172, where the user has indicated that it is not a case of porting back to the original service provider via Port To Original drop down list 372F, the LNP GUI 124, for example, pre-populates the DPC and SSN fields based on the LRN 372A if it is manually entered as will be further described with respect to FIG. 4I.

In the preferred embodiment of the Create As Gaining SV function 172, where the user has indicated that it is not a case of porting back to the original service provider, the LNP GUI 124, for example. accepts the following additional information from the user via the Additional form 374 as shown in FIG. 4I: (a) CLASS DPC 374B; (b) CLASS SSN 374C; (c) LIDB DPC 374D; (d) LIDB SSN 374E; (e) CNAM DPC 374F; (f) CNAM SSN 374G; (g) ISVM DPC 374H; (h) ISVM SSN 374I; (i) End User Location Value 374J; and (j) End User Location Type 374K. Further, the Additional form 374 includes a Lookup button 374N which, for example, pre-populates the DPC and SSN fields 374B–374I based on the LRN 372A if it is manually entered.

Create As Losing SV Function 174

The following discussion describes the features of the preferred embodiment of the LNP GUI 124 Create As Losing SV function 174. When a user selects the Create As Losing hierarchical list item 322c corresponding to the Create As Losing SV function 174 of the LNP GUI 124, the screen 380 as shown, for example, in FIG. 4J is generated by the LNP GUI 124.

Figure 4J:
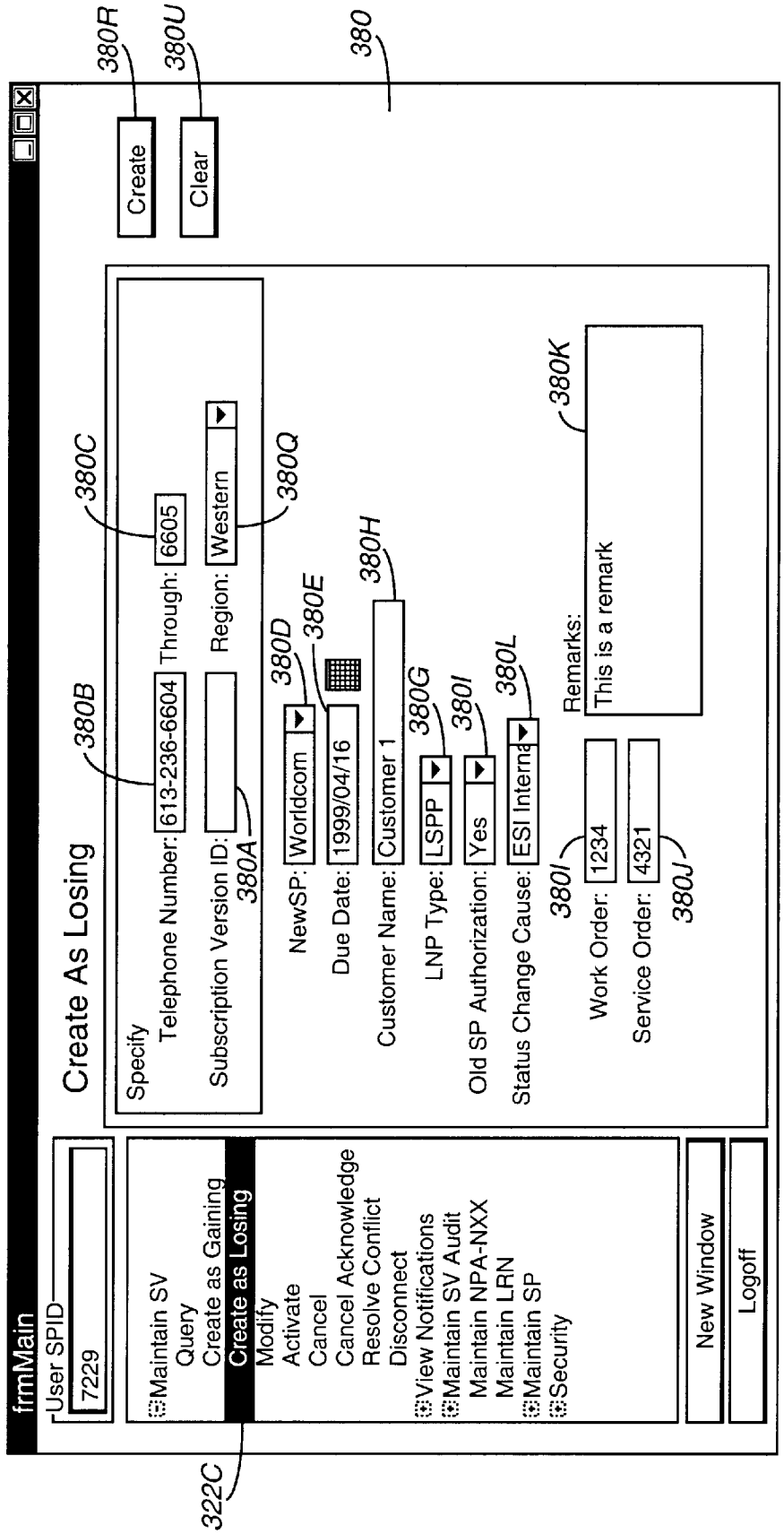

In the preferred embodiment of the Create As Losing SV function 174, the LNP GUI 124 accepts, for example, the following information from the user in fields as shown in Create As Losing screen 380 of FIG. 4J: (a) Telephone Number Start 380B;(b) Telephone Number End 380C; (c) New Service Provider ID drop down list 380D; (d) Due Date 380E; (e) Old SP Authorization Indicator 380F; (f) LNP Type drop down list 380G; (g) Customer Name 380H; (h) Work Order Number 380I; (i) Service Order Number 380J; (j) Subscription Version Remarks 380K; (k) Status Change drop down list 380L; (l) Subscription Version ID 380P; and (p) Region drop down list 380Q. In addition, the screen 380 includes a Create button 380R to initiate creation, and a Clear button 380U to clear the entered values.

In the preferred embodiment of the Create As Losing SV function 174, the LNP GUI 124, for example, sets/defaults the Old Service Provider to the Service Provider ID associated with the User ID.

Create SV Functions 172 and 174 Edits

In the preferred embodiment, the LNP GUI 124 performs, for example, the following validations on information supplied by the user: (a) for the Create As Gaining SV function 172 where the user has indicated that it is a case of porting back to the original service provider via Port To Original drop down list 372F, the following information must be supplied: (i) Telephone Number Start 370B, (ii) Old Service Provider ID 372D, (iii) Due Date 372E, and (iii) Port To Original drop down list 372F; (b) for the Create As Gaining SV function 172 where the user has indicated that it is not a case of porting back to the original service provider via indicator 372F, the following information must be supplied: (i) Telephone Number Start 370B, (ii) Old Service Provider ID 372D, (iii) Due Date 372E, (iv) Port To Original drop down list 372F 372F, and (v) LRN 372A (Note: this is an MCIT 120 feature, not an NPAC 30 feature); (c) for the Create As Losing SV function 174, the following information must be supplied: (i) Telephone Number Start 380B, (ii) New Service Provider ID 380D, (iii) Due Date 380E, (iv) Old Service Provider Authorization 380F, (v) Status Change Cause Code 380L (e.g., only if Old SP Authorization=N [0]), and (vi) LNP Type 380G; (d) Due Date 372E and 380E must be equal to or greater than current system date; (e) Due Date 372E and 380E must be equal to or greater than the effective date of the NPA-NXX for the TN (e.g., the effective date for the NPA-NXX will be checked on the IBAR 86); (f) LRN 372A must belong to the Service Provider associated with the user requesting the Create; (g) if LNP Type 380G specified is "LSPP" (i.e., inter service provider port), then the Old and New Service Providers must be different; and (h) if LNP Type 380G specified is "LISP" (i.e., intra service provider port), then old and new service providers must be the same.

MCIT 120 Specific Features for the Create As Gaining SV Function 172

In the preferred embodiment, for the Create As Gaining SV function 172 requested by an MCIT 120 user, for example, the LNP GUI 124 notifies NRM to update its status of the TN to "Created", only after confirmation of the Create has been received from the NPAC 30.

Activate SV Function 176 Features

Figure 4K:
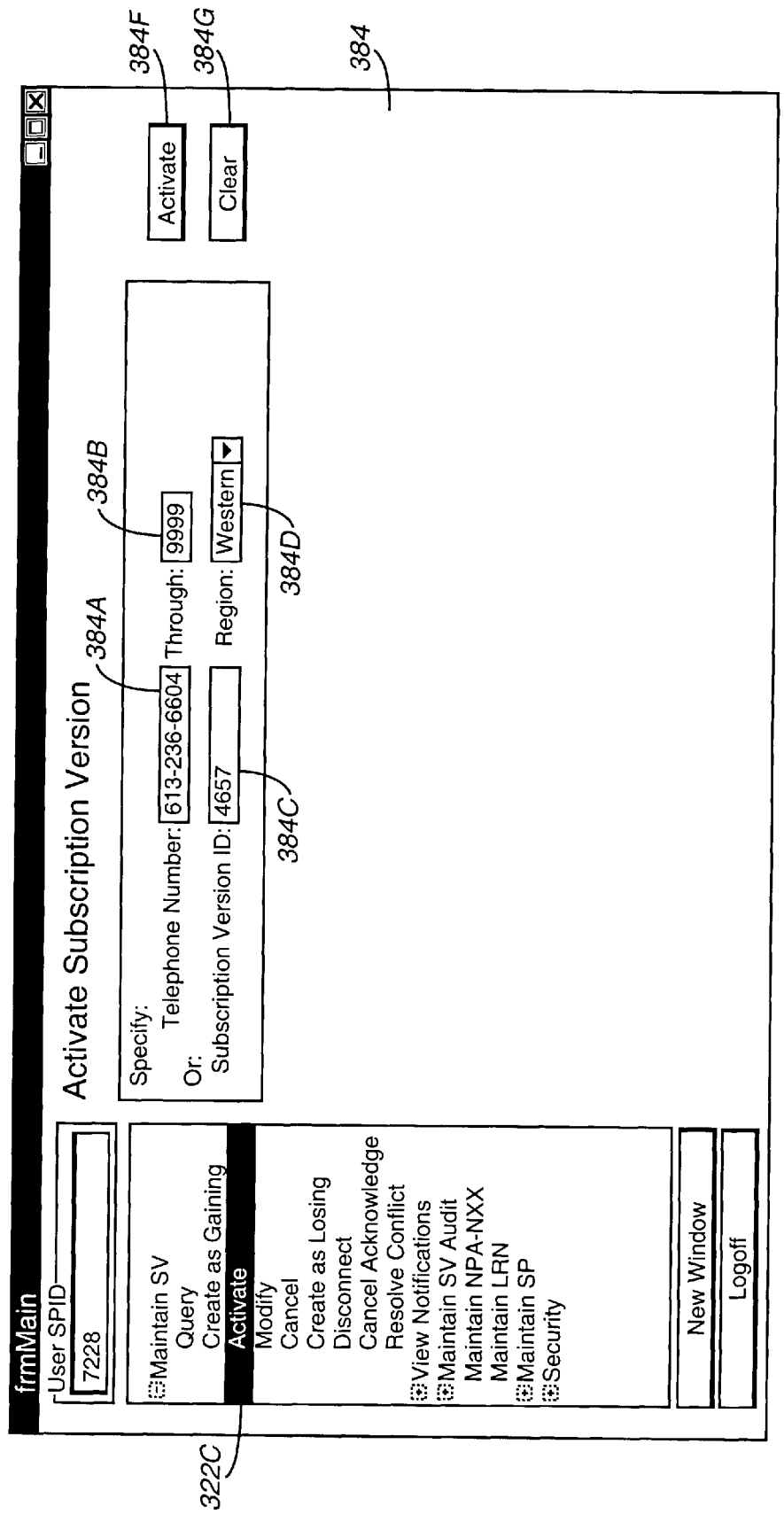

The following discussion describes the features of the preferred embodiment of the LNP GUI 124 Activate SV function 176. When a user selects the Activate hierarchical list item 322e corresponding to the Activate SV function 176 of the LNP GUI 124, the screen 384 as shown, for example, in FIG. 4K is generated by the LNP GUI 124.

In the preferred embodiment, the Activate SV function 176 performs activating subscription versions of ported telephone numbers. A subscription version can be activated once it has been created.

Activate SV Function 176 Features

In the preferred embodiment, the Activate SV function 176 of the LNP GUI 124, for example, accepts a user request to activate a subscription version. To identify a subscription version to be activated, the LNP GUI 124 allows the user to, for example: (a) select a specific TN from a list, or (b) select a contiguous block of TNs from a list, or (c) specify the following information as shown in Activate Subscription Version screen 384 of FIG. 4K:(i) Telephone Number Start 384A, (ii) Telephone Number End 384B, (iii) Subscription Version ID 384C, and (iv) Region Indicator drop down list 384D. The screen 384 further includes, for example, a Activate button 384F to initiate activation, and a Clear button 384G to clear the entered values.

In the preferred embodiment, the Activate SV function 176 of the LNP GUI 124, for example, performs the following validations on information supplied by the user: (a) Either Telephone Number Start 384A or Subscription Version ID 384C plus Region Indicator 384D must be supplied.

In the preferred embodiment, the Activate SV function 176 of the LNP GUI 124, for example, validates that the Subscription Version Status is "pending." For example, Subscription Version Status can be verified as follows: Check the local SOA 72 for existence of "Create As Gaining" subscription version having "Pending" status and either the existence of the Concurrence Notification=Y (1) or expiration of the service provider concurrence window, (a) if the above is not true, then offer the option to check NPAC 30 for the Old Service Provider Authorization flag=Y (1), (b) if the above is not true for NPAC 30, then issue an error. This edit takes into account when the SOA 72 gets out of sync with NPAC 30 (which should be rare) and when the SV was created on one system and activated through another (e.g., the second telecommunications service provider using ESI and then cutting over to MCIT 120's SOA system). When TN ranges are involved and an edit fails, the system, for example, indicates to the user that nothing was activated and advises the user to resolve the error (indicating the affected TNs) and/or split up the ranges into smaller ranges that are doable.

MCIT 120 Specific Features for the Activate SV Function 176

In the preferred embodiment, for the Activate SV function 176 requested by an MCIT 120 user, for example, the LNP GUI 124 notifies NRM to update its status of the TN/range to "Activated", only after confirmation of the Activate has been received from the NPAC 30.

Modify SV Function 178

The following discussion describes the features of the preferred embodiment of the LNP GUI 124 Modify SV function 178. When a user selects the Modify hierarchical list item 322d corresponding to the Modify SV function 178 of the LNP GUI 124, the screen 390 as shown, for example, in FIG. 4L is generated by the LNP GUI 124.

Figure 4L:
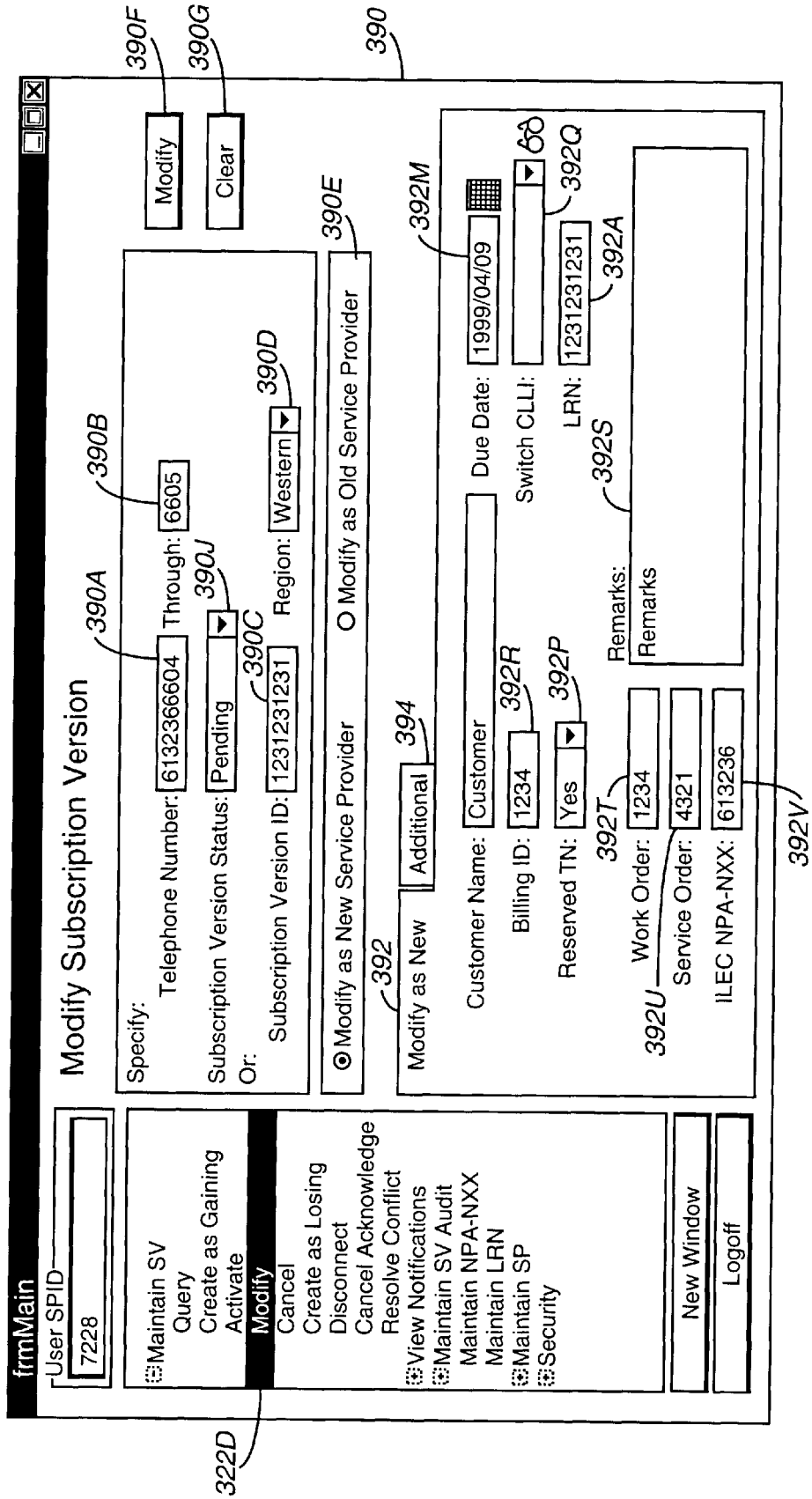

FIG. 4L, the Modify Subscription Version screen 390 includes, for example, a Modify as New form 392 and an Additional form 394 which are generated by selecting a Modify as New Service Provider field in selection buttons 390E. The Modify as New form 392 includes, for example, various fields for entering various parameters as shown in FIG. 4L.

In the preferred embodiment, the Modify SV function 178 of the LNP GUI 124, for example, modifies Subscription Versions for ported telephone numbers. Service providers can, for example, modify attributes associated with active, pending or conflict subscription versions.

Modify SV Function 178 Features

In the preferred embodiment, the Modify SV function 178 of the LNP GUI 124, for example, accepts a user request to modify a subscription version. To identify a subscription version to be modified, the LNP GUI 124 allows the user to, for example: (a) select a specific TN from a list, or (b) select a contiguous block of TNs from a list, or (c) specify the following information as shown in Modify Subscription Version screen 390 of FIG. 4L: (i) Telephone Number Start 390A, (ii) Telephone Number End 390B, (iii) Subscription Version ID 390C, (iv) Region Indicator drop down list 390D, (v) Subscription Version Status drop down list 390J, and (vi) the Modify as New or Old Service Provider fields in selection buttons 390E. The Modify Subscription Version screen 390 further includes, for example, a Modify button 390F to initiate modification, and a Clear button 390G to clear the entered values.

In the preferred embodiment, the Modify SV function 178 of the LNP GUI 124, for example, performs the following validations on information supplied by the user: (a) one of the following combinations of information must be supplied in order to modify the subscription version: (i) Subscription Version ID 390C plus Region Indicator 390D, or (ii) Telephone Number Start 390A and Subscription Version Status 390J, or (iii) Telephone Number Start 390A, Telephone Number End 390B, and Subscription Version Status 390J.

Modify SV Function 178 by New Service Provider

In the preferred embodiment, the Modify SV function 178 of the LNP GUI 124, when a user belonging to the Subscription Version's new service provider requests to modify the Subscription Version via selection buttons 390E, accepts from the user changes to, for example, the following information in addition to the information previously discussed with respect to screen 390 as shown in the Modify as New form 392: (a) a Customer Name 392E, (b) a Due Date 392M, (c) Billing ID 352R, (d) a Switch CLLI drop down list 392Q, (e) a Reserved TN drop down list 392P. (f) a LRN 392A, (g) a Work Order number 392T, (h) Remarks 392S, (i) a Service Order number 392U, and (j) a ILEC NPA-NXX 392V.

The Additional form 394 as shown in FIG. 4M, for example, accepts the following additional information from the user: (a) CLASS DPC 394B; (b) CLASS SSN 394C; (c) LIDB DPC 394D; (d) LIDB SSN 394E; (e) CNAM DPC 394F; (f) CNAM SSN 394G; (g) ISVM DPC 394H; (h) ISVM SSN 394I; (i) End User Location Value 394J; and 0) End User Location Type 394K. Further, the Additional form 394 includes a Lookup button 394N which, for example, pre-populates the DPC and SSN fields 394B–394I based on the LRN 392A if it is manually entered.

In the preferred embodiment, the Modify SV function 178 of the LNP GUI 124, validates that the Subscription Version Status 390J is "pending", or "conflict." The status validation is performed, for example, against the local SOA 72, not the NPAC 74. There is typically no need to check the NPAC 74 since, if the SV didn't pass the edit against the local SOA 72, but would have passed the edit against the NPAC 74, then there is a discrepancy between the SOA 72 and NPAC 74 which in any case needs to be corrected.

Modify SV Function 178 by Old Service Provider

Figure 4N:
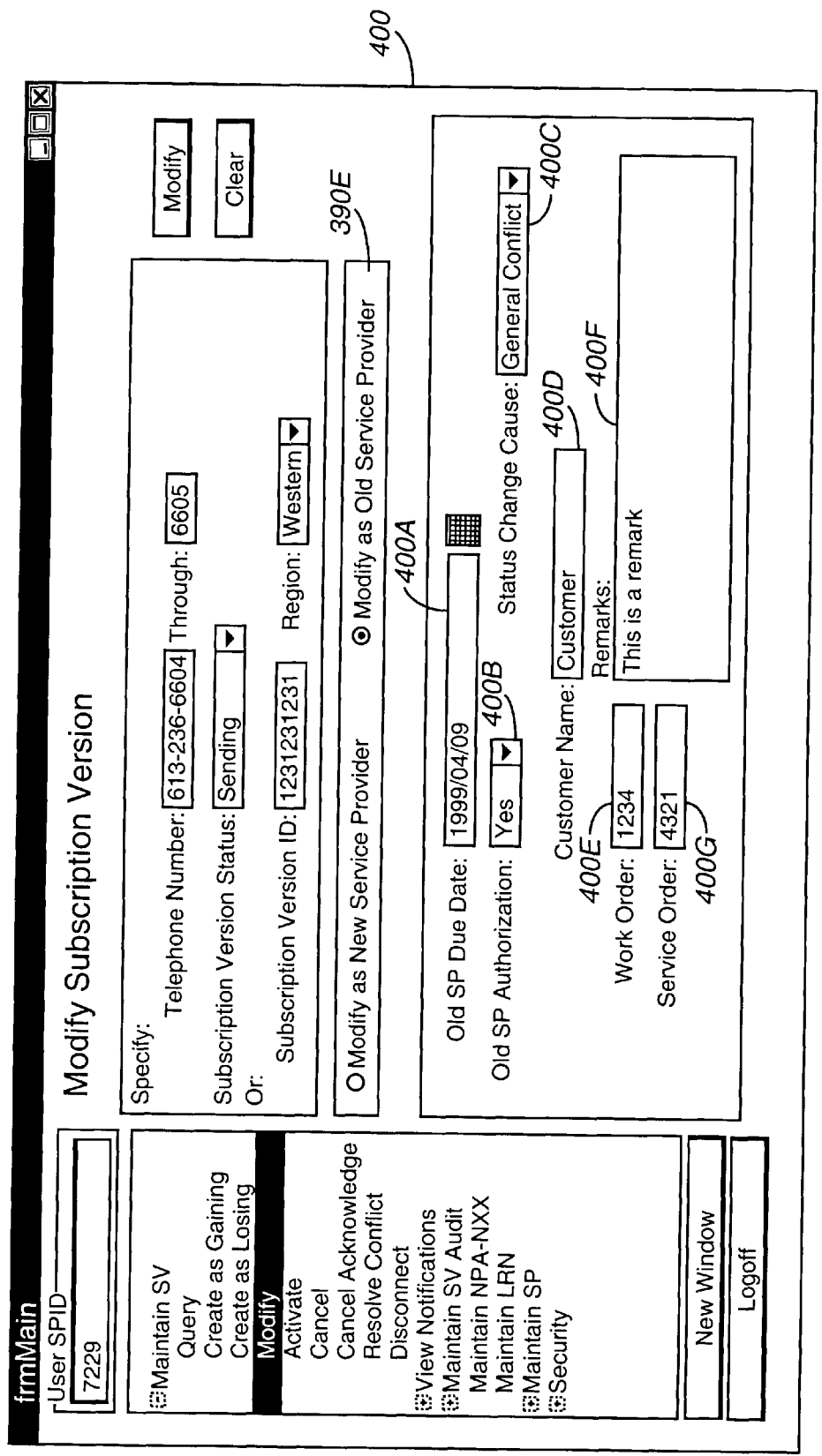

In the preferred embodiment, the Modify SV function 178 of the LNP GUI 124, when a user belonging to the Subscription Version's old service provider requests to modify the Subscription Version via selection buttons 390E, accepts from the user changes to, for example, the following information in addition to the information previously discussed with respect to screen 390 as shown in screen 400 of FIG. 4N: (a) a Old SP Due Date 400A, (b) Old SP Authorization drop down list 400B, (c) a Status Change Cause code drop down list 400C, (d) a Customer Name 400D, (e) a Work Order number 400E, (f) Remarks 400F, and (g) a Service Order number 400G.

In the preferred embodiment, the Modify SV function 178 of the LNP GUI 124, validates that the Subscription Version Status 390J is "pending", or "conflict." The status validation is performed, for example, against the local SOA 72, not the NPAC 74. There is typically no need to check the NPAC 74 since, if the SV didn't pass the edit against the local SOA 72, but would have passed the edit against the NPAC 74, then there is a discrepancy between the SOA 72 and NPAC 74 which in any case needs to be corrected.

Cancel SV Function 180

Figure 4O:
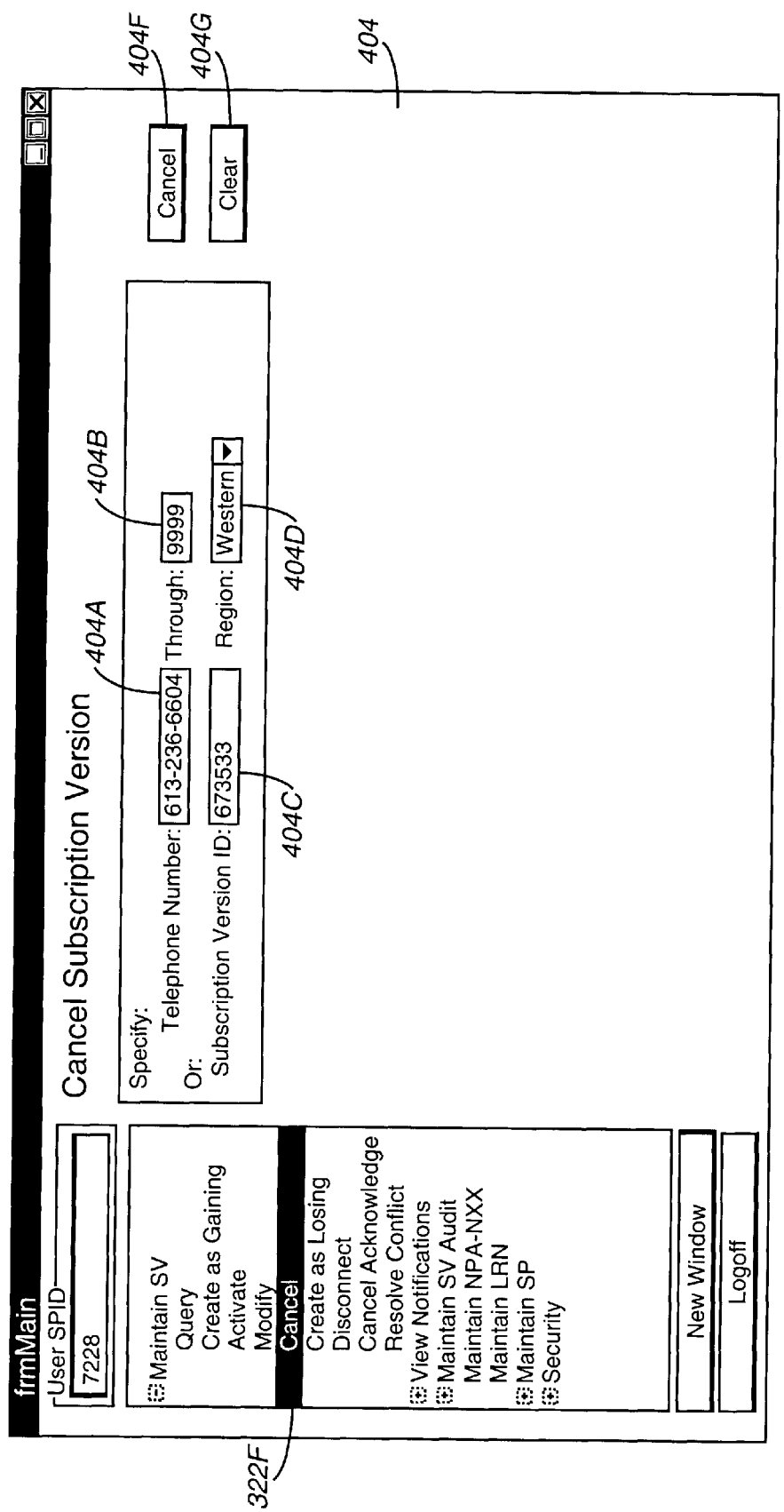

The following discussion describes the features of the preferred embodiment of the LNP GUI 124 Cancel SV function 180. When a user selects the Cancel hierarchical list item 322f corresponding to the Cancel SV function 180 of the LNP GUI 124, the screen 404 as shown, for example, in FIG. 4O is generated by the LNP GUI 124.

In the preferred embodiment, the Cancel SV function 180 of the LNP GUI 124, for example, cancels Subscription Versions of ported telephone numbers. A subscription version can be canceled prior to activation or when a disconnection is pending (i.e., rescind a "disconnect" action).

Cancel SV Function 180 Features

In the preferred embodiment, the Cancel SV function 180 of the LNP GUI 124, for example, accepts a user request to cancel a subscription version. To identify a subscription version to be cancelled, the LNP GUI 124 allows the user to, for example: (a) select a specific TN from a list, or (b) select a contiguous block of TNs from a list, or (c) specify the following information as shown in Cancel Subscription Version screen 404 of FIG. 4O: (i) Telephone Number Start 404A, (ii) Telephone Number End 404B, (iii) Subscription Version ID 404C, and (iv) Region Indicator drop down list 404D. The screen 404 further includes, for example, a Cancel button 404F to initiate cancellation, and a Clear button 404G to clear the entered values.

In the preferred embodiment, the Cancel SV function 180 of the LNP GUI 124, for example, performs the following validations on information supplied by the user: (a) Either Telephone Number Start 404A or Subscription Version ID 404C plus Region Indicator 404D must be supplied; and (b) the LNP GUI 124 validates that the Subscription Version status is "pending", "conflict", or "disconnect-pending." The status validation is, for example, performed against the local SOA 72, not the NPAC 74.

In the preferred embodiment, the Cancel SV function 180 of the LNP GUI 124, for example, prompts the user to confirm the cancellation of the specified subscription version.

Disconnect SV Function 182

Figure 4P:
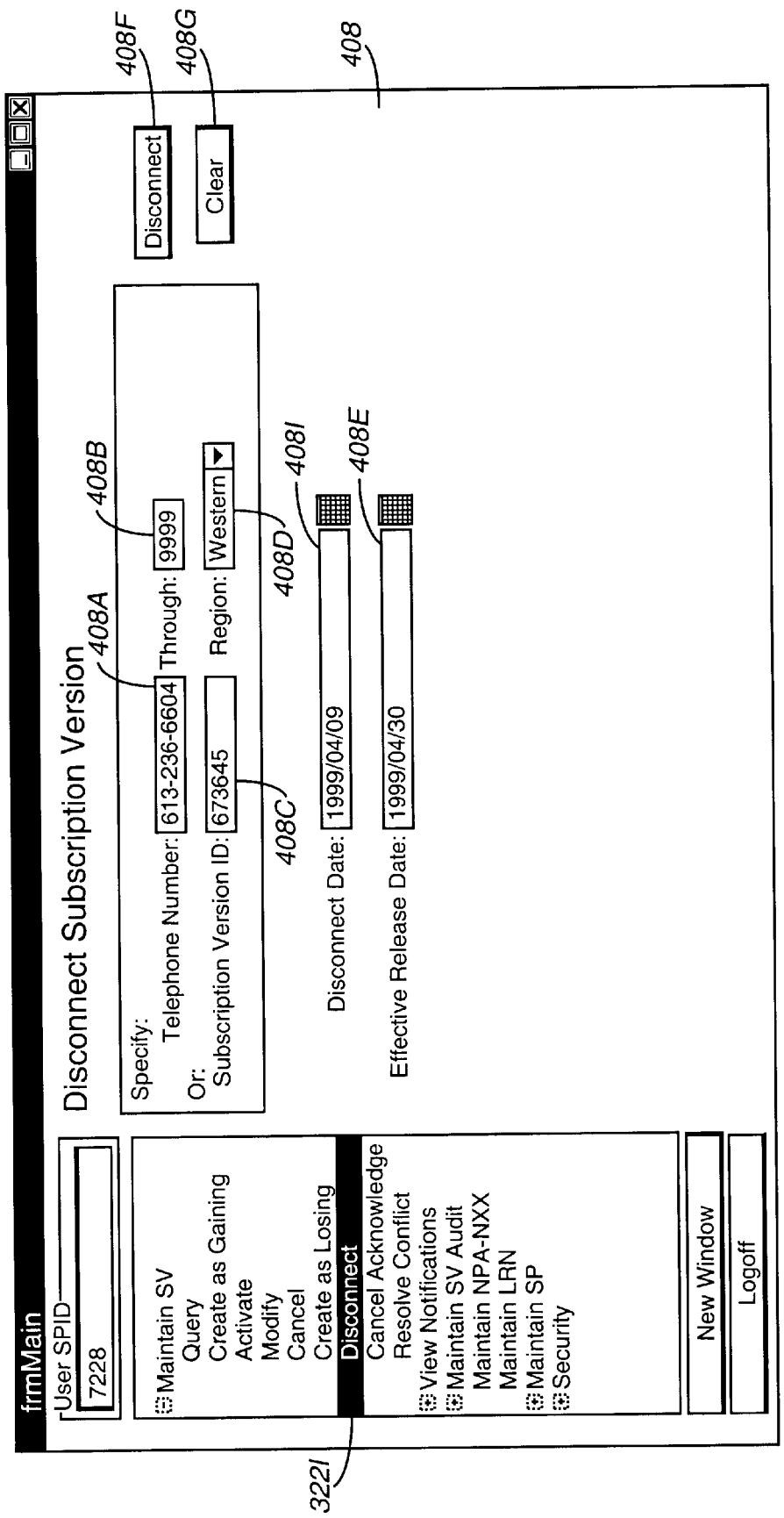

The following discussion describes the features of the preferred embodiment of the LNP GUI 124 Disconnect SV function 182. When a user selects the Disconnect hierarchical list item 322i corresponding to the Disconnect SV function 182 of the LNP GUI 124, the screen 408 as shown, for example, in FIG. 4P is generated by the LNP GUI 124.

In the preferred embodiment, the Disconnect SV function 182 of the LNP GUI 124, for example, disconnects Subscription Versions of ported telephone numbers. A subscription version can be disconnected once it has been activated.

Disconnect SV Function 182 Features

In the preferred embodiment, the Disconnect SV function 180 of the LNP GUI 124, for example, accepts a user request to disconnect a subscription version. To identify a subscription version to be disconnected, the LNP GUI 124 allows the user to, for example: (a) select a specific TN from a list, or (b) select a contiguous block of TNs from a list, or (c) specify the following information as shown in Disconnect Subscription Version screen 408 of FIG. 4P: (i) Telephone Number Start 408A, (ii) Telephone Number End 408B, (iii) Subscription Version ID 408C, and (iv) Region Indicator drop down list 408D. The screen 408 further includes, for example, fields for a Disconnect Date 408J, an Effective Release Date 408E, a Disconnect button 408F to initiate disconnection, and a Clear button 408G to clear the entered values.

In the preferred embodiment, the Disconnect SV function 180 of the LNP GUI 124, to disconnect a subscription version, accepts the following information from the user: (a) the Disconnect Date 408J; and (b) the Effective Release Date 408E. A Force If Not Activated Indicator, as found in a previous GUI is not included in the LNP GUI 124. This was a previous NPSM 126 kludge: if coordination of disconnect cleanup activities was not in sync, such that a user cleaned up or reset the TN record on the NRM first, then the user went into NPSM 126 to disconnect from NPAC 30, user did not want to see/hear/be stopped by a TN status error from NRM (see, e.g., NPSM User's Guide, section 3.4.3 The Force Feature, D0036-1.0).

In the preferred embodiment, the Disconnect SV function 182 of the LNP GUI 124, for example, performs the following validations on information supplied by the user: (a) Either Telephone Number Start 408A or Subscription Version ID 408C plus Region Indicator 408D must be supplied.

In the preferred embodiment, the Disconnect SV function 182 of the LNP GUI 124, for example, prompts the user to confirm the disconnect of the specified subscription version. The LNP GUI 124, for example, depends on NPAC 30 to validate that the Subscription Version status is "active." This is because if the SOA 48 indicated otherwise, and the customer is disconnecting anyway, there is little point in fixing the SOA 48.

Acknowledge Cancellation Function 184

Figure 4Q:
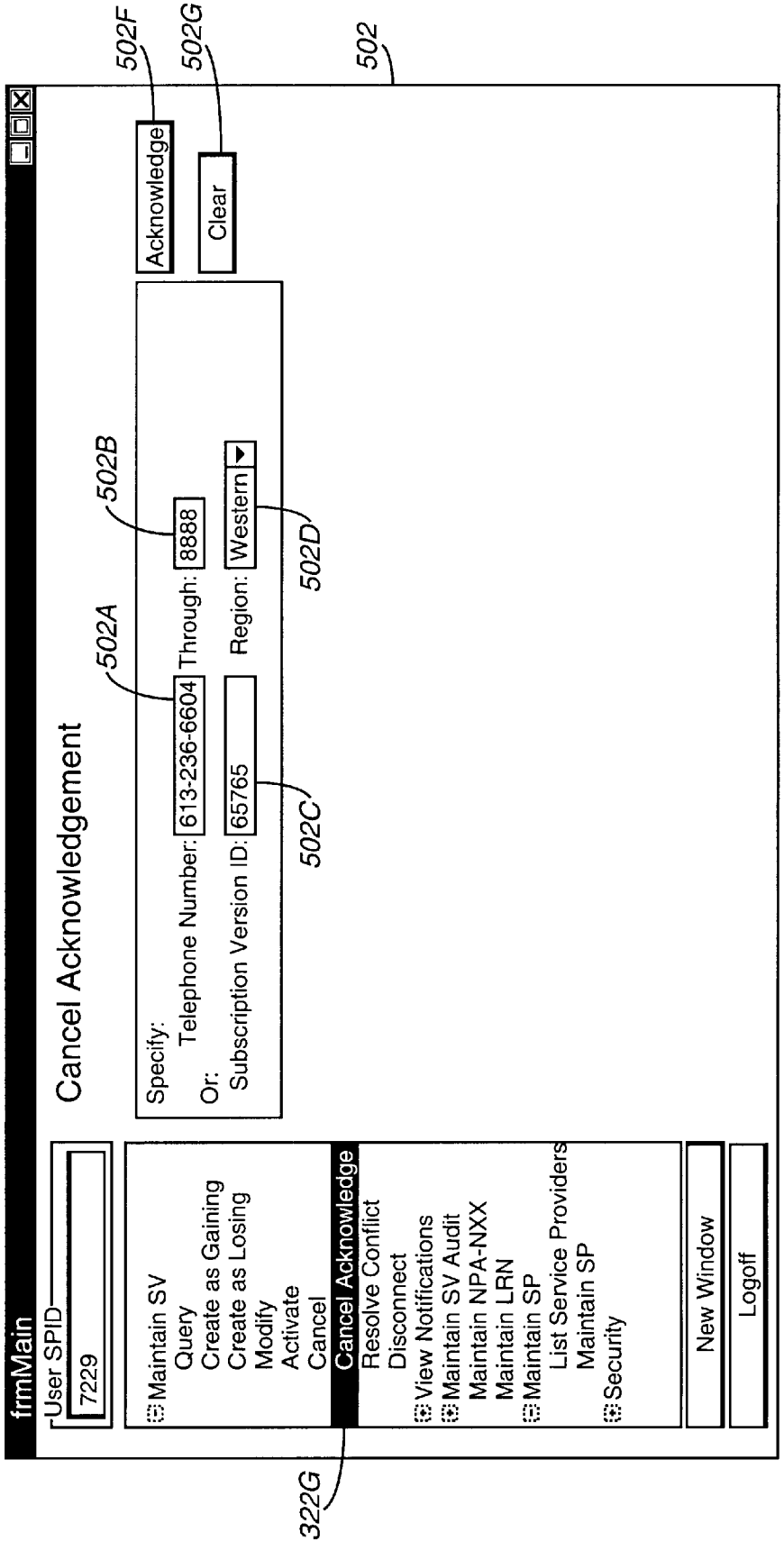

The following discussion describes the features of the preferred embodiment of the LNP GUI 124 Acknowledge Cancellation function 184. When a user selects the Cancel Acknowledge hierarchical list item 322g corresponding to the Acknowledge Cancellation function 184 of the LNP GUI 124, the screen 502 as shown, for example, in FIG. 4Q is generated by the LNP GUI 124.

In the preferred embodiment, the Acknowledge Cancellation function 184 of the LNP GUI 124, for example, acknowledges cancellation of a subscription version for a ported telephone number. Service providers can acknowledge cancellation of a subscription version having a status of "Cancel-Pending."

Acknowledge Cancellation Function 184 Features

In the preferred embodiment, the Acknowledge Cancellation function 184 of the LNP GUI 124, for example, accepts a user request to acknowledge the cancellation of a Subscription Version. To identify a subscription version for which to acknowledge a cancellation, the LNP GUI 124 allows the user to, for example: (a) select a specific TN from a list, or (b) select a contiguous block of TNs from a list, or (c) specify the following information as shown in Cancel Acknowledgment screen 502 of FIG. 4Q: (i) Telephone Number Start 502A, (ii) Telephone Number End 502B, (iii) Subscription Version ID 502C, and (iv) Region Indicator drop down list 502D. The screen 502 further includes, an Acknowledge button 502F to initiate acknowledgment, and a Clear button 502G to clear the entered values.

In the preferred embodiment, the Acknowledge Cancellation function 184 of the LNP GUI 124, for example, performs the following validations on information supplied by the user: (a) Either Telephone Number Start 502A or Subscription Version ID 3502C plus Region Indicator 502D must be supplied; and (b) the LNP GUI 124 validates that the Subscription Version status is "cancel-pending." The status validation is, for example, performed against the local SOA 72, not the NPAC 74.

Resolve Conflict Function 186

Figure 4R:
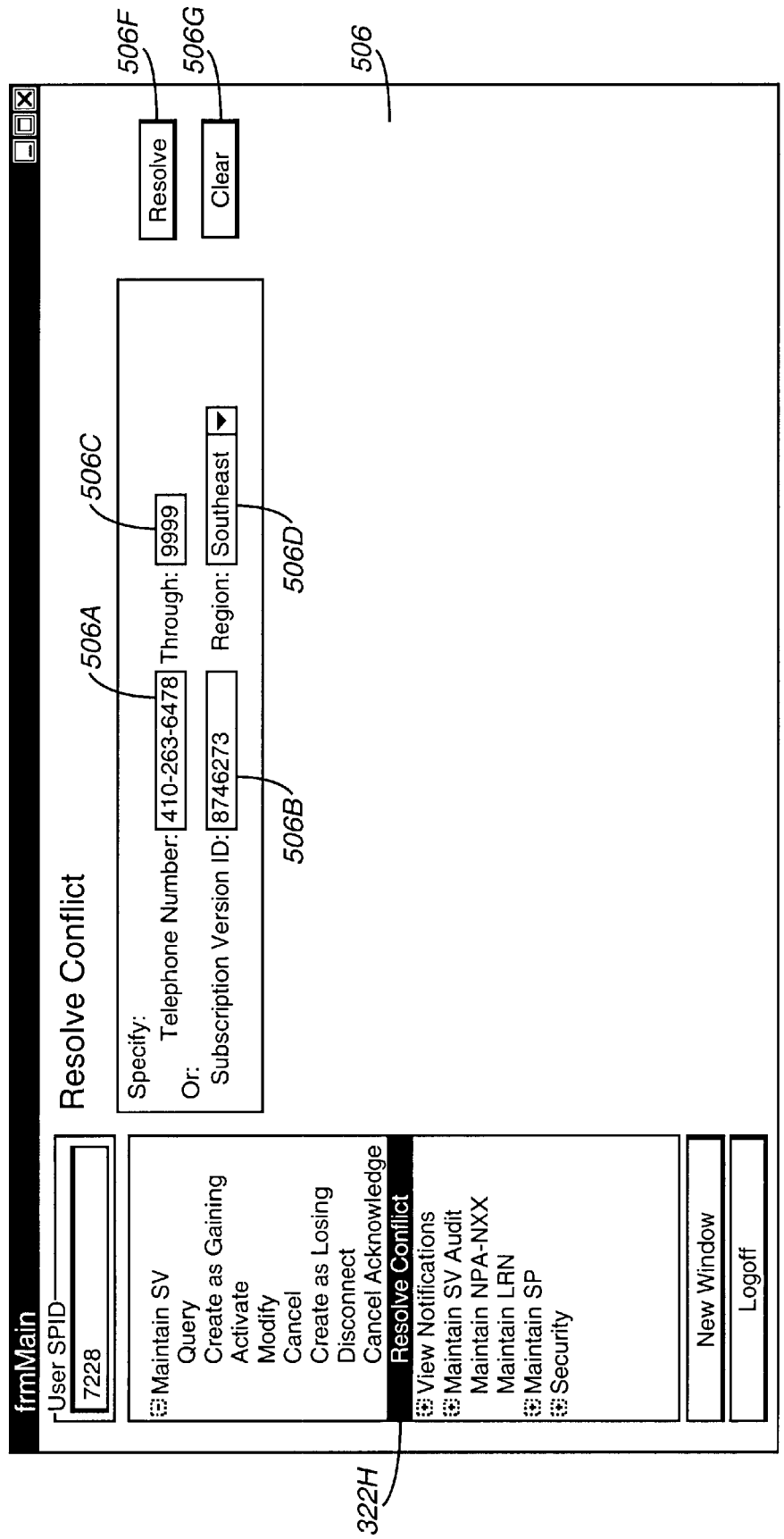

The following discussion describes the features of the preferred embodiment of the LNP GUI 124 Resolve Conflict function 186. When a user selects the Resolve Conflict hierarchical list item 322h corresponding to the Resolve Conflict function 186 of the LNP GUI 124, the screen 506 as shown, for example, in FIG. 4R is generated by the LNP GUI 124.

In the preferred embodiment, the Resolve Conflict function 186 of the LNP GUI 124, for example, removes subscription versions of ported telephone numbers from conflict. Subscription versions can be placed in conflict due to explicit non-concurrence by the old service provider, and due date mismatch between the old and new service providers.

Resolve Conflict Function 186 Features

In the preferred embodiment, the Resolve Conflict function 186 of the LNP GUI 124, for example, accepts a user request to acknowledge the cancellation of a Subscription Version. To identify a subscription version for which to acknowledge a cancellation, the LNP GUI 124 allows the user to. for example: (a) select a specific TN from a list, or (b) select a contiguous block of TNs from a list, or (c) specify the following information as shown in Resolve Conflict screen 506 of FIG. 4R: (i) Telephone Number Start 506A, (ii) Telephone Number End 506B, (iii) Subscription Version ID 506C, and (iv) Region Indicator drop down list 506D. The screen 506 further includes, for example, a Resolve button 506F to initiate resolution, and a Clear button 506G to clear the entered values.

In the preferred embodiment, the Resolve Conflict function 186 of the LNP GUI 124, for example, performs the following validations on information supplied by the user: (a) Either Telephone Number Start 506A or Subscription Version ID 506C plus Region Indicator 506D must be supplied; and (b) the LNP GUI 124 validates that the Subscription Version status is "conflict." The status validation is, for example, performed against the local SOA 72, not the NPAC 74.

Resolve Conflict by Old SP

In another embodiment, the Resolve Conflict function 186 of the LNP GUI 124, when a user belonging to the Subscription Version's old service provider requests to resolve conflict for the Subscription Version, may accept from the user changes to, for example, the following optional information: (a) Old SP Due Date (not shown), (b) Old SP Authorization (not shown), and (c) Status Change Cause Code (not shown). The Resolve Conflict function 186 of the LNP GUI 124 clears the Status Change Cause Code (not shown) if the Old SP Authorization (not shown) value is changed to Y (1).

Resolve Conflict by New SP

In another embodiment, the Resolve Conflict function 186 of the LNP GUI 124, when a user belonging to the Subscription Version's new service provider requests to resolve conflict for the Subscription Version, may accept from the user changes to, for example, the following optional information: (a) New SP Due Date (not shown).

Maintain Network Function 152 Features

Figure 4S:
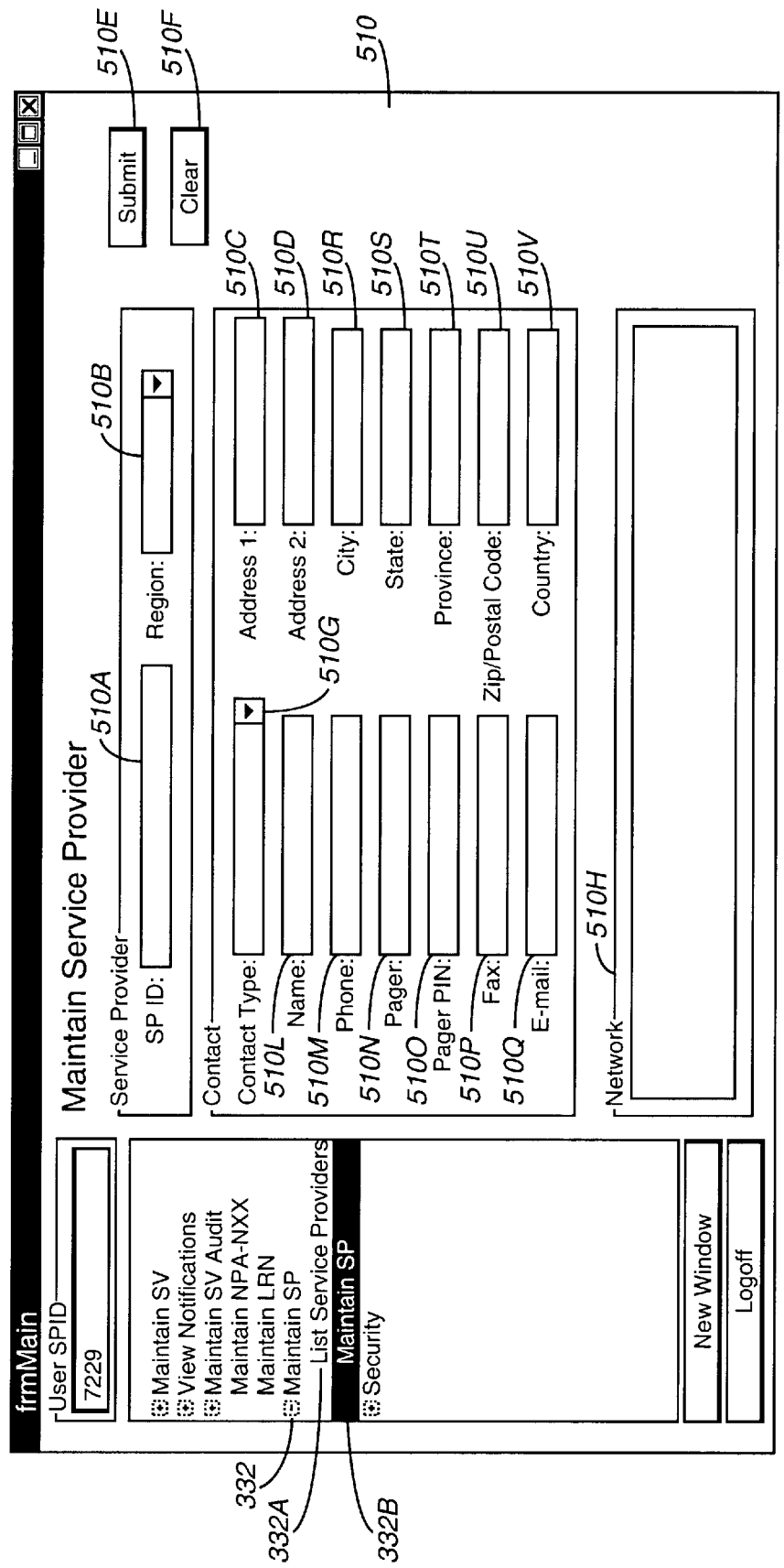

The following discussion describes the features of the preferred embodiment of the LNP GUI 124 Maintain Network function 152 for maintaining network information (e.g., service provider, NPA-NXX, and LRN data). When a user selects the Maintain SP hierarchical list 332 corresponding to the Maintain Network function 152 of the LNP GUI 124, the Maintain Service Provider screen 510 as shown, for example, in FIG. 4S is generated by the LNP GUI 124.

Maintain SP Function 154

In the preferred embodiment, the Maintain SP function 154 of the LNP GUI 124, for example, maintains service provider information via the Maintain SP hierarchical list item 332b.

Query a SP Function 162

In the preferred embodiment, the Query SP function 162 of the LNP GUI 124, for example, enables users to query the SOA 48 for detailed information for their own Service Provider. When the user initiates a Service Provider query via a Submit button 510E, the LNP GUI 124 displays, for example, the following information for the user's Service Provider in Network screen 510H: (a) Service Provider ID (not shown); (b) Service Provider Name (not shown); (c) Effective Time Stamp (not shown); (d) Creation Time Stamp (not shown); (e) System Information in another embodiment via the user selecting a System drop down list (not shown) for each of the following: (i) SOA, (ii) LSMS, and (iii) NPAC SMS; (e) Contact Information via the user selecting Contact Type drop down list 510G for each of the following: (i) Service Provider, (ii) Network, (iii) Billing, (iv) Web, (v) Repair Center, (vi) Operations, (vii) Local SMS, (viii) SOA System Interface, (ix) User Administration, (x) Conflict Resolution, and (xi) Security.

In the preferred embodiment, the Query SP function 162 of the LNP GUI 124 displays to the user, for example, the following information: (a) transport layer service access point address (TSAP) (not shown), (b) session layer service access point address (SSAP) (not shown), (c) presentation layer service access point address (PSAP) (not shown), and (d) network layer service access point (NSAP) (not shown).

In the preferred embodiment, the Query SP function 162 of the LNP GUI 124 the Contact Information displayed to the user includes, for example, the following information: (a) Contact Name 510; (b) Contact Phone 510M; (c) Contact Pager Number 510N; (d) Contact Pager Pin 510O; (e) Contact Fax 510P; (f) Contact Email Address 510Q; (g) Contact Address 1 510C; (h) Contact Address 2 510D; (I) Contact City 510R; (j) Contact State 510S; (k) Contact Province 510T; (l) Contact Zipcode 510U; and (k) Contact Country 510V.

The service provider screen 510 also includes, for example, the Submit button 510E to initiate the operation, a Clear button 510F to clear the entered values, a Service Provider ID 510A, and a Region ID drop down list 510B.

Modify SP Function 160

In the preferred embodiment, the Modify SP function 160 of the LNP GUI 124, for example, enables users to modify the detailed Service Provider information for their own Service Provider. When the user wishes to modify a Service Provider, in another embodiment the LNP GUI 124 accepts, for example, the following optional information from the user: (a) System Information via the user selecting System drop down list (not shown) for each of the following: (i) SOA, (ii) LSMS and (iii) NPAC SMS; and (b) Contact Information via the user selecting Contact Type drop down list 510G for each of the following: (i) Service Provider, (ii) Network, (iii) Billing, (iv) Web, (v) Repair Center, (vi) Operations, (vii) Local SMS, (viii) SOA System Interface, (ix) User Administration, (x) Conflict Resolution, and (xi) Security.

In the another embodiment, the Modify SP function 160 of the LNP GUI 124 accepts, for example, the following System Information: (a) TSAP (not shown), (b) SSAP (not shown), (c) PSAP (not shown), and (d) NSAP (not shown).

In the preferred embodiment, the Modify SP function 160 of the LNP GUI 124 accepts, for example, the following Contact Information as shown in Maintain Service Provider screen 510 of FIG. 4S via the Maintain SP hierarchical list item 332b:(a) a Contact Name 510L; (b) a Contact Phone 510M; (c) a Contact Pager Number 510N; (d) a Contact Pager Pin 510O;(e) a Contact Fax 510P; (f) a Contact Email Address 510Q; (g) a first Contact Address 510C; (h) a second Contact Address 510D; (i) a Contact City 510R; (j) a Contact State 510S; (k) a Contact Province 510T; (k) a Contact Zip/Postal Code 510U; and (k) a Contact Country 510V. The Maintain Service Provider screen 510 also includes, for example, the Submit button 510E to initiate maintenance, and a Clear button 510F to clear the entered values.

List Service Providers

In the preferred embodiment, the Maintain SP function 154 of the LNP GUI 124, for example, produces a list of Service Providers as found within the IBAR 86 and/or thenetwork service provisioning system (NSPS) via the List Service Providers hierarchical list item 332a.

The Maintain SP function 154 of the LNP GUI 124, for example, enables the user to display a list of all Service Providers define d within the IBAR 86 vi a the user selecting the List Service Providers hierarchical list item 332a in the Maintain Service Provider screen 510 of FIG. 4S. The LNP GUI 124 then displays, for example, the following information for each Service Provider as shown in List Service Providers screen 514 of FIG. 4T: (a) Service Provider ID 514A; (b) Service Provider Name 514B, (c) Region 514C, and (d) Date and time of query 514D. The List Service Providers screen 514 also includes, for example, a Print button 514E for printing the query results, and a horizontal scroll bar 514F. The LNP GUI 124 offers the user the option to, for example, sort the Service Providers in ascending alphabetical order by Service Provider Name 514B, by Service Provider ID 514A or by Region 514C and displays the Service Providers in the specified sort order. This can be accomplished, for example, by clicking on the Service Provider Name 514B, the Service Provider ID 514A or Region 514C.

Refresh SOA Service Provider Information

In the another embodiment, the Maintain SP function 154 of the LNP GUI 124, for example, enables the user to refresh all of the SOA 48 Service Provider information from the NPAC 30 via the user selecting a Refresh SOA button (not shown) in the Maintain Service Provider screen 510 of FIG. 4S. The Maintain SP function 154 of the LNP GUI 124, for example, enables the user to initiate a Service Provider refresh request to NPAC 30, to provide updated Service Provider information to the SOA 48.

Maintain NPA-NXX Function 156

The following discussion describes the features of the preferred embodiment of the LNP GUI 124 Maintain NPA-NXX function 156 for maintaining NPA-NXX network information. When a user selects the Maintain NPA-NXX hierarchical list 328 corresponding to the Maintain NPA-NXX function 156 of the LNP GUI 124, the Maintain NPA-NXX screen 520 as shown, for example, in FIG. 4U is generated by the LNP GUI 124.

Figure 4U:
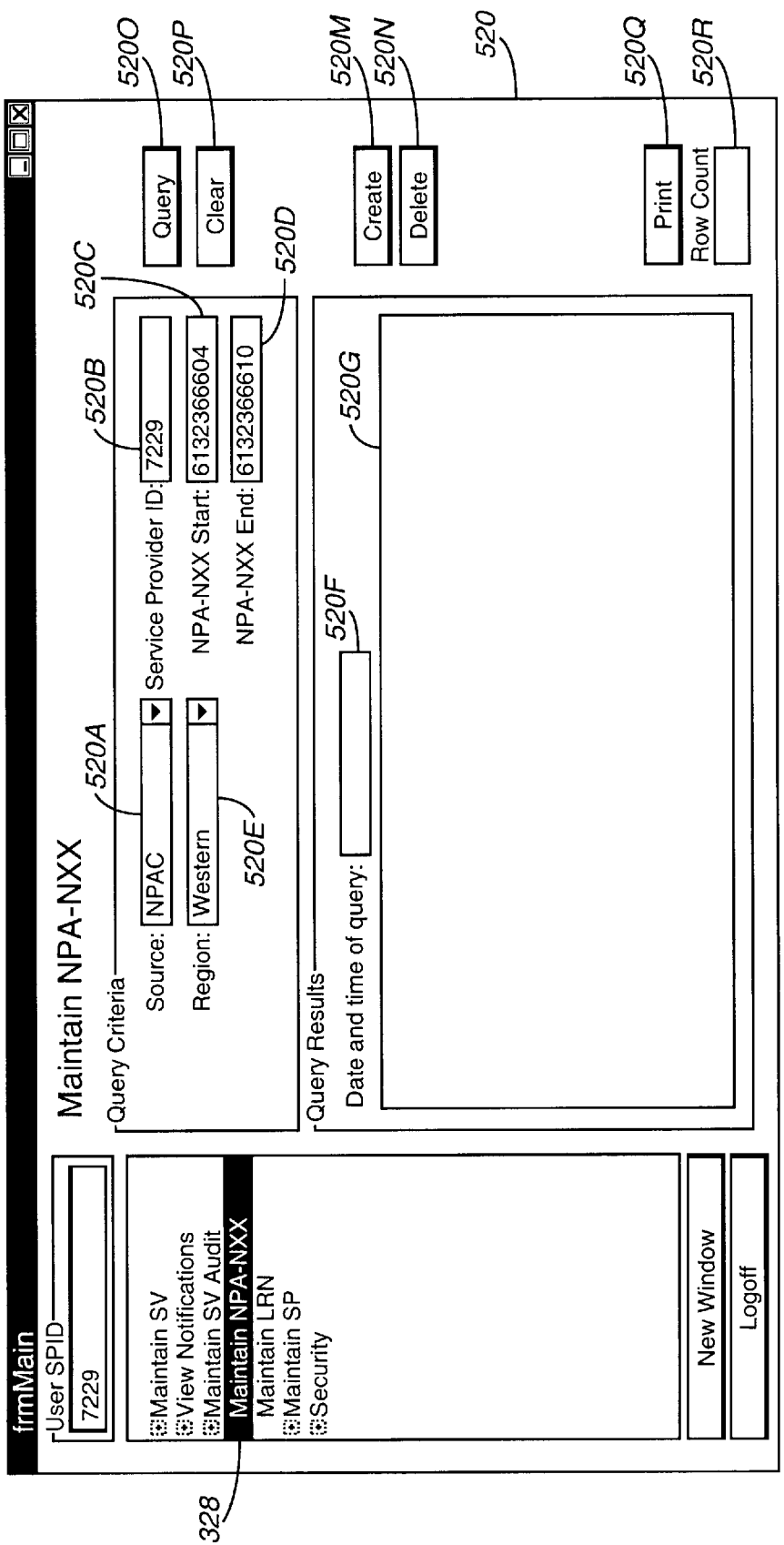

In the preferred embodiment, the Maintain NPA-NXX function 156 of the LNP GUI 124, for example, maintains portable NPA-NXXs associated with a service provider and is shown, for example, in the Maintain NPA-NXX screen 520 of FIG. 4U.

Query NPA-NXX Function 168

In the preferred embodiment, the Query NPA-NXX function 168 of the LNP GUI 124, for example, enables a user to specify that the information be obtained from one of the following sources selected by the user via Source drop down list 520A as shown, for example, in the Maintain NPA-NXX screen 520 of FIG. 4U: (a) Local SMS 74; and (b) NPAC 74. The Query NPA-NXX function 168 of the LNP GUI 124 accepts, for example, the following selection criteria from the user: (a) Service Provider ID 520B; (b) NPA-NXX Start 520C; (c) NPA-NXX End 520D; and (d) Region Indicator drop down list 520E (e.g., typically required for NPAC 74 queries only).

In the preferred embodiment, when the user initiates an NPA-NXX query via the Query button 520O, the Query NPA-NXX function 168 of the LNP GUI 124 displays, for example, the following information for each NPA-NXX which meets the specified selection criteria in the Query Results window 520G: (a) Date and time of query 520F; (b) Service Provider Id (not shown); (c) Service Provider Name (not shown); (d) NPA-NXX (not shown); (e) NPA NXX ID (not shown); (f) Effective Time Stamp (not shown); (g) Creation Time Stamp (not shown); and (h) Creation User ID (not shown) (e.g., for local query only).

In the preferred embodiment, the Query NPA-NXX function 168 of the LNP GUI 124 displays the NPA-NXXs in, for example, ascending order by the following: (a) Service Provider ID (not shown); and (b) NPA-NXX (not shown). The Maintain NPA-NXX screen 520 further includes, for example the Query button 520O to initiate the query, a Clear button 520P to clear the entered values, a Create button 520M, a Delete button 520N, a Print button 520Q for printing the query results and a Row Count indicator 520R to indicate the number of rows in the query results.

Create an NPA-NXX Function 164

Figure 4V:
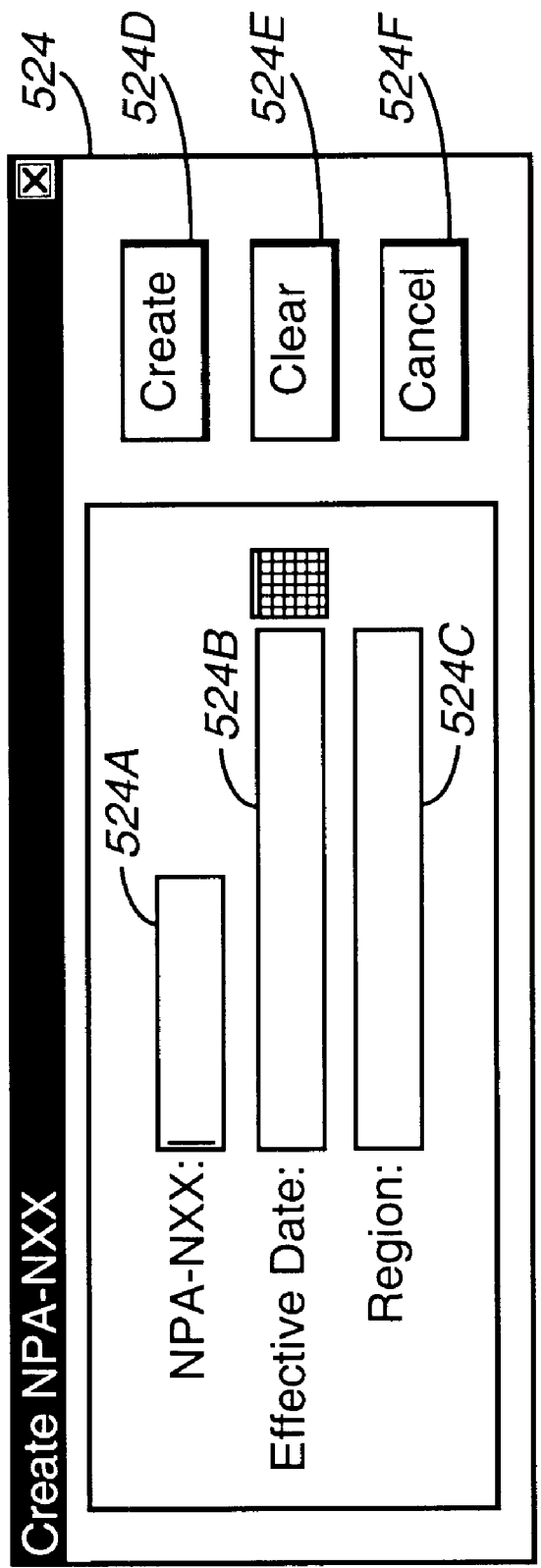

In the preferred embodiment, the Create NPA-NXX function 164 of the LNP GUI 124, to create an NPA-NXX, accepts, for. example, the following information from the user as shown in Create NPA-NXX screen 524 of FIG. 4V via the user selecting the Create Button 520M: (a) NPA-NXX 524A; (b) Effective Time Stamp 524B; and (c) Region 524C. The Create NPA-NXX screen 524 further includes, for example, a Create button 524D to initiate creation, a Clear button 524E to clear the entered values, and a Cancel Button 524F to cancel creation.

Delete an NPA-NXX Function 166

In the preferred embodiment, the Delete NPA-NXX function 166 of the LNP GUI 124, to identify an NPA-NXX for deletion the user, for example, can: (a) Select a specific NPA-NXX from the Query Results window 520G, or (b) Specify the NPA-NXX. The user completes the deletion by selecting the Delete button 520N and the LNP GUI 124, for example, prompts the user via a confirmation screen (not shown) to confirm the deletion of the specified NPA-NXX. The majority of NPA-NXX deletes typically stem from NPA Splits which are performed by NPAC 30. Consequently, Delete NPA-NXX activity by a Service Provider should be minimal.

Maintain LRN Function 158

The following discussion describes the features of the preferred embodiment of the LNP GUI 124 Maintain LRN function 158 for maintaining LRN network information.

Figure 4W:
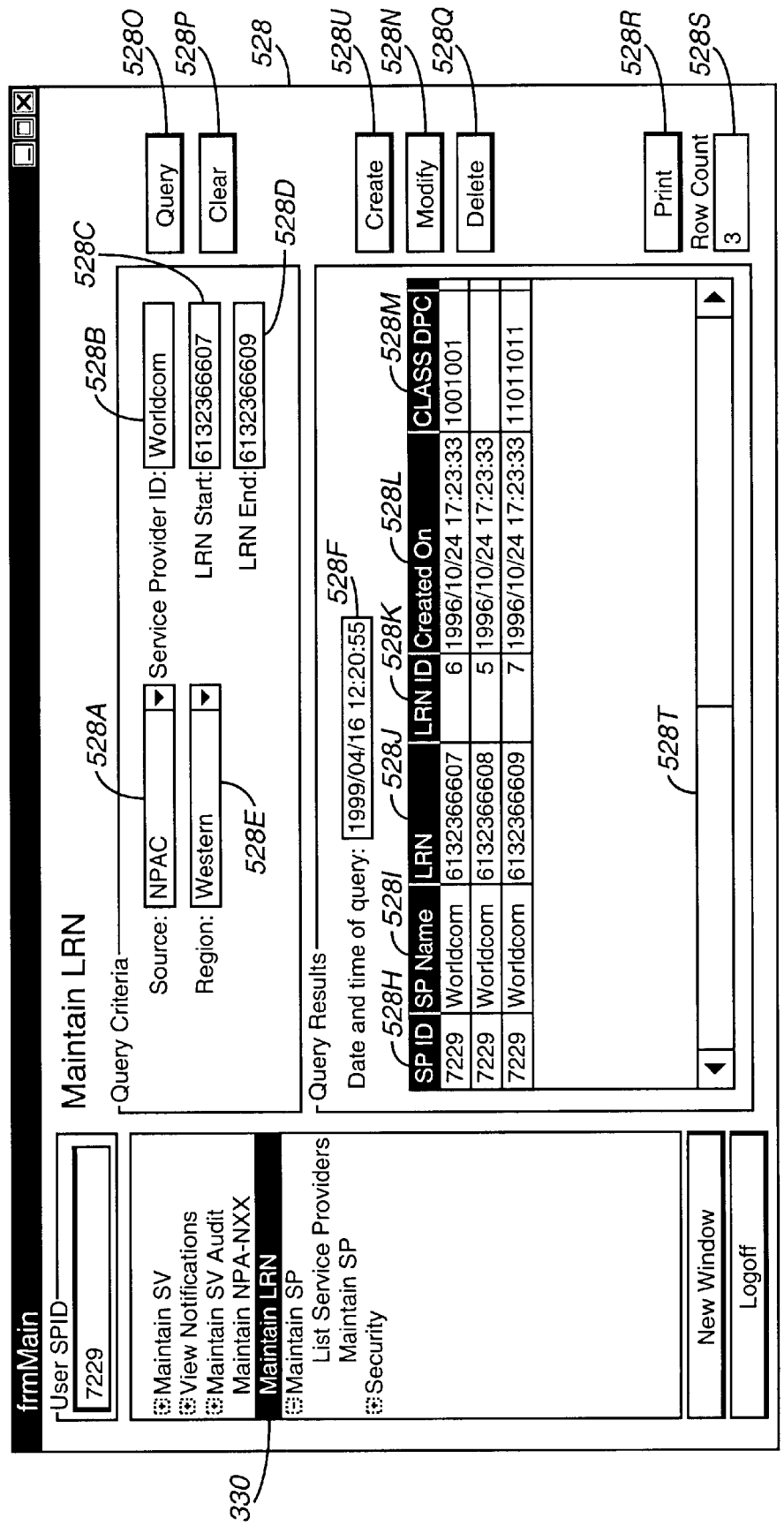

When a user selects the Maintain LRN hierarchical list 330 corresponding to the Maintain LRN function 158 of the LNP GUI 124, the Maintain LRN screen 528 as shown, for example, in FIG. 4W is generated by the LNP GUI 124.

In the preferred embodiment. the Maintain LRN function 158 of the LNP GUI 124, for example, maintains portable LRNs associated with a service provider and is shown, for example, in the Maintain LRN screen 528 of FIG. 4W.

Query LRN Function 174

In the preferred embodiment, the Query LRN function 222 of the LNP GUI 124, for example, enables a user to specify that the information be obtained from one of the following sources selected by the user via Source drop down list 528A as shown, for example, in the Maintain LRN screen 528 of FIG. 4W: (a) Local SMS 74; and (b) NPAC 74. The Query LRN function 222 of the LNP GUI 124 accepts, for example, the following selection criteria from the user: (a) Service Provider ID drop down list 528B; (b) LRN Start 528C; (c) LRN End 528D; and (d) Region Indicator drop down list 528E (e.g., typically required for NPAC 74 queries only).

In the preferred embodiment, when the user initiates an LRN via a query Query button 528O, the Query LRN function 222 of the LNP GUI 124 displays, for example, the following information for each LRN which meets the specified selection criteria in the Query Results window 528G: (a) Date and time of query 528F; (b) Service Provider Id 528H; (c) Service Provider Name 528I; (d) LRN 528J; (e) LRN ID 528K; (f) Creation Time Stamp 528L; (g) Creation User ID (not shown, e.g., for local query only); (h) Class DPC 528M (e.g., for local query only); (h) Class SSN (not shown, e.g., for local query only); (i) LIDB DPC (not shown, e.g., for local query only); 0) LIDB SSN (not shown, e.g., for local query only); (k) CNAM DPC (not shown, e.g., for local query only); (l) CNAM SSN (not shown, e.g., for local query only); (m) ISVM DPC (not shown, e.g., for local query only); and (n) ISVM SSN (not shown, e.g., for local query only).

In the preferred embodiment, the Query LRN function 168 of the LNP GUI 124 displays the LRNs in, for example, ascending order by the following: (a) Service Provider ID 528H; and (b) LRN 528J. The Maintain LRN screen 528 further includes, for example, the Query button 528O to initiate the query, a Clear button 528P to clear the entered values, a Create button 528U, a Modify button 528N, a Delete button 528Q, a Print button 528R for printing the query results, a Row Count indicator 528S to indicate the number of rows in the query results, and a horizontal scroll bar button 528T.

Create LRN Function 170

Figure 4X:
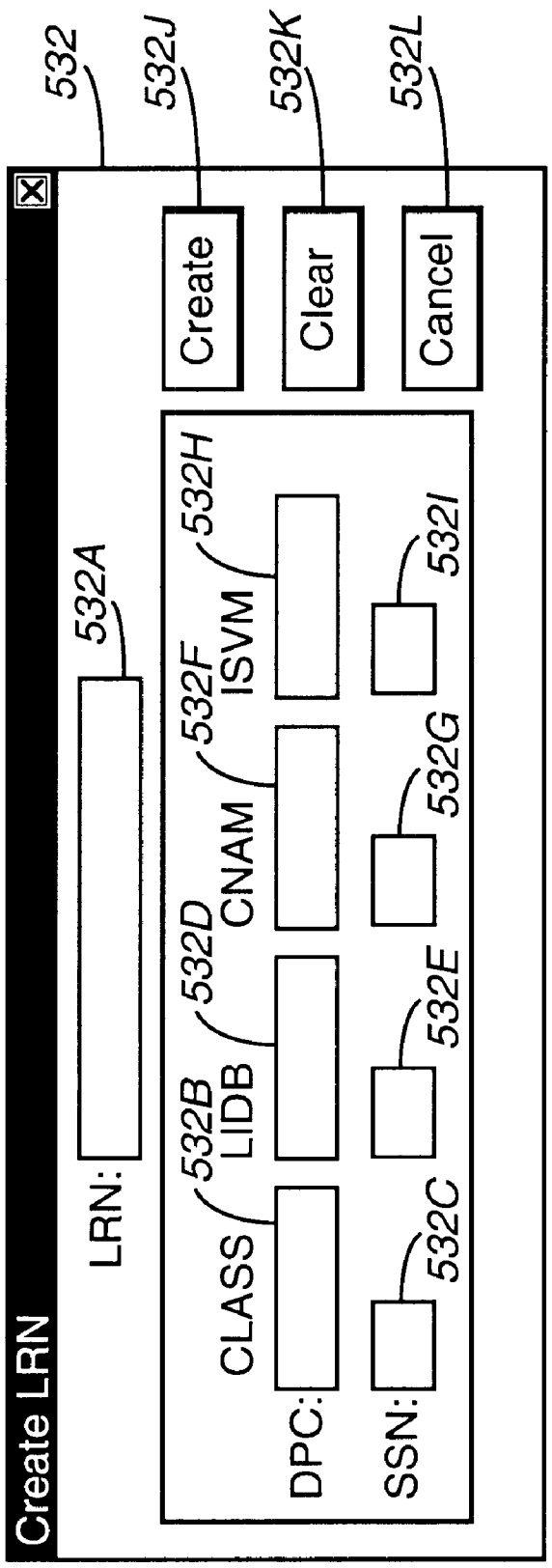

In the preferred embodiment, the Create LRN function 218 of the LNP GUI 124, to create an LRN, accepts, for example, the following information from the user as shown in Create LRN screen 532 of FIG. 4X via the user selecting the Create Button 528U: (a) LRN 532A; (b) Class DPC 532B; (c) Class SSN 532C; (d) LIDB DPC 532D; (e) LIDB SSN 532E; (f) CNAM DPC 532F; (g) CNAM SSN 532G; (h) ISVM DPC 532H; and (i) ISVM SSN 532I. In the preferred embodiment, elements (b) to (i) above are stored, for example, locally and not on the NPAC 30. The Create LRN screen 532 further includes, for example, a Create button 532J to initiate creation; a Clear button 532K to clear the entered values, and a Cancel Button 524L to cancel creation.

Delete LRN Function 220

In the preferred embodiment, the Delete LRN function 220 of the LNP GUI 124, to identify a LRN for deletion the user, for example, can: (a) Select a specific LRN from the Query Results window 528G, or (b) Specify the LRN or LRN range. The user completes the deletion by selecting a Delete button 528Q and the LNP GUI 124, for example, prompts the user via a confirmation screen (not shown) to confirm the deletion of the specified LRN.

Reconcile with NPAC Function 208

Figure 4Y:
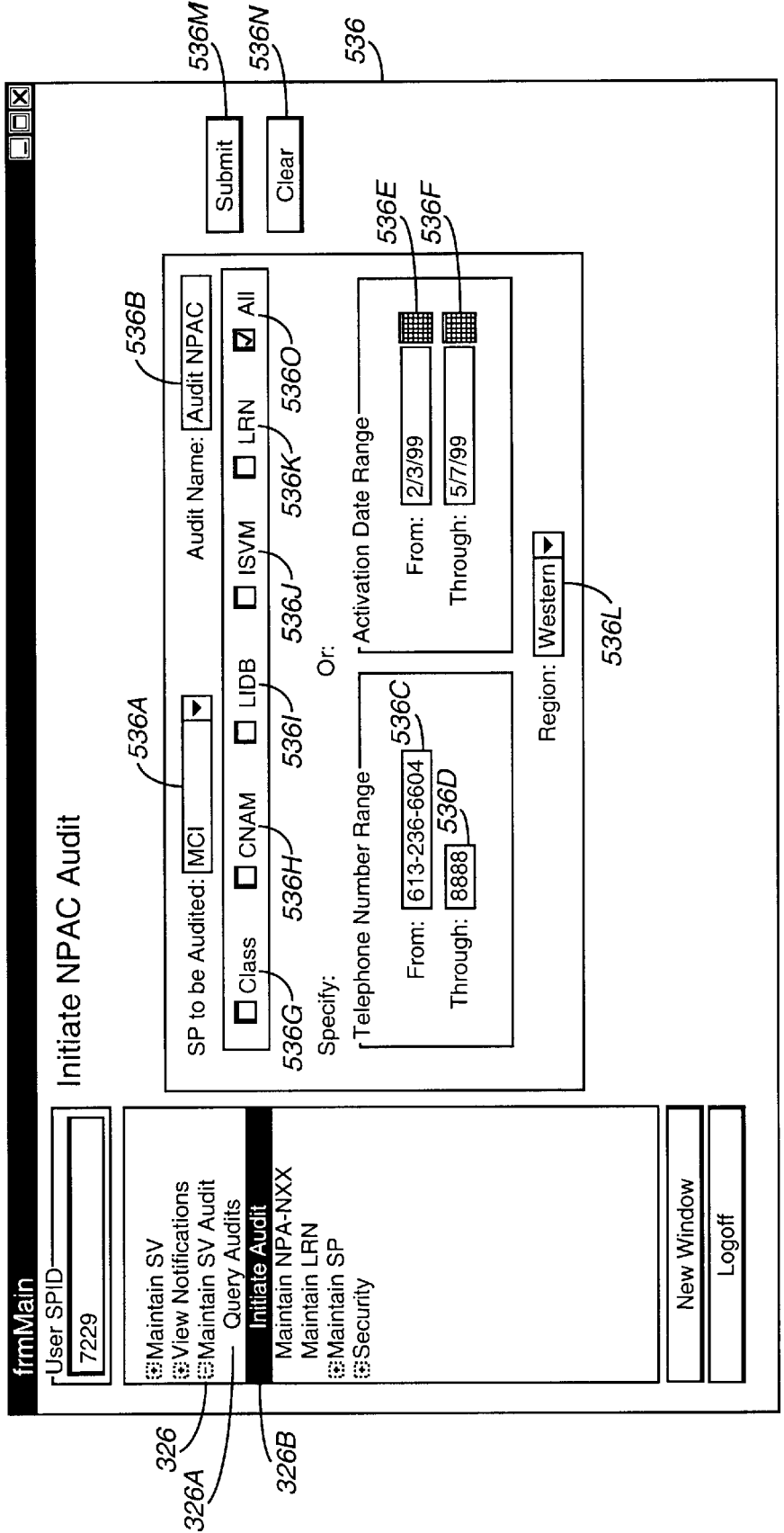

The following discussion describes the features of the preferred embodiment of the LNP GUI 124 Reconcile with NPAC function 208. When a user selects the Initiate Audit hierarchical list item 326b of the Maintain SV Audit hierarchical list 326 corresponding to the Reconcile with NPAC function 208 of the LNP GUI 124, the Initiate NPAC Audit screen 536 as shown, for example, in FIG. 4Y is generated by the LNP GUI 124.

In the preferred embodiment, the Reconcile with NPAC function 208 of the LNP GUI 124 includes, for example, the Initiate Audit function 210, the Cancel Audit function 212, the Query Audit Status function 214, and the View Audit Details function 216 and relates to initiating and canceling audit requests and displaying the audit results. An audit request is sent to the NPAC/SMS 30 to determine if there are any discrepancies between LNP data stored on the NPAC 74 and that stored on the local SMS 74. If any discrepancies are found, the NPAC 74 makes the appropriate changes on the local SMS 74.

Initiate Audit Function 210 Features

In the preferred embodiment, the Initiate Audit faction 210 of the LNP GUI 124, for example, initiates and sends audit requests to the NPAC/SMS 30 via the Initiate Audit hierarchical list item 326b.

In the preferred embodiment, the Initiate Audit function 210, to initiate an audit request to the NPAC 74, accepts, for example, the following information from the user as shown in Initiate NPAC Audit screen 536 of FIG. 4Y: (a) Service Provider to be audited drop down list 536A; (b) Audit Name 536B; (c) Telephone Number Start 536C; (d) Telephone Number End 536D; (e) Activation Start Time 536E; (f) Activation End Time 536F; (g) indicators for, for example, the following in the audit: (i) Class 536G, (ii) CNAM 536H, (iii) LIDB 536I, (iv) ISVM 536J, (v) LRN 536K, and (vii) All fields selector 536O; and (h) Region Indicator drop down list 536L. The Initiate NPAC Audit screen 536 further includes, for example, a Submit button 536M for initiating the audit request for information supplied by the user and a Clear button 536N to clear the entered values.

In the preferred embodiment, the Initiate Audit function 210 of the LNP GUI 124, for example, performs the following validations on information supplied by the user:. (a) Audit Name 536B must be supplied; (b) one or both of the following ranges must be supplied: (i) Telephone Number Start and End 536C, 536D, and (ii) Activation Start and End Time Stamps 536E, 536F and Region Indicator 536L.

In the preferred embodiment, for example, the audited Service Provider ID/Name 536A for the Initiate Audit function 210 must be supplied.

In the preferred embodiment, the Initiate Audit function 210, for example, sets the following defaults when the information for these fields is not supplied by the user: (a) Audit Name 536B defaults to the user's User Id concatenated with the current date; (b) Activation Start Time Stamp 536E defaults to Jan. 1, 1995; (c) Activation End Time Stamp 536F defaults to current date and time; (d) the audit will include all of the following LNP attributes if none of these has been individually specified by the user: (i) Class 536G, (ii) CNAM 536H, (iii) LIDB 536I, (iv) ISVM 536J, and (v) LRN 536K; and (e) the audited Service Provider ID/Name 536A defaults to the logged on user's configured Service Provider ID and the name associated with it.

In the preferred embodiment, the Initiate Audit function 210, for example, informs the user that the audit was successfully initiated and displays the Audit ID, and Service Provider ID and Name (not shown).

In the preferred embodiment, the Initiate Audit function 210, for example, allows the user to select the Service Provider to audit from the Service Provider ID/Name drop down list 376A that contains all Service Provider ID's and a value of "ALL" (not shown).

Query Audit Status Function 214 Features

In the preferred embodiment, the Query Audit Status function 214 of the LNP GUI 124, for example, performs a query to display a list of audit requests that have been sent to the NPAC/SMS 30 via the Query Audits hierarchical list item 326a.

Figure 4Z:
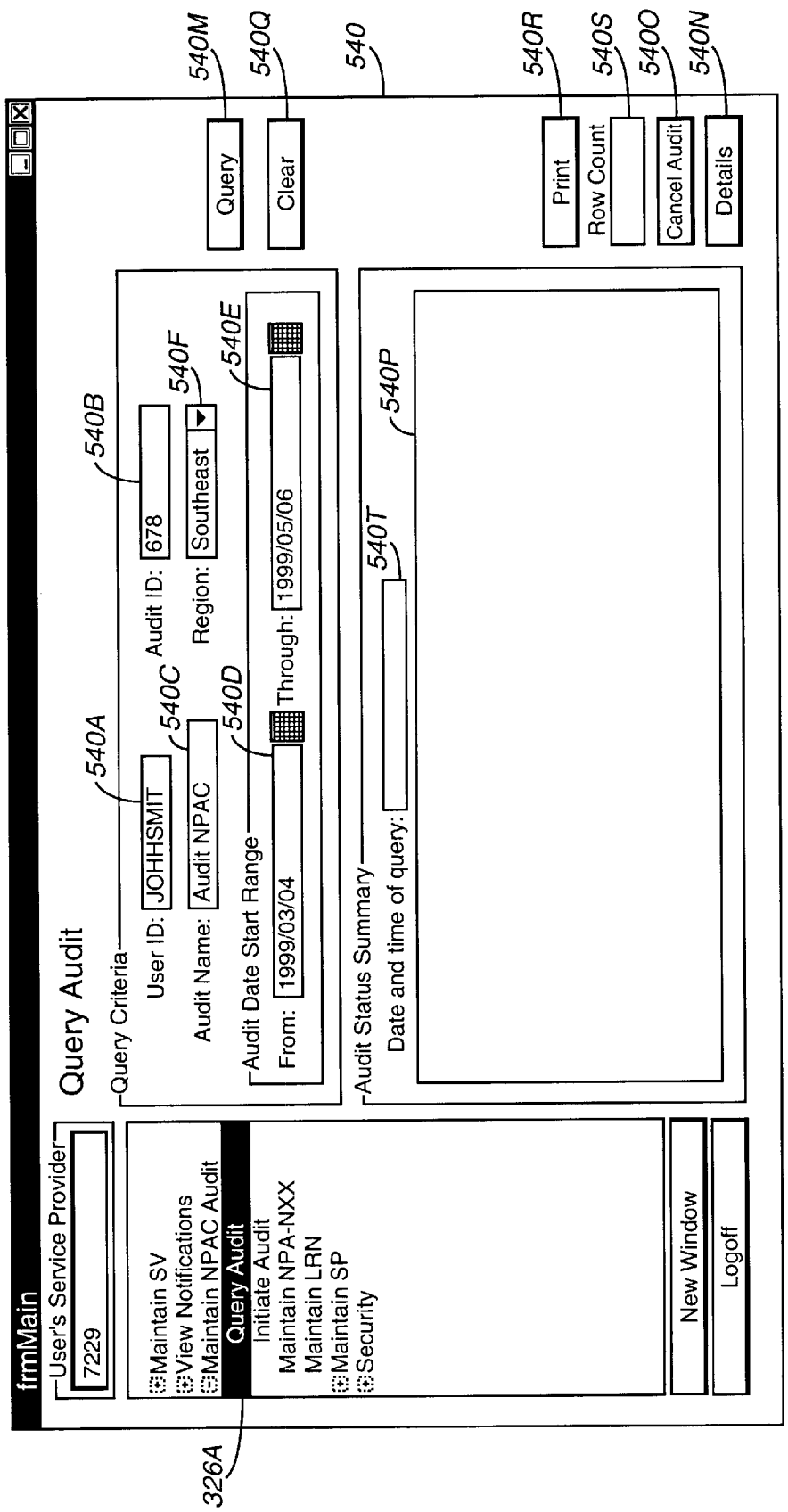
Figure 4A:
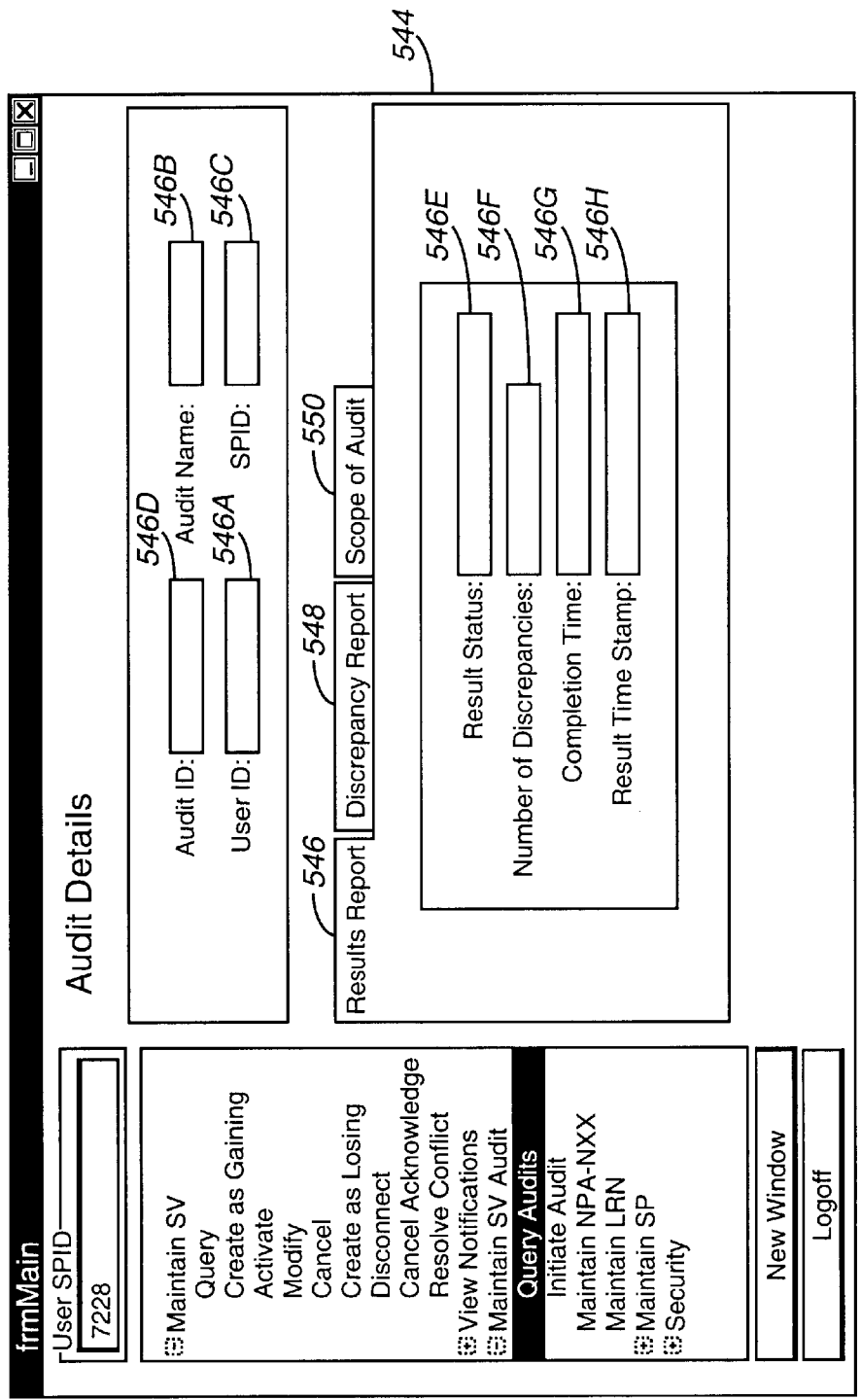
Figure 4A:
Figure 4B:
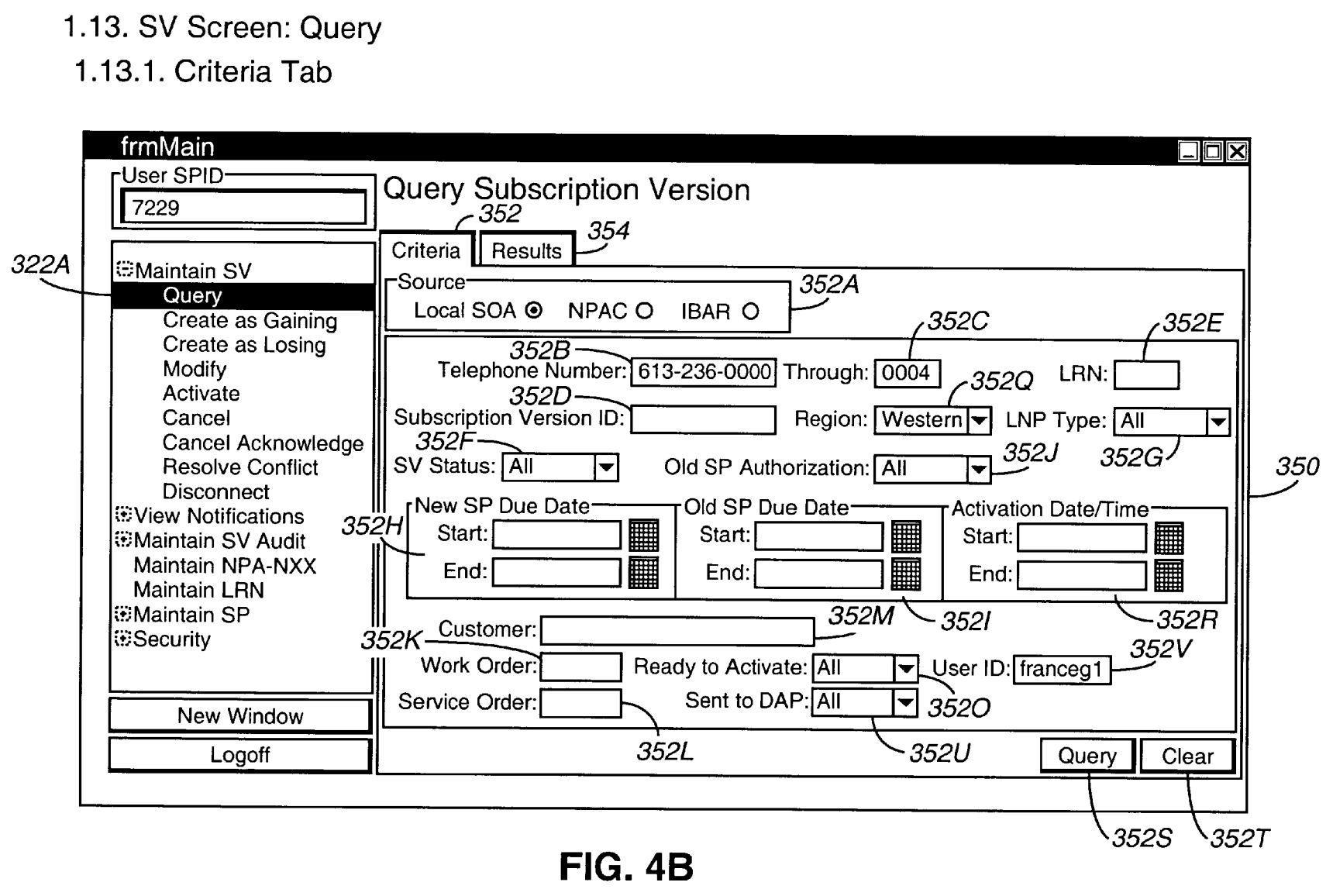
Figure 4F:
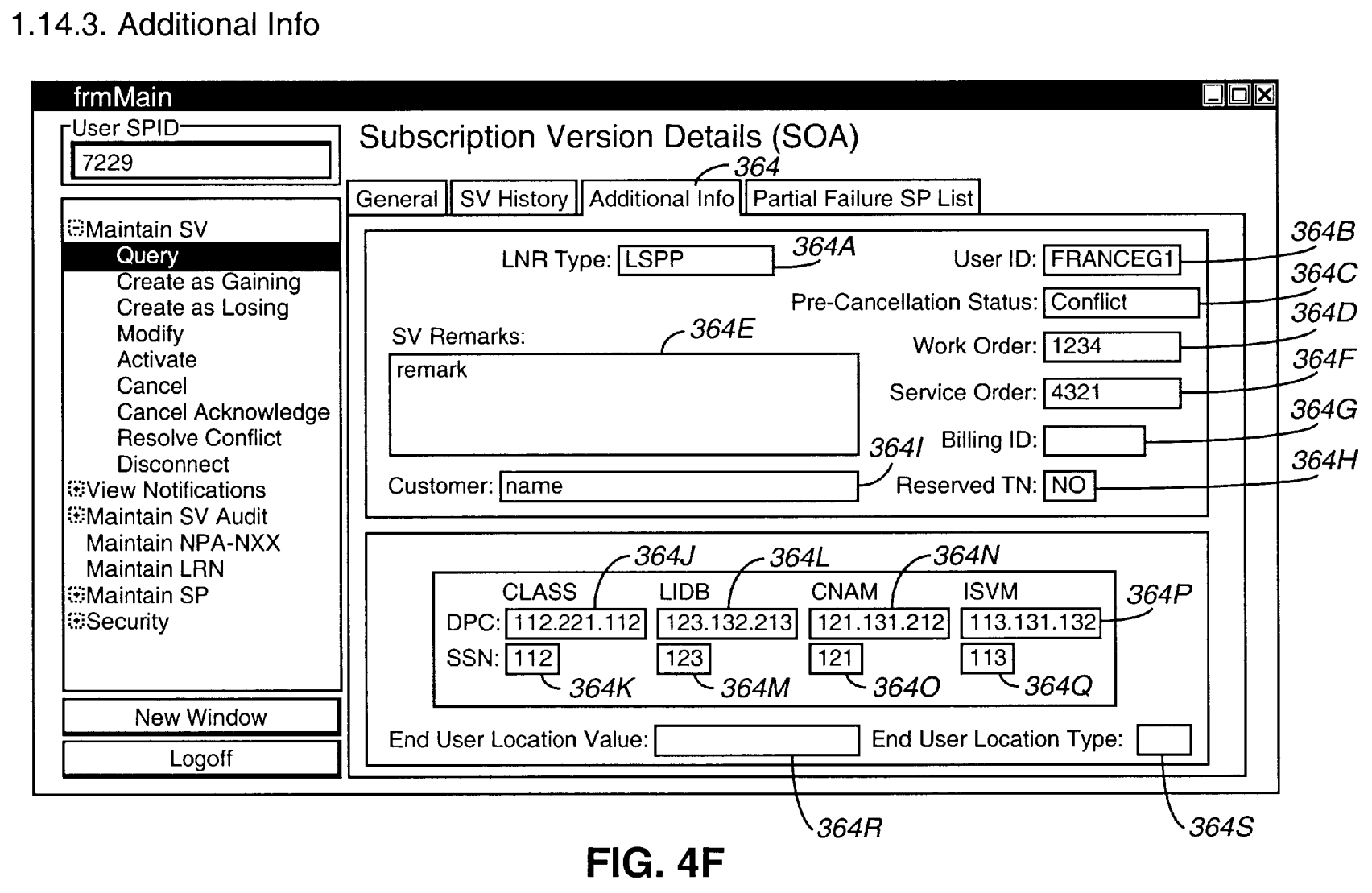
Figure 4I:
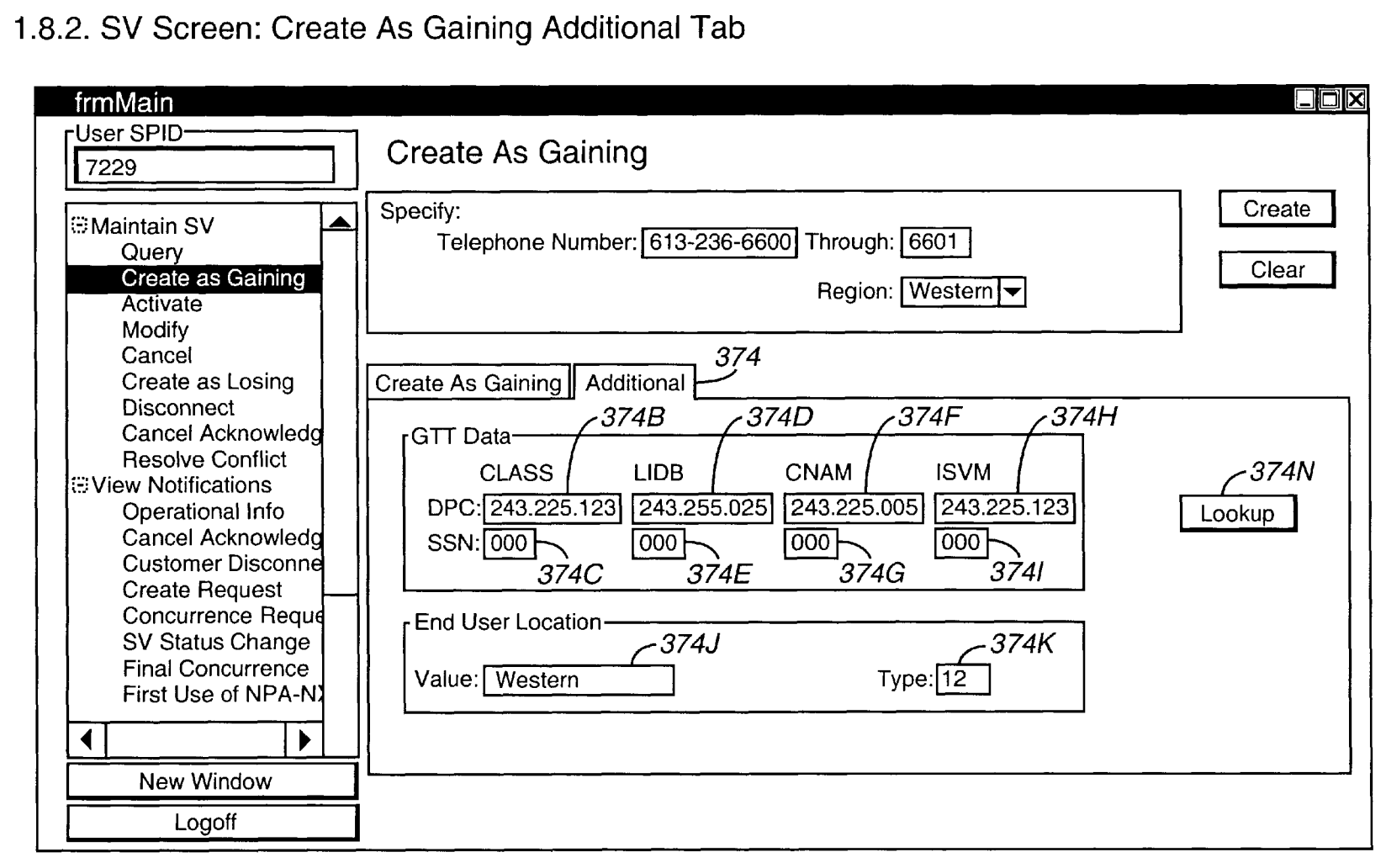
Figure 4A:
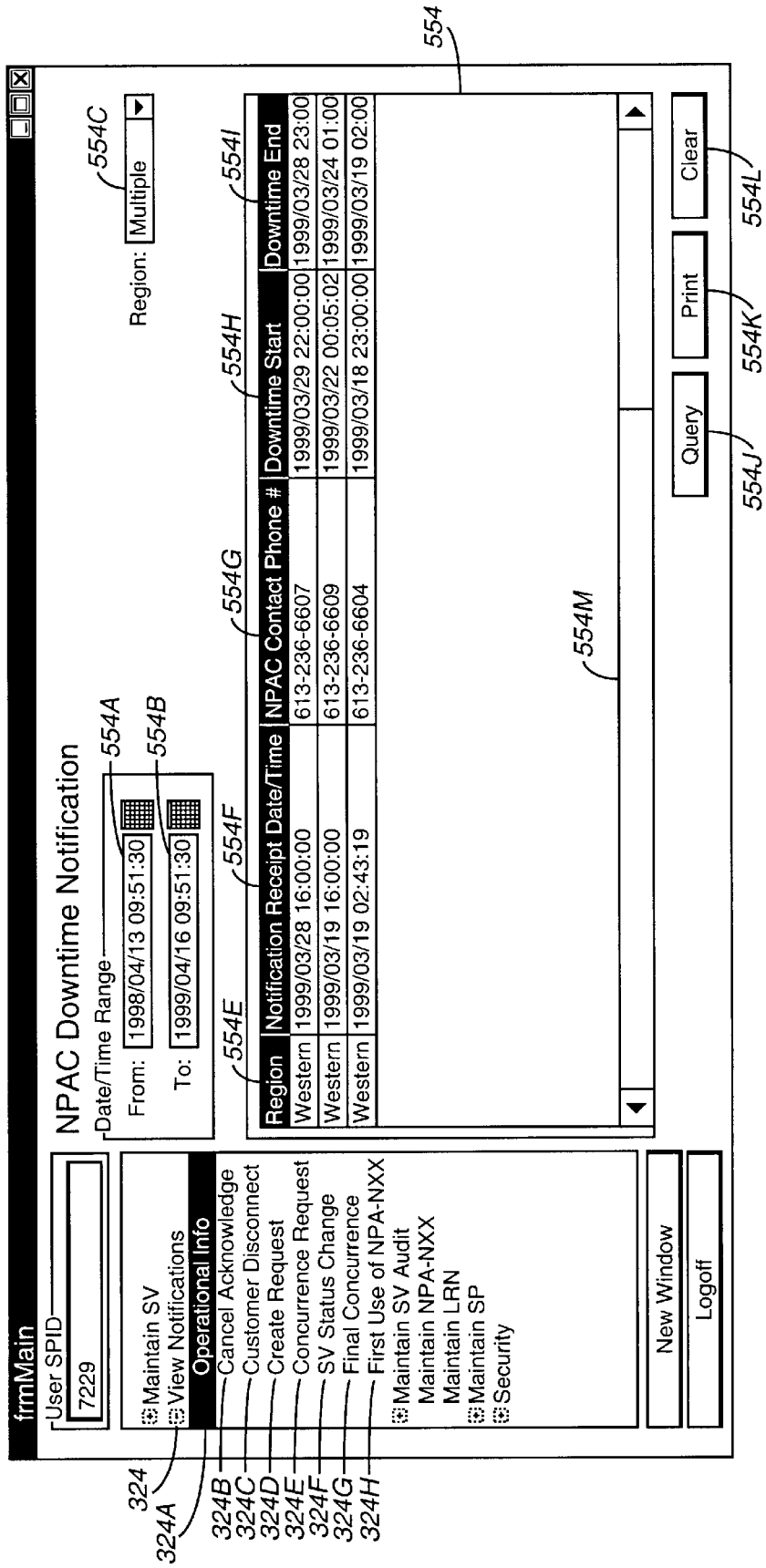
Figure 4A:
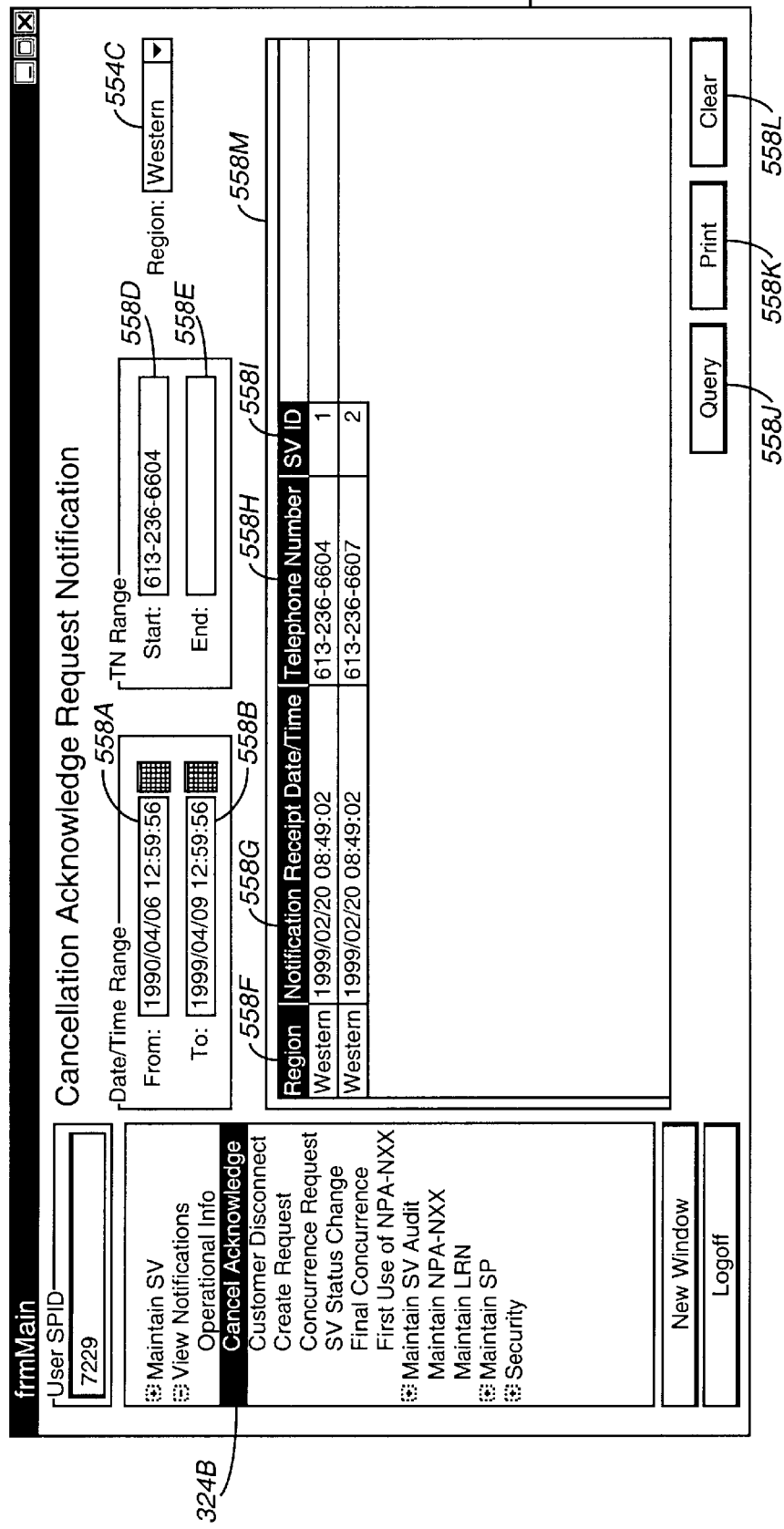
Figure 4A:
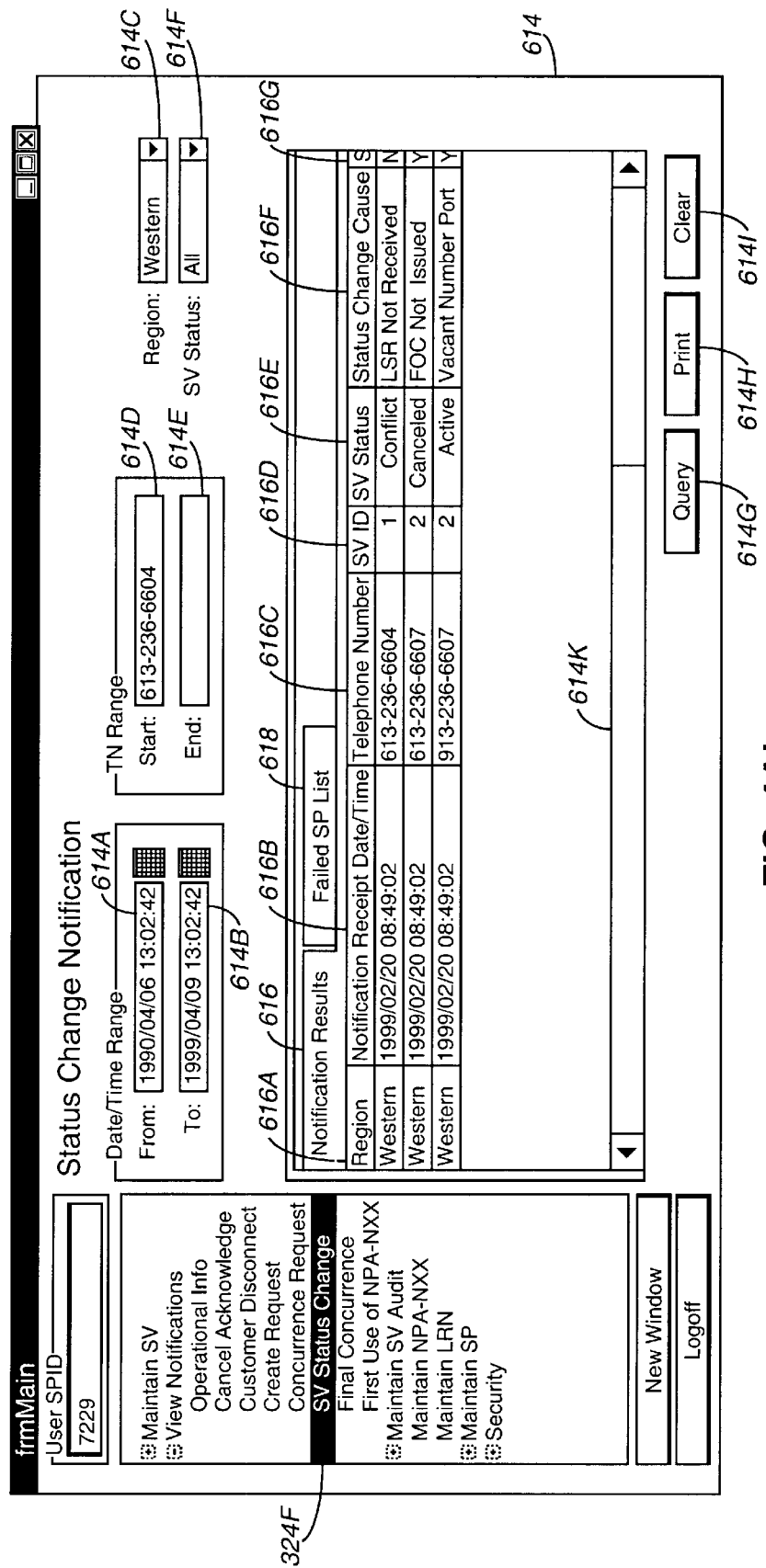
Figure 4A:
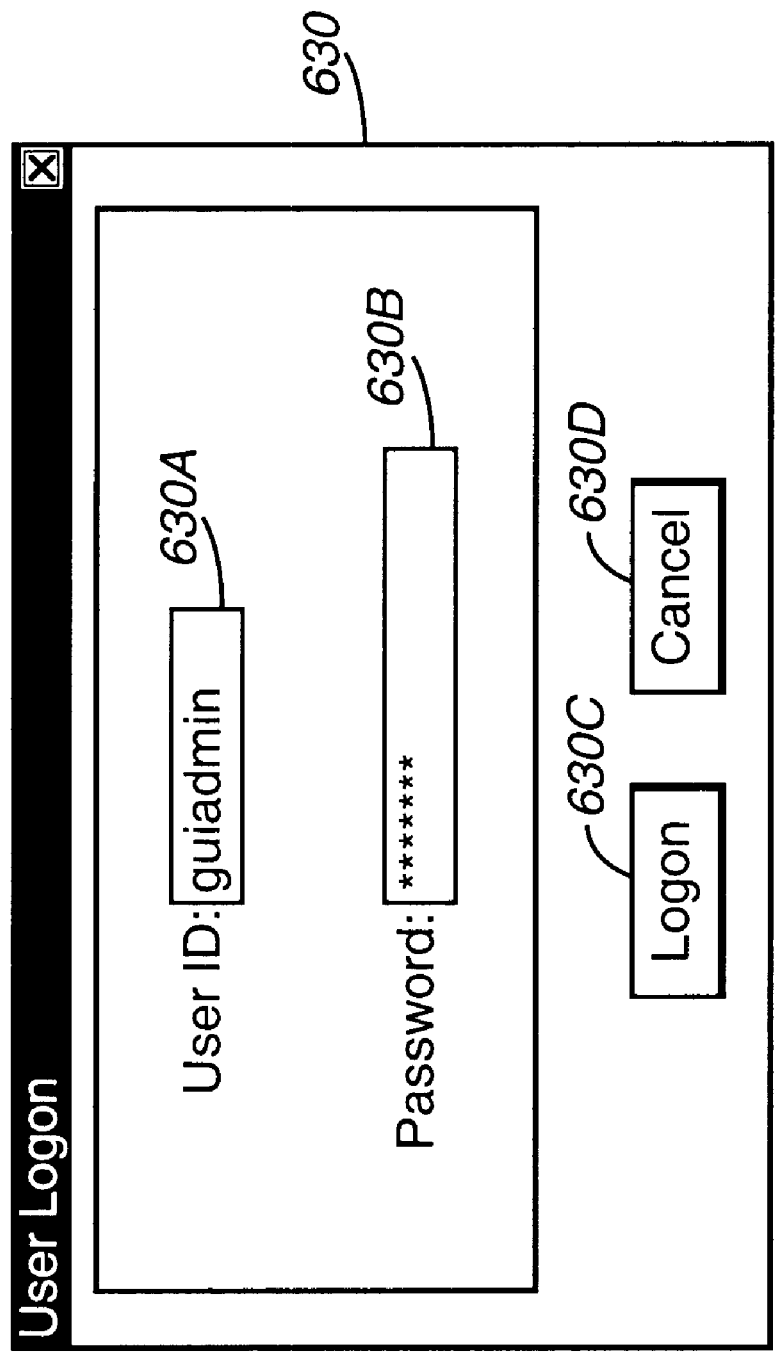
Figure 4A:
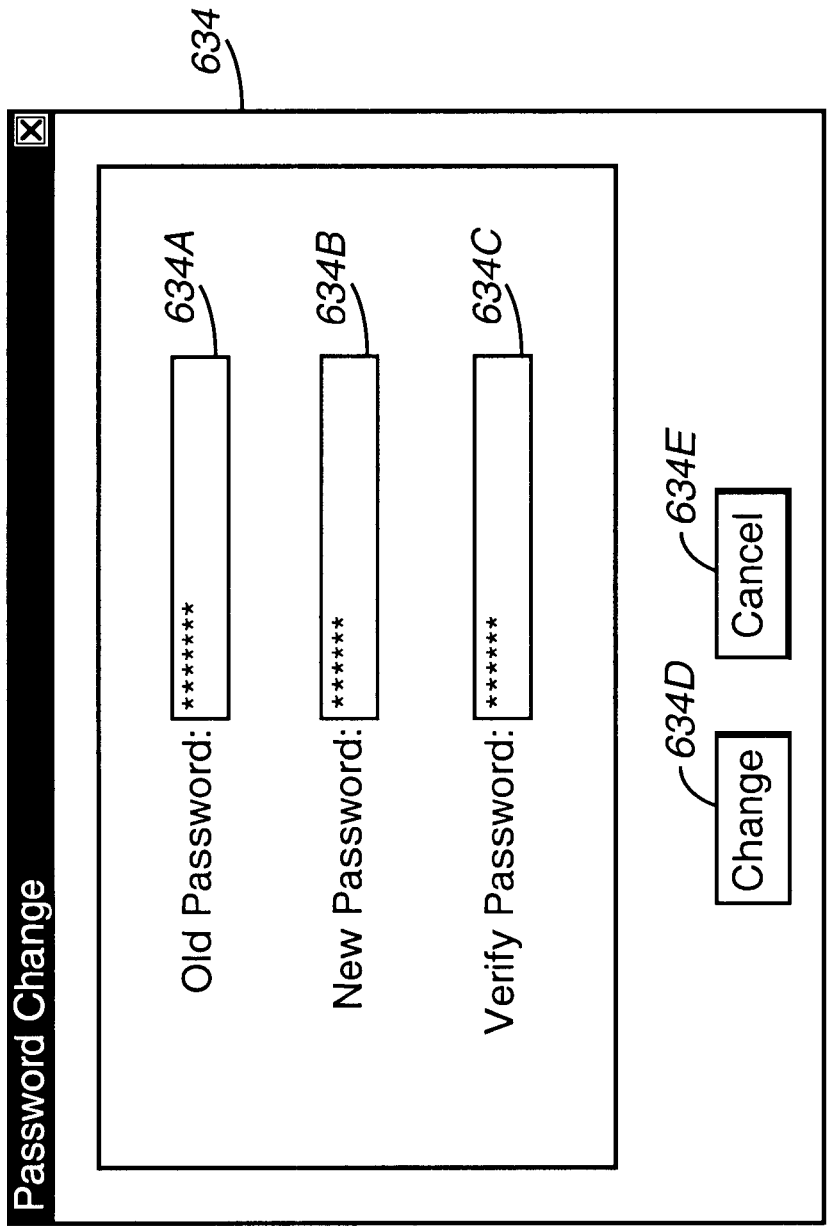
Figure 4A:
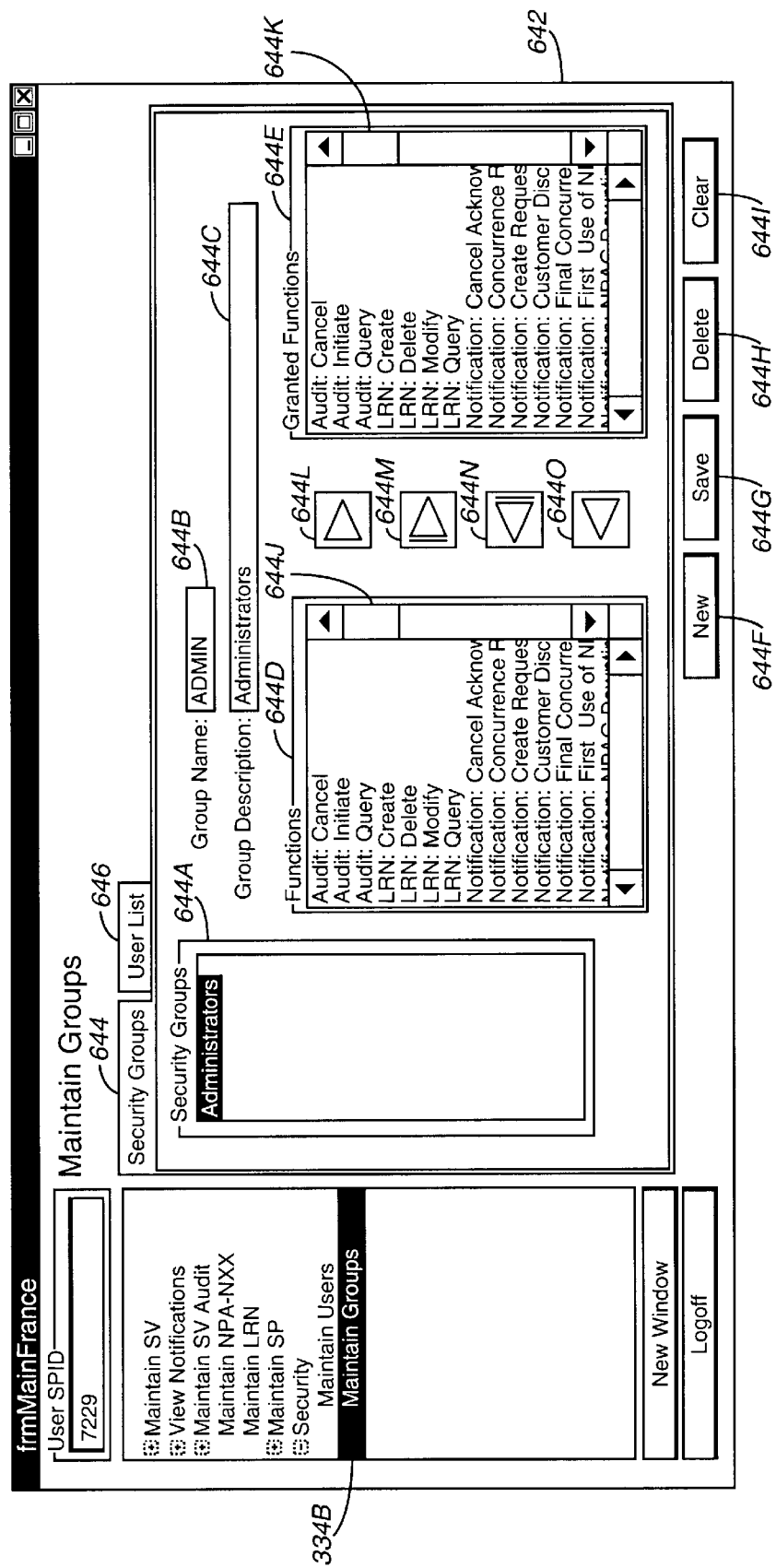
Figure 4A:
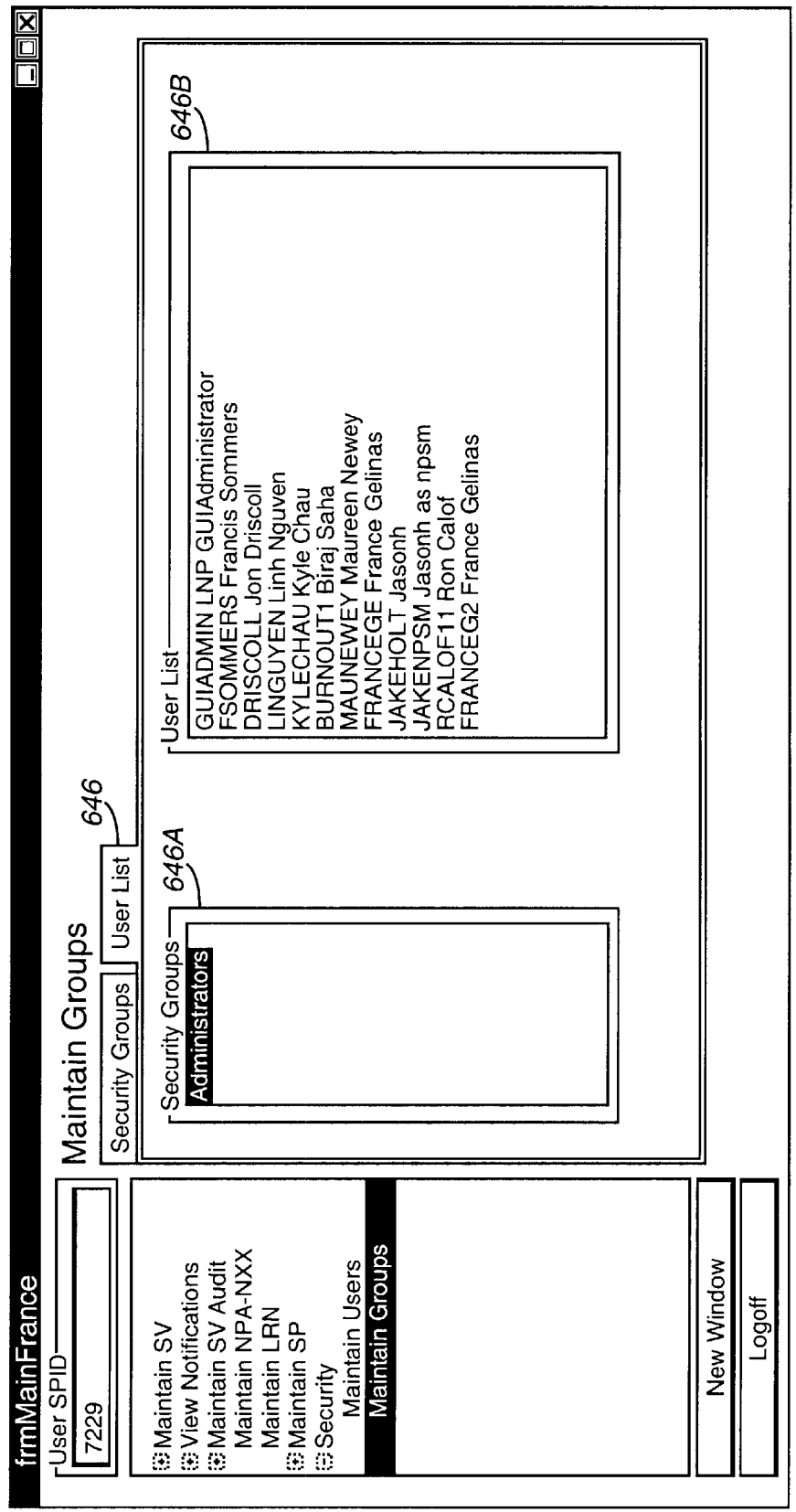

In the preferred embodiment, the Query Audit Status function 214, to request an audit status, accepts, for example, the following selection criteria from the user as shown in Query Audit screen 540 of FIG. 4Z: (a) User ID 540A; (b) Audit ID 540B; (c) Audit Name 540C; (d) Audit Start Time 540D; (e) Audit End Time 540E; and (f) Region Indicator drop down list 540F. The Query Audit screen 540 further includes, for example, a Query button 540M for initiating the query, a Details button 540N for providing audit status details, a Cancel button 540O for cancelling audit requests, a Clear button 540Q to clear the entered values, a Print button 540R for printing the query results, a Row Count indicator 540S to indicate the number of rows in the query results, an Audit Status Summary window 540P, and a Date and time of query 540T.

In the preferred embodiment, the User ID 540A in the selection criteria of the Query Audit Status function 214, will, for example, be used as a local data element only in order to track audits initiated by users.

In the preferred embodiment, when the user initiates a query via the Query button 540M, the Query Audit Status function 214, will, for example, display all audit requests meeting the selection criteria, regardless of the status of the audit.

In the preferred embodiment, the Query Audit Status function 214 will display in Audits Suspended or Audits in Progress details in the Audit Status Summary window 540P, for example, the following information for each audit request that meets the selection criteria: (a) Audit ID (not shown); (b) Audited Service Provider ID (not shown) and Name (not shown); (c) User ID (not shown) of the user who initiated the audit; (d) Audit Name (not shown); (e) Audit Status (not shown): and (f) Creation Time Stamp (not shown).

In the preferred embodiment, the Query Audit Status function 214, will, for example, only display those audits that were initiated by users associated with the same Service Provider as that associated with the user who performed the query, and designate an audit's status as "Incomplete" when the association between the SOA 48 and the NPAC 30 is lost at any time during execution of the audit.

View Audit Details Function 216 Features

In the preferred embodiment, the View Audit Details function 216 of the LNP GUI 124, for example, allows viewing of the details of an audit via selection of the Details button 540N.

In the preferred embodiment, the View Audit Details function 216, for example, allows a user to select an audit request from the query results in the Audit Status Summary window 540P in order to view the details of the results of the selected audit, via selection of the Details button 540N, and which generates the Audit Details screen 544 of FIG. 4AA.

In the preferred embodiment, the View Audit Details function 216, for example, provides the capability for the user to proceed directly from the Query Audit Status function 214 to the View Audit Details function 216 via selection of the Details button 540N.

In FIG. 4AA, the Audit Details screen 544 includes, for example, a Results Report form 546, a Discrepancy Report form 548 and a Scope of Audit form 550.

In the preferred embodiment, the Results Report form 546, for example, displays audit results information when the user selects an Audit ID and views the audit details as shown in, for example, FIG. 4AA, wherein the audit results information is, for example, as follows: (a) User ID of user who initiated the audit 546A; (b) Audit Name 546B and ID 546D; (c) Service Provider ID 546C associated with the user who initiated the audit; (d) Result Status 546E; (d) Number of discrepancies found 546F; (e) Completion time of the audit 546G; and (f) Result Time Stamp 546H.

In the preferred embodiment, the Discrepancy Report form 548 of the View Audit Details function 216, for example, displays audit discrepancies found when the user selects an audit ID and views the audit details as shown in, for example, FIG. 4AB wherein the audit discrepancy information is, for example, as follows: (a) Audit ID 548D and Name 548B; (b) Service Provider ID 548C of LSMS that was audited; (c) User ID 548A; (d) Subscription Version ID 548Q; (e) Telephone Number 548R; (f) Time Stamp of Audit 548S; (g) indicators of whether TN was missing from either NPAC 548T or LSMS 548U; and (h) Failure Reason consisting of, for example, the following: (i) LSMS LRN 548V, (ii) NPAC LRN 548W, (iii) LSMS New SPID 548X, (iv) NPAC New SPID 548Y, (v) LSMS Activation Timestamp 548Z, (vi) NPAC Activation Timestamp 548AA, (vii) LSMS CLASS DPC 548AB, (viii) NPAC CLASS DPC 548AC, (ix) LSMS CLASS SSN 548AD, (x) NPAC CLASS SSN 548AE, (xi) LSMS LIDB DPC 548AF, (xii) NPAC LIDB DPC 548AG, (xiii) LSMS LIDB SSN 548AH, (xiv) NPAC LIDB SSN 548AI, (xv) LSMS ISVM DPC 548AJ, (xvi) NPAC ISVM DPC 548AK, (xvii) LSMS ISVM SSN 548AL, (xviii) NPAC ISVM SSN 548AM, (xix) LSMS CNAM DPC 548AN, (xx) NPAC CNAM DPC 548AO, (xxi) LSMS CNAM SSN 548AP, (xxii) NPAC CNAM SSN 548AQ, (xxiii) LSMS End User Location Value 548AR, (xxiv) NPAC End User Location Value 548AS, (xxv) LSMS End User Location Type 548AT, (xxvi) NPAC End User Location Type 548AU, (xxvii) LSMS Billing ID 548AV, (xxviii) NPAC Billing ID 548AW, (xxix) LSMS LNP Type 548AX, and (xxx) NPAC LNP Type 548AY. In the preferred embodiment, the Discrepancy Report form further includes, for example, a move to first record button 548AZ, a move to last record button 548BA, a move one record forward button 548BC and a move one record backward button 548BB.

In the preferred embodiment, the Scope of Audit form 550 of the View Audit Details function 216, for example, displays the scope of the audit request when the user selects an Audit ID and views the audit details, as shown in, for example, FIG. 4AC wherein the scope information is, for example, as follows: (a) User ID of user who initiated the audit 550A; (b) Audit Name 550B and ID 540D; (c) Service Provider ID 550C associated with the user who initiated the audit; (d) Telephone Number Start 550E; (e) Telephone Number End 550F; (f) Activation Date Range start 550G; (g) Activation Date Range end 550H; (h) Region 550O and (i) indicators as to the selection of the following: (i) Class 550I, (ii) ISVM 550J, (iii) LRN 550K, (iv) LIDB 550L, (v) CNAM 550M and (vi) All fields selector 550N.

Cancel Audit Function 212 Features

In the preferred embodiment, the Cancel Audit function 212 of the LNP GUI 124, for example, allows cancelling audit requests that have been sent to the NPAC/SMS 30 via selection of the Cancel button 540O.

In the preferred embodiment, the Cancel Audit function 212, for example, allows a user to select an Audit ID from the list of query results in the Audit Status Summary window 540P in order to perform a cancel and provides the capability for the user to proceed directly from Query Audit Status function 214 to the Cancel Audit function 212 via selection of the Cancel button 540O.

In the preferred embodiment, the Cancel Audit function 212, for example, only allows cancellation of audits that are in progress or suspended, only permits cancellation of audits that were initiated by users associated with the same Service Provider as that associated. with the user requesting the cancellation, and prompts the user to confirm the cancellation of the selected audit.

View Notifications Function 190 Features

The following discussion describes the features of the preferred embodiment of the LNP GUI 124 View Notifications function 190, for example, for querying notifications from the SOA 48 databases. Once queried, for example, notifications are updated to an "acknowledged" state on the SOA 48 databases, and are not retrieved again in future queries, unless specifically requested by the user. Notifications are received from the NPAC 30 on an unsolicited basis and are stored on the SOA 48 databases when they are received. When a user selects the Operational Info hierarchical list item 324a corresponding to the NPAC SMS Operations Information Notification function 192 of the View Notifications function 190 of the LNP GUI 124, a NPAC Downtime Notification screen 554 as shown, for example, in FIG. 4AD is generated by the LNP GUI 124.

In the preferred embodiment of the LNP GUI 124, the View Notifications hierarchical list 324 corresponding to the View Notifications function 190, for example, further includes Cancel Acknowledge hierarchical list item 324b corresponding to the Cancel/Acknowledge Request Notification function 194, Customer Disconnect hierarchical list item 324c corresponding to the DSP Disconnect Date Notification function 196, Create Request hierarchical list item 324d corresponding to the NSP Create Request Notification function 200, Concurrence Request hierarchical list item 324e corresponding to the OSP Concurrence Request Notification Request function 202, SV Status Change hierarchical list item 324f corresponding to the SAV Change Notification function 204, Final Concurrence hierarchical list item 324g corresponding to the OSP Final Concurrence Window Expiration Notification function 206, and First Use of NPA-NXX hierarchical list item 324H corresponding to the New NPA-NXX Notification function 198.

In the preferred embodiment, to query notifications, the View Notifications function 190 accepts, for example, the following selection criteria from the user that is generic for each type of notification: (a) Notification Receipt Timestamp Start; (b) Notification Receipt Timestamp End; (c) NPAC Region ID drop down list; (d) TN Start; and (e) TN End. In another embodiment, the View Notifications function 190 accepts, for example, the following additional selection criteria from the user that is generic for each type of notification: (f) Customer Name; (g) SV Status; and (h) indicator for Including Notifications Requiring Acknowledgment.

In the preferred embodiment, the TN Start, TN End, Customer Name, and SV Status fields are, for example, not applicable for the NPAC/SMS Operational Information Notification function 192.

In the preferred embodiment, for example, the Notification Receipt Timestamp Start defaults to current time minus 72 hours, the Notification Receipt Timestamp End defaults to current time, and the View Notifications function 190 displays notifications in reverse chronological order (i.e., starting with the most recent notification).

In the preferred embodiment, the View Notifications function 190 displays, for example, the following data for each notification that meets the selection criteria: (a) NPAC ID; (b) Notification Identifier; and (c) Notification Receipt Timestamp.

NPAC/SMS Operational Information Notification Function 192

In the preferred embodiment, the NPAC/SMS Operational Information Notification function 192 of the LNP GUI 124, for example, sends a notification to all service providers to inform them of NPAC/SMS's 30 scheduled down time and is shown, for example, in the NPAC Downtime Notification screen 554 of FIG. 4AD.

In the preferred embodiment, to query notifications, the View Notifications function 190 accepts, for example, the following query selection criteria from the user via selection of the Operational Info hierarchical list item 324*a*,for example, as shown in the NPAC Downtime Notification screen 554: (a) Notification Receipt Timestamp Start 554A; (b) Notification Receipt Timestamp End 554B; and (c) NPAC Region ID drop down list 554C. The NPAC Downtime Notification screen 554, for example, further includes a Query button 554J for initiating the query, a Clear button 554L to clear the entered values, a Print button 554K for printing the query results, and a horizontal scroll bar 554M.

In the preferred embodiment, the NPAC/SMS Operational Information Notification function 192 displays via the Query Button 554J, the following data to the user, for example, as shown in the NPAC Downtime Notification window 554D of screen 554: (a) Region 554E; (b) Notification Receipt Date/Time 554F; (c) NPAC Contact Phone Number 554G; (d) Downtime Start 554H; (e) Downtime End 554I; and (f) Additional Miscellaneous Downtime Information (not shown).

Cancel/Acknowledge Request Notification Function 194

In the preferred embodiment, the Cancel/Acknowledge Request Notification function 194 of the LNP GUI 124, for example, sends a notification to the new and old service providers to request a cancellation/acknowledgment for a subscription version that has a status of "cancel-pending." For example, before this notification is sent, a service provider has a tunable time frame specified by the NPAC/SMS 30, in which to send a cancellation acknowledgment for a cancel-pending subscription version. Failure to do so, for example, triggers this notification from the NPAC 30. Once this notification is sent, the service provider has, for example, a second tunable time frame in which to send the cancellation acknowledgment. Failure to do so for the second time will, for example, cause the NPAC/SMS 30 to update the status of the subscription version from "cancel-pending" to "conflict."

In the preferred embodiment, to query notifications, the Cancel/Acknowledge Request Notification function 194 accepts, for example, the following query selection criteria from the user via selection of the Cancel Acknowledge hierarchical list item 324*b*,for example, as shown in the Cancellation Acknowledge Request Notification screen 558 of FIG. 4AE: (a) Notification Receipt Timestamp Start 558A; (b) Notification Receipt Timestamp End 558B; (c) Telephone Number Start 558D; (d) Telephone Number End 558E; and (e) NPAC Region ID drop down list 558C. The NPAC Downtime Notification screen 558, for example, further includes a Query button 558J for initiating the query, a Clear button 558L to clear the entered values, and a Print button 558K for printing the query results.

In the preferred embodiment, the Cancel/Acknowledge Request Notification function 194 displays upon a user selecting the Cancel Acknowledge hierarchical list item 324*b*, for example, the following data to the user, for example, as shown in the Cancellation Acknowledge Request Notification screen 558: (a) Region 558F; (b) Notification Receipt Date/Time 558G; (c) Telephone Number 558H; and (d) Subscription Version ID 558I.

In the preferred embodiment, the Cancel/Acknowledge Request Notification function 194, for example, provides the capability for the user to proceed directly from this function to the Acknowledge Cancellation of SV function 184 via selection of the Cancel Acknowledge hierarchical list item 322*g* of the Maintain SV hierarchical list 322.

DSP Disconnect Date Notification Function 196

In the preferred embodiment, the Donor Service Provider (DSP) Disconnect Date Notification function 196 of the LNP GUI 124, for example, sends a notification to the donor service provider to inform the service provider that a subscription version is being disconnected.

In the preferred embodiment, to query notifications, the DSP Disconnect Date Notification function 196 accepts, for example, the following query selection criteria from the user via selection of the Customer Disconnect hierarchical list item 324*c*, for example, as shown in the Donor SP Customer Disconnect Date Notification screen 602 of FIG. 4AF: (a) Notification Receipt Timestamp Start 602A; (b) Notification Receipt Timestamp End 602B; (c) Telephone Number Start 602D; (d) Telephone Number End 602E; and (e) NPAC Region ID drop down list 602C. The Donor SP Customer Disconnect Date Notification screen 602, for example, further includes a Query button 602L for initiating the query, a Clear button 602N to clear the entered values, a Print button 602M for printing the query results and a horizontal scroll bar 602O.

In the preferred embodiment, the DSP Disconnect Date Notification function 196 displays, for example, the following data to the user in the window 602P, for example, as shown in the Donor SP Customer Disconnect Date Notification screen 602: (a) Region 602F; (b) Notification Receipt Date/Time 602G; (c) Telephone Number 602H; (d) Subscription Version ID 602I; (e) Customer Disconnect Date/Time 602J; and (f) Effective Release Date 602K.

NSP Create Request Notification Function 200

In the preferred embodiment, the New Service Provider (NSP) Create Request Notification function 200 of the LNP GUI 124, for example, sends a notification to the new service provider to request a "Create As Gaining" for a subscription version for which the old service provider has already sent its "Create As Losing." For example, before this notification is sent, the new service provider has a tunable time frame specified by the NPAC/SMS 30, in which to send a create for a subscription version for which the old service provider has already submitted its own create. Failure to do so triggers this notification from the NPAC 30. Once this notification is sent. the new service provider, for example, has a second tunable time frame in which to send the create. Failure to do so for the second time will, for example, cause the NPAC/SMS 30 to update the status of the subscription version from "pending" to "canceled."

In the preferred embodiment, to query notifications, the NSP Create Request Notification function 200 accepts, for example, the following query selection criteria from the user via selection of the Create Request hierarchical list item 324d, for example, as shown in the New Service Provider Create Request Notification screen 606 of FIG. 4AG: (a) Notification Receipt Timestamp Start 606A; (b) Notification Receipt Timestamp End 606B; (c) Telephone Number Start 606D; (d) Telephone Number End 606E; and (e) NPAC Region ID drop down list 606C. The New Service Provider Create Request Notification screen 606, for example, further includes a Query button 606M for initiating the query, a Clear button 606N to clear the entered values, a Print button 606O for printing the query results and a horizontal scroll bar 606P.

In the preferred embodiment, the NSP Create Request Notification function 200 displays, for example, the following data to the user in the window 606Q, for example, as shown in the New Service Provider Create Request Notification screen 606: (a) Region 606F; (b) Notification Receipt Date/Time 606G; (c) Telephone Number 606H; (d) Subscription Version ID 606I; (e) Old Service Provider ID 606J; (f) Old Service Provider Authorization 606K; (g) Old Service Provider Authorization Date 606L; (h) Old Service Provider Due Date (not shown); and (i) Status Change Cause Code (not shown).

In the preferred embodiment, the NSP Create Request Notification function 200, for example, provides the capability for the user to proceed directly from this function to the Create As Gaining SV function 172 via selection of the Create as Gaining hierarchical list item 322b of the Maintain SV hierarchical list 322.

OSP Final Concurrence Request Notification Function 202

In the preferred embodiment, the Old Service Provider (OSP) Concurrence Request Notification function 202 of the LNP GUI 124, for example, sends a notification to old service provider to request a "Create As Losing" subscription version for which the new old service provider has already sent its "Create As Gaining." For example, before this notification is sent, the old service provider has a tunable time frame specified by the NPAC/SMS 30, in which to send a create for a subscription version for which the new service provider has already submitted its own create. Failure to do so, for example, triggers this notification from the NPAC 30. Once this notification is sent, the old service provider has, for example, a second tunable time frame in which to send the create. Because the create from the old service provider is an optional step as specified by the NPAC/SMS 30, failure to send the create after this notification has been sent, for example, will not impact the status of the subscription version. Upon expiration of the second time frame, with or without the create from the old service provider, the new service provider, for example, may proceed with activation of the subscription version. The old service provider, for example, receives the OSP Final Concurrence Window Expiration Notification when the second time frame expires.

In the preferred embodiment, to query notifications, the OSP Concurrence Request Notification function 202 accepts, for example. the following query selection criteria from the user via selection of the Concurrence Request hierarchical list item 324e, for example, as shown in the Old SP Concurrence Request Notification screen 610 of FIG. 4AH: (a) Notification Receipt Timestamp Start 610A; (b) Notification Receipt Timestamp End 610B; (c) Telephone Number Start 610D; (d) Telephone Number End 610E; and (e) NPAC Region ID drop down list 610C. The Old SP Concurrence Request Notification screen 610, for example, further includes a Query button 610M for initiating the query, a Clear button 610N to clear the entered values, a Print button 610O for printing the query results and a horizontal scroll bar 610P.

In the preferred embodiment, the OSP Concurrence Request Notification function 202 displays, for example, the following data to the user in the window 606Q, for example, as shown in the Old SP Concurrence Request Notification screen 610: (a) Region 610F; (b) Notification Receipt Date/Time 610G; (c) Telephone Number 610H; (d) Subscription Version ID 610I; (e) New Current Service Provider ID 610K; (f) New Service Provider Due Date 610L; and (g) Subscription Version Create Date (not shown).

In the preferred embodiment, the OSP Concurrence Request Notification function 202, for example, provides the capability for the user to proceed directly from this function to the Create As Losing SV function 174 via selection of the Create as Losing hierarchical list item 322c of the Maintain SV hierarchical list 322.

SAV Change Notification Function 204

In the preferred embodiment, the Status Attribute Value (SAV) Change Notification function 204 of the LNP GUI 124, for example, sends a notification to the new and old service providers to inform them of changes to the subscription version status attribute.

In the preferred embodiment, to query notifications, the SAV Change Notification Function 204 accepts for example, the following query selection criteria from the user via selection of the SV Status Change hierarchical list item 324f, for example, as shown in the Status Change Notification screen 614 of FIG. 4AI: (a) Notification Receipt Timestamp Start 614A; (b) Notification Receipt Timestamp End 614B; (c) Telephone Number Start 614D; (d) Telephone Number End 614E; (e) NPAC Region ID drop down list 614C and (f) SV Status drop down list 614F. The Status Change Notification screen 614, for example, further includes a Query button 614G for initiating the query, a Clear button 614I to clear the entered values, a Print button 614H for printing the query results, a horizontal. scroll bar 614K, Notification Results form 616 and Failed SP List form 618.

In the preferred embodiment, the SAV Change Notification Function 204 displays, for example, the following data to the user in the window 614J, for example, as shown in the Notification Results form 616: (a) Region 616A; (b) Notification Receipt Date/Time 616B; (c) Telephone Number 616C; (d) Subscription Version ID 616D; (e) Subscription Version Status 616E; (f) Status Change Cause Code 616F; and (g) Failed Service Provider indication 616G.

In the preferred embodiment, the SAV Change Notification Function 204 displays, for example, the following data to the user in the window 614J, for example, as shown in the Failed SP List form 618 of FIG. 4AJ: (a) SP ID 618A; and (b) SP Name 618B.

OSP Final Concurrence Window Expiration Notification Function 206

In the preferred embodiment, the Old Service Provider (OSP) Final Concurrence Window Expiration Notification function 206 of the LNP GUI 124, for example, sends a notification to the old service provider to inform the service provider of the expiration of the Final Concurrence Timer. For example, this timer is for the second tunable time frame in which the old service provider may send a "Create As Losing" for a subscription version for which the new service provider has already sent its "create as gaining." Prior to receiving this notification, the old service provider, for example, would have received the OSP concurrence request notification, as previously described.

In the preferred embodiment, to query notifications, the OSP Final Concurrence Window Expiration Notification function 206 accepts, for example, the following query selection criteria from the user via selection of the Final Concurrence hierarchical list item 324g, for example, as shown in the Final Concurrence Window Expiration Notification screen 622 of FIG. 4AK: (a) Notification Receipt Timestamp Start 622A; (b) Notification Receipt Timestamp End 622B; (c) Telephone Number Start 622D; (d) Telephone Number End 622E; and (e) NPAC Region ID drop down list 622C. The Final Concurrence Window Expiration Notification screen 622, for example, further includes a Query button 622J for initiating the query, a Clear button 622L to clear the entered values, and a Print button 622K for printing the query results.

In the preferred embodiment, the OSP Final Concurrence Window Expiration Notification function 206 displays, for example, the following data to the user in the window 622M, for example, as shown in Final Concurrence Window Expiration Notification screen 622: (a) Region 622A; (b) Notification Receipt Date/Time 622B; (c) Telephone Number 622C; and (d) Subscription Version ID 622D.

New NPA-NXX Notification Function 198

In the preferred embodiment, the New NPA-NXX Notification function 198 of the LNP GUI 124, for example, sends a notification to all service providers to inform them of a pending subscription version involving a new NPA-NXX (i.e., first use of a NPA-NXX).

In the preferred embodiment, to query notifications, the New NPA-NXX Notification function 198 accepts, for example, the following query selection criteria from the user via selection of the First Use of NPA-NXX hierarchical list item 324h, for example, as shown in the First TN Port For NPA NXX Notification screen 626 of FIG. 4AL: (a) Notification Receipt Timestamp Start 626A; (b) Notification Receipt Timestamp End 626B; and (c) NPAC Region ID drop down list 626C. The First TN Port For NPA NXX Notification screen 626, for example, further includes a Query button 626K for initiating the query, a Clear button 626M to clear the entered values, and a Print button 626L for printing the query results.

In the preferred embodiment, the New NPA-NXX Notification function 198 displays, for example, the following data to the user in the window 626N, for example, as shown in the First TN Port For NPA NXX Notification screen 626: (a) Region 626F; (b) Notification Receipt Date/Time 626G; (c) NPA-NXX 626H; (d) Service Provider ID 626I; and (e). Effective Date 626J.

LNP GUI 124 System Support Functionality

The following sections describe exemplary system support and functionality features of the preferred embodiment of the LNP GUI 124.

Security

The LNP GUI 124 provides sufficient security to protect sensitive data maintained by the system. The following features describe LNP GUI 124 security at the session/network, function, and data access levels.

Session Security

In the preferred embodiment, the LNP GUI 124 restricts access to all data items to, for example, authorized personnel only. For example, the BF/W 122 personnel are not be authorized to access MCIT 120 service order 130 data.

In the preferred embodiment, the LNP GUI 124, for example, restricts access of functions and sub-functions to authorized personnel only. For example, (a) some users are restricted from executing queries of NPAC 30 data; (b) users are assigned access ability through a series of configurable user/group profiles; (c) the security system uniquely identifies all users; and (d) a user is allowed to have up to five concurrent sessions (i.e., with the same User Id) with a common logon and logoff.

In the preferred embodiment, the LNP GUI 124 ensures that in the event of failure (i.e., abnormal termination), it is impossible to restart the LNP GUI 124 without going through Logon/Logoff security.

Logon

In the preferred embodiment, for example, the following features apply when a LNP GUI 124 user signs on to the application as shown in, for example, User Logon screen 630 of FIG. 4AM: (a) authorized users are able to access the system and initiate a session; (b) a user must enter a valid User Id 630A and Password 630B to logon; (c) failure of a logon attempt generates an application log indicating the User Id and reason for failure; and (d) the user account is disabled when the maximum (e.g., tunable) allowable number of unsuccessful logon attempts is reached. The User Logon screen 630 further includes, for example, a Logon button 630C for initiating the logon, and a Cancel button 630D for cancelling the logon.

Logoff

In the preferred embodiment, for example, the following features apply to LNP GUI 124 users logging off: (a) logged on users are able to disconnect from the LNP GUI 124 system via Logoff button 340 of FIG. 4A; and (b) once initiated, the Logoff function is irreversible.

In the preferred embodiment of the LNP GUI 124, for example, no confirmation window will be displayed when logging off or closing windows except where otherwise specified.

User Id/Password

In the preferred embodiment, for example, the following features apply to LNP GUI 124 User IDs and Passwords: (a) passwords are not case sensitive; (b) passwords are never displayed or accessible to anyone on the system; (c) users are able to change their password; (d) users are required to chance their passwords after a tunable number of days; (e) passwords are at least four characters in length, (f) passwords support the use of any of all the possible characters in the alphanumeric 7 bit ASCII character set; (g) passwords cannot be changed back to the three most recently used passwords; (h) when the password is entered incorrectly four times (e.g., configurable) in a row, the user account is automatically suspended; (i) the system administrator is able to reactivate suspended accounts; J) the system administrator is able to reset a user's password; (k) a user is forced to change their password after it has been reset by the system administrator; (l) the system administrator is responsible for the administration of users and their accounts; and (m) the system administrator is assigned access ability through a series of configurable user/group profiles.

FIG. 4AN shows, for example, Password Change screen 634, generated via the Change Password hierarchical list item 334c of the Security hierarchical list 334 of FIG. 4AO, including, for example, Old Password field 634A for entering an old password, New Password field 634B for entering a new password and Verify Password field 634C for verifying. the new password. The Password Change screen 634, for example, further includes a Change button 634D for initiating the password change and a Cancel button 634E; for cancelling the change of password.

User Profiles and Security Groups

In the preferred embodiment of the LNP GUI 124, for example, maintenance of all user profiles and security groups is the responsibility of the system administrator and: (a) authorized users are able to create a new User; (b) authorized users are able to modify a User Profile; (c)

authorized users are able to delete a User from the system (e.g., this will be a physical delete, rather than a logical delete); (d) the User Profile information includes, for example, the following information: (i) password, (ii) user name, (iii) telephone number, (iii) Security Group (e.g., one per user), (iv) User Id Status (e.g., active or suspended), and (v) Service Provider ID; (e) once a User Id has been created it cannot be modifiable; (f) authorized users are able to create a new Security Group; (g) authorized users are able to modify a Security Group; (h) authorized users are able to delete a Security Group that contains no active users; (i) a Security Group contains a list of users, modifiable by an authorized user; (j) a user can belong to at most one Security Group; and (k) authorized users are able to choose pre-defined functionality to be made available to a Security Group (e.g., the pre-defined functionality will be defined and maintained outside the LNP GUI 124, i.e., level of access by function, for example, view, update, delete, etc.); and (l) once identified and authenticated, users are only permitted access to those functions assigned to their Security Group.

In the preferred embodiment of the LNP GUI 124, the selection of the Maintain User hierarchical list item 334a of the Security hierarchical list 334 generates the Maintain User screen 638, as shown in, for example, FIG. 4AO. In FIG. 4AO, the. Maintain User screen 638, for example, includes: (a) Users selection window 638A; (b) a User ID field 638B; (c) a Security Group drop down list 638C; (d) a User Name field 638D; (e) a Telephone Number field 638E; (f) a Service Provider ID drop down list 638F; (g) a New Password field 638G; (h) a Verify New Password field 638H; (i) an Active Status selector 638I; (j) a Suspended Status selector 638J; (k) a Time Zone drop down list 638K; (l) a Daylight Savings Time drop down list 638L; (m) a Password last changed time stamp 638M; and (n) an Invalid log counter 638N. The Maintain User screen 638 further includes, for example, a New button 638O for adding new users, a Save button 638P for saving entered data, a Delete button 638Q for deleting a user and a Clear button 638R to clear the entered values.

In the preferred embodiment of the LNP GUI 124, the selection of the Maintain Groups hierarchical list item 334b of the Security hierarchical list 334 generates the Maintain Groups screen 642, as shown in, for example, FIG. 4AP. In FIG. 4AP, the Maintain Groups screen 642, for example, includes a Security Groups form 644 and a User List form 646.

The Security Groups form 644, for example, includes: (a) a Security Groups selection window 644A; (b) a Group Name field 644B; (c) a Group description field 644C; (d) a Functions window 644D; and (e) a Granted Functions window 644E. The Security Groups form 644 further includes, for example, a New button 644F for adding new groups, a Save button 644G for saving entered data, a Delete button 644H for deleting a group, a Clear button 644I to clear the entered values, vertical scroll bars 644J and 644K, move selected item(s) to the right and left buttons 644L and 644O, and move all items to the right and left buttons 644M and 644N.

The User List form 646, for example, as shown in FIG. 4AQ includes: (a) a Security Groups selection window 646A; and (b) a User List 646B.

Data Security

In the preferred embodiment, the LNP GUI 124, for example, ensures that the integrity of the system data is maintained. To achieve this level the LNP GUI 124 provides the following features: (a) data cannot be viewed or updated other than through the appropriate security modules (e.g., a user will not be able to gain access to the database that supports the LNP GUI 124 using a third party software package).

The LNP GUI 124 System Platform Features

In the preferred embodiment, the following System Platform Features section addresses the operational functionality and performance type features for the LNP GUI 124.

Response Times for User Commands

In the preferred embodiment of the LNP GUI 124, the response time targets apply to using the LNP GUI 124, for example, via an internal LAN and not a dial up line wherein: (a) the LNP GUI 124 has logon/logoff times of 0 to 7 seconds (e.g., from entry of User Id and password to system available for work); (b) the LNP GUI 124 response time, on average, for execution of any user command is less than five seconds (e.g., the response time is limited to those actions performed by the LNP GUI 124 client and server processes and actions performed by other sub-systems and/or external systems, e.g., NPAC 30, are excluded from this target response time); (c) the LNP GUI 124 executes in background mode any detachable processes that do not require the user to monitor progress or provide a response (e.g., NPAC 30 or local SMS 74 audits); and (d) the LNP GUI 124 displays a system busy indicator (e.g., hour glass) whenever the LNP GUI 124 is waiting for a response from other processes that is greater than two seconds.

Consistency and Concurrency

In the preferred embodiment, for example, in order to maintain confidence in the data within the LNP GUI 124 system, there is a common approach to the entry of all data elements in order to achieve a high level of integrity for all data elements, for example, as follows: (a) the LNP GUI 124 prevents dual-entry of data (e.g., the GUI will "carry" data from one screen to another where applicable); (b) where possible the use of pick lists and field validation are used; (c) the LNP GUI 124 validation of user input is consistent with validation performed against input provided to LNP from other MCIT 120 upstream systems; (d) records which are not complete or which have erroneous data are identified (e.g., incomplete NPAC 30 or local SMS 74 audit results due to SOA 48 downtime, i.e., missed notifications); (e) transaction logging identify all changes to important data; (f) to maintain the integrity of data, the LNP GUI 124 disallows partial completion of operations due to system faults occurring during a transaction (e.g., the data repositories will be returned to the state immediately before the transaction was issued); and (g) where multiple users from different PCs request operations on the same resources or data, the LNP GUI 124 arbitrates access in a mutually exclusive manner.

Availability

In the preferred embodiment, the LNP GUI 124 will be available, for example, 99.5% of the time on a 24 hour 7 day basis.

System Software Features

This section describes software features of the preferred embodiment of the LNP GUI 124 system.

Development Environment Features

In the preferred embodiment, the LNP GUI 124 application, for example, was developed using Silverstream™ version 2.0.

Operating System Features

In the preferred embodiment, the LNP GUI 124 application servers, for example, run under Microsoft NT™ and the LNP GUI 124 is capable of, for example, using Microsoft Internet Explorer™ or NetScape™.

DBMS Features

In the preferred embodiment, the DBMS that supports the LNP GUI 124 application is consistent with, for example, the Oracle™ versions being run on other systems.

Communications

In the preferred embodiment, for example: (a) the LNP GUI 124 uses an IP based network communication protocol to communicate with non-local processes; (b) access to the LNP GUI 124 is through a telecommunications service provider's corporate intranet; and (c) the LNP GUI 124 is accessible via a telecommunications service provider's WAN and remote dial-up.

Operational Volumetrics

This section describes operational volumetrics of the preferred embodiment of the LNP GUI 124 system.

Support Users/Sessions Numbers

In the preferred embodiment, the LNP GUI 124 will support, for example, 100–200 users including up to 20–40 dial-up, with 400–800 concurrent sessions (noting that a user can have more than one concurrent session).

Subscription Version Create Volumes

In the preferred embodiment, the LNP GUI 124 supports, for example, entry of up to 150,000 Subscription Version entries per month. This is based on the following 1998 year-end volumes: (a) a first telecommunications service provider: 66,033 manual; (b) a second telecommunications service provider: 19,278 manual; and (c) a third telecommunications service provider: 2,142 manual.

User Aids Features

In the preferred embodiment, the LNP GUI 124 application for example, supports online Help on a function by function basis.

Assumptions, Dependencies and Constraints

This section describes assumptions, dependencies and constraints of the preferred embodiment of the LNP GUI 124 system.

Assumptions

In the preferred embodiment, the LNP GUI 124 application, for example, MCIT 120 ensures secure communications to and from the LNP GUI 124.

Design Constraints

This section describes the design constraints pertaining to the LNP GUI 124 application software of the preferred embodiment of the LNP GUI 124.

Graphical User Interface

In the preferred embodiment of the LNP GUI 124, for example: (a) TN precedes SV ID in importance (therefore TN precedes SV ID in position on screens); (b) if "Create as Gaining" and "Create As Losing" are performed through the same screen, inapplicable fields are protected/hidden based on the action specified (i.e., gaining versus losing); (c) common screen templates are utilized to create a consistent look and feel throughout the application; (d) information, such as Partial Failure details, are on top in the LNP GUI 124 (i.e., minimal key strokes are required by the user to view this information); (e) the LNP GUI 124 maximizes the display of SV query results (e.g., the user specified query criteria is compressed to a few lines above the query results); (f) maintenance of pick list table information such as Service Provider—Name and NPA-NXX—CLLI are outside the scope of the LNP GUI 124 (e.g., these may be maintained using database scripts); (g) where possible, option labels are expanded to explicitly state what the option will do (e.g., instead of a button being labeled "Modify," the button is labeled "Modify an Active TN" or "Modify a Pending TN"); and (h) an indication is provided on each screen as to how to escape or return to the previous screen.

Figure 5:
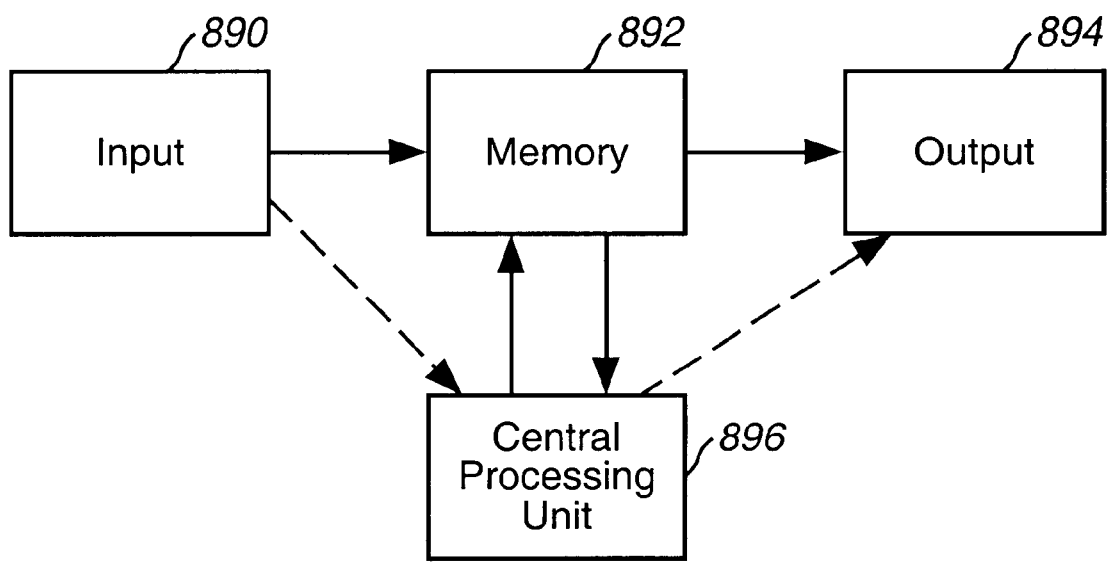
FIG. 5 illustrates an exemplary portion of a generalized computer system upon which portions of the invention may be implemented.

FIG. 5 illustrates an exemplary portion of a generalized computer system upon which portions of the invention may be implemented. In FIG. 5, An input 890 communicates with a memory 892 and a Central Processing Unit 896. The Central Processing Unit 896 communicates with the memory 892 and an output 894. The output 894 is also in communication with the memory 892. The Central Processing Unit 896 may include an arithmetic/logic unit and a control unit in the form of hardware and/or software (not shown). One or more of inputs 890 may each be in communication with one or more memories 892 and/or Central Processing Units 896. One or more Central Processing Units 896 may be in communication with one or more outputs 894 and/or memories 892 and/or inputs 890. One or more memories 892 may be in communication with one or more inputs 890 and/or Central Processing Units 896 and/or outputs 894. Clearly, a plurality of variations of computer hardware configurations may be realized in a network of computer systems upon which portions of the invention may be implemented.

Figure 6:
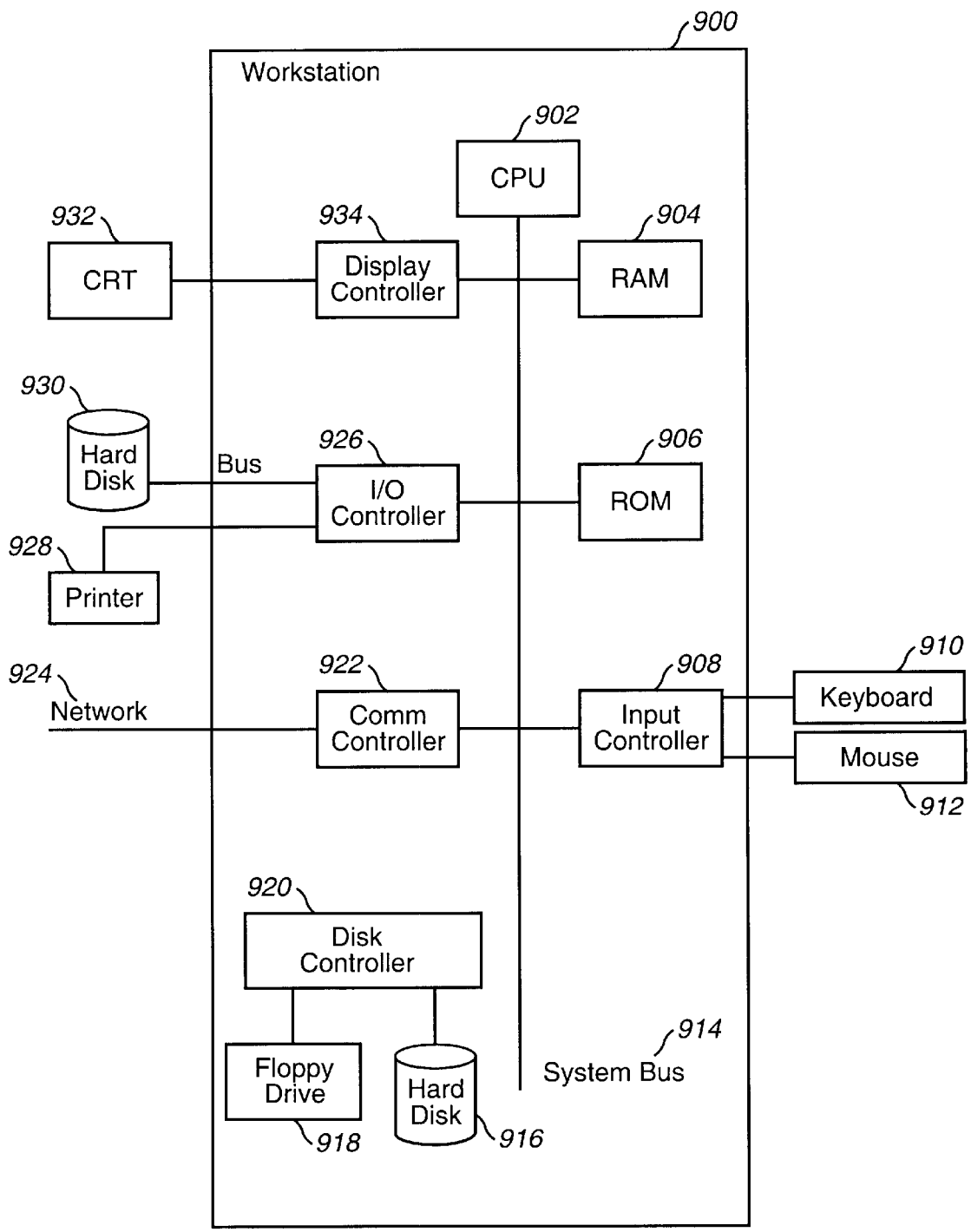
FIG. 6 illustrates an exemplary portion of a generalized hardware configuration, in the format of a workstation, upon which portions of the invention may be implemented.

FIG. 6 illustrates an exemplary portion of a hardware configuration, in the format of a workstation 900, upon which portions of the invention may be implemented. The workstation 900 has component parts a display controller 934, a central processing unit (CPU) 902, a random access memory (RAM) 904, a read only memory (ROM) 906, an input controller 908, connected to a keyboard 910 and a mouse 912, a system bus 914, a hard disk 916 and a floppy drive 918 connected to a disk controller 920, a comm controller 922 connected to a network 924, and an input/output (I/O) controller 926 connected to a hard disk 930 and a printer 928, and a cathode ray tube (CRT) 932 connected to the display controller 934. The system bus 914 connects the CPU 902, the RAM 904, the ROM 906, the input controller 908, the disk controller 920, the comm controller 922, the I/O controller 926, and the display controller 934 for transmitting data over the connection line. For example, computer code generated for execution may be loaded into the RAM 904 for execution by the CPU 902, using the system bus 914, with input files stored on the hard disk 930, with other input coming from the keyboard 910 and the mouse 912 through the input controller 908, the network 924 and comm controller 922, and from the hard disk 916 and the floppy drive 918, through the disk controller 920, onto the system bus 914. The system bus 914 interacts with the ROM 906, the network 924, and the comm controller 922.

This invention may be conveniently implemented using a network of conventional general purpose digital computers and/or microprocessors programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer or a plurality of networked computers to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

While this invention has been described in reference to illustrative embodiments, the description is not intended to be construed in a limiting sense. Various modifications and combinations of the illustrative embodiments as well as other embodiments of the invention will become apparent to persons skilled in the art upon reference or description. It is, therefore, intended that the appended claims encompass any such modifications or embodiments.

What is claimed is:

1. An interface to a local number portability (LNP) network, comprising:

a communications link;

an engine interface;

a graphical user interface (GUI) coupled to said engine interface via said communications link;

said engine interface for transmitting data from said LNP network to said GUI via said communications link and transmitting data received from said GUI to said LNP network;

said GUI comprising means for providing screen displays to a user for performing LNP network maintenance functions including at least one of maintaining a service provider (SP), maintaining a numbering plan area-telephone number exchange (NPA-NXX), and maintaining local routing number (LRN);

said GUI comprising means for providing screen displays to a user for performing LNP subscription version (SV) maintenance functions including at least one of creating as a gaining SV, creating as a losing SV, activating a SV, modifying a SV, cancelling a SV, disconnecting a SV, acknowledging cancellation of a SV, resolving a conflict with a SV, and querying a SV;

said GUI comprising means for providing screen displays to a user for performing reconciling with a number portability administration center (NPAC) functions including at least one of initiating a NPAC audit, and querying a NPAC audit; and said GUI comprising means for providing screen displays to a user for performing viewing of LNP notifications functions including at least one of viewing operational information notifications, viewing cancellation acknowledge notifications, viewing customer disconnect notifications, viewing create request notifications, viewing concurrence request notifications, viewing SV status change notifications, viewing final concurrence notifications, and viewing a first use of numbering plan area-telephone number exchange (NPA-NXX) notifications.

2. The interface to a LNP network of claim 1, wherein said engine interface comprises a service order administration (SOA) engine interface that routes one of LNP transactions and LNP messages received from said GUI to destinations including regional SOA subsystems.

3. The interface to a LNP network of claim 1, wherein said GUI screen display for maintaining a service provider comprises:

a maintain SP screen display for modifying or querying SP information, including, fields for inputting query or modification information including a SP identification region and contact information, means for submitting said query or modification information to said engine interface, means for displaying query results received from said engine interface in response to said query or modification information, and means for clearing input query or modification information; and a list SP screen display, including, a date and time of query or modification indicator, means for listing SP information, and means for printing listed SP information.

4. The interface to a LNP network of claim 1, wherein said GUI screen display for maintaining a NPA-NXX comprises:

a maintain NPA-NXX screen display for creating, deleting or querying a NPA-NXX, including, fields for inputting query criteria including a query source, a query region, a SP identification, and a NPA-NXX range including a NPA-NXX start and a NPA-NXX end, means for submitting said query criteria to said engine interface, means for displaying query results received from said engine interface in response to said query criteria and including a date and time of query indicator, means for printing said query results, means for clearing input query criteria, means for indicating a row count of said query results, means for deleting a selected NPA-NXX from displayed query results, and means for creating a NPA-NXX and which generates a create NPA-NXX screen display upon a user selecting said means for creating a NPA-NXX, wherein said create NPA-NXX screen display, includes, fields for inputting NPA-NXX information including a NPA-NXX, an effective date of creation, and a NPA-NXX region, means for submitting said NPA-NXX information to said engine interface, means for clearing input NPA-NXX information, and means for cancelling said creating of said NPA-NXX.

5. The interface to a LNP network of claim 1, wherein said GUI screen display for maintaining a LRN comprises:

a maintain LRN screen display for creating, deleting, modifying or querying a LRN, including, fields for inputting query criteria including a query source, a query region, a SP identification, and a LRN range including a LRN start and a LRN end, means for submitting said query criteria to said engine interface, means for displaying query results received from said engine interface in response to said query criteria and including a date and time of query indicator, means for printing said query results, means for clearing input query criteria, means for indicating a row count of said query results, means for deleting a selected LRN from displayed query results, means for modifying a selected LRN from displayed query results, means for creating a LRN and which generates a create LRN screen display upon a user selecting said means for creating a LRN, wherein said create LRN screen display, includes, fields for inputting LRN information including a LRN, and custom local area signaling services (CLASS) information, line information database (LIDB) information, caller identification with name (CNAM) information, and inter-switch voice mail (ISVM) information for a destination point code (DPC) and a subsystem number (SSN), means for submitting said LRN information to said engine interface, means for clearing input LRN information, and
means for cancelling said creating of said LRN.

6. The interface to a LNP network of claim 1, wherein said GUI screen display for creating as a gaining SV comprises:
- a create as gaining screen display for creating a gaining SV, including,
- fields for inputting create as gaining information including a SV region, a telephone number (TN) range including a TN start and a TN end,
- a create as gaining form including fields for inputting old SP information, a port to original indication, a customer name, a due date, a billing identification, a reserved TN indication, a work order number, a service order number, remarks, an incumbent local exchange carrier (ILEC) NPA-NXX, a network switch common language location identifier (CLLI) indication, and a LRN,
- an additional information form including fields for inputting custom local area signaling services (CLASS) information, line information database (LIDB) information, caller identification with name (CNAM) information, and inter-switch voice mail (ISVM) information for a destination point code (DPC) and a subsystem number (SSN), an end user location and type, and a means for pre-populating said DPC and SSN fields based on the LRN if manually entered,
- means for submitting said create as gaining information and information input in said create as gaining and additional forms to said engine interface, and
- means for clearing input create as gaining information and information input in said create as gaining and additional information forms.

7. The interface to a LNP network of claim 1, wherein said GUI screen display for creating as a losing SV comprises:
- a create as losing screen display for creating a losing SV, including,
- fields for inputting create as losing information including a SV region, a telephone number (TN) range including a TN start and a TN end, new SP information, a customer name, a due date, a LNP type, an old SP authorization indication, a status change cause, a work order number, a service order number, and remarks,
- means for submitting said create as losing information to said engine interface, and
- means for clearing input create as losing information.

8. The interface to a LNP network of claim 1, wherein said GUI screen display for activating a SV comprises:
- an activate SV screen display for activating a SV including fields for inputting activate information including a SV region and identification, and a telephone number (TN) range including a TN start and a TN end,
- means for submitting said activate information to said engine interface, and
- means for clearing input activate information.

9. The interface to a LNP network of claim 1, wherein said GUI screen display for modifying a SV comprises:
- a modify SV screen display for modifying a SV, including,
    - fields for inputting modify information including a SV region and identification, a telephone number (TN) range including a TN start and a TN end, a subscription version status indication, and means for selecting a modify as new SP and a modify as old SP,
    - wherein if modify as new SP is selected, said modify SV screen display, includes,
- a modify as new form including modify as new SP information including fields for inputting a customer name, a due date, a billing identification, a reserved TN indication, a work order number, a service order number, remarks, an incumbent local exchange carrier (ILEC) NPA-NXX, a network switch common language location identifier (CLLI) indication, and a LRN, and
- an additional information form including fields for inputting custom local area signaling services (CLASS) information, line information database (LIDB) information, caller identification with name (CNAM) information, and inter-switch voice mail (ISVM) information for a destination point code (DPC) and a subsystem number (SSN), an end user location and type, and a means for pre-populating said DPC and SSN fields based on the LRN if manually entered, and
- wherein if modify as old SP is selected, said modify SV screen display includes modify as old SP information including fields for inputting a customer name, an old SP due date, an old SP authorization indication, a work order number, a service order number, remarks, and a status change cause indication;
- means for submitting said modify information, said modify as new SP information, said modify as old SP information, and information input in said additional form to said engine interface; and
- means for clearing input modify information, modify as new SP information, modify as old SP information, and information input in said additional form.

10. The interface to a LNP network of claim 1, wherein said GUI screen display for cancelling a SV comprises:
- a cancel SV screen display for cancelling a SV including fields for inputting cancel information including a SV region and identification, and a telephone number (TN) range including a TN start and a TN end,
- means for submitting said cancel information to said engine interface, and
- means for clearing input cancel information.

11. The interface to a LNP network of claim 1, wherein said GUI screen display for disconnecting a SV comprises:
- a disconnect SV screen display for disconnecting a SV including fields for inputting disconnect information including a SV region and identification, a telephone number (TN) range including a TN start and a TN end, a disconnect date, and an effective release date,
- means for submitting said disconnect information to said engine interface, and
- means for clearing input disconnect information.

12. The interface to a LNP network of claim 1, wherein said GUI screen display for acknowledging cancellation of a SV comprises:
- a cancel acknowledgment screen display for acknowledging cancellation of a SV including fields for inputting acknowledgment information including a SV region and identification, and a telephone number (TN) range including a TN start and a TN end,
- means for submitting said acknowledgment information to said engine interface, and
- means for clearing input acknowledgment information.

13. The interface to a LNP network of claim 1, wherein said GUI screen display for resolving a conflict with a SV comprises:
- a resolve conflict screen display for resolving a conflict with a SV including fields for inputting resolve conflict information including a SV region and identification, and a telephone number (TN) range including a TN start and a TN end, means for submitting said resolve conflict information to said engine interface, and means for clearing input resolve conflict information.

14. The interface to a LNP network of claim 1, wherein said GUI screen display for querying a SV comprises:

a query SV screen display for querying a SV, including,
a criteria form including fields for inputting query criteria including a query source selection, a telephone number (TN) range including a TN start and a TN end, a LRN, a SV identification and region, a LNP type indication, a SV status indication, a old SP authorization indication, a new SP due date range including a new SP due date start and a new SP due date end, a old SP due date range including an old SP due date start and an old SP due date end, an activation date range including an activation date start and an activation date end, a customer name, a work order number, a service order number, a ready to activate indication, a sent to data access point (DAP) indication, a user identification, a means for submitting said query criteria to said engine interface and a means for clearing input query criteria, a results form for displaying query results received from said engine interface based on said query criteria and including a date and time of query, query results window, a query results row count indicator a means for refreshing said query results a means for printing said query results, and a means for providing query results details, wherein said means for providing query results details provides details of a query result selected from said query results window and includes a general information form, a SV history information form, an additional information form, and a partial failure list form.

15. The interface to a LNP network of claim 1, wherein said GUI screen display for initiating a NPAC audit comprises:

an initiate NPAC audit screen display for initiating a NPAC audit, including,
fields for inputting audit information including a service provide (SP) to be audited, an audit name, a custom local area signaling services (CLASS) indication, a caller identification with name (CNAM) indication, a line information database (LIDB) indication, an inter-switch voice mail (ISVM) indication, local routing number (LRN) indication, and a all CLASS, CNAM, LIDB, ISVM, and LRN indication, a telephone number (TN) range including a TN start and a TN end, an activation date range including an activation date start and an activation date end, and a region,
means for submitting said audit information to said engine interface, and
means for clearing input audit information.

16. The interface to a LNP network of claim 1, wherein said GUI screen display for querying a NPAC audit comprises:

query audit screen display for querying a NPAC audit, including,
fields for inputting query criteria including a user identification, a audit identification, an audit name, a region, and an audit start date range including an audit date start and an audit date end, a means for submitting said query criteria to said engine interface, and a means for clearing input query criteria, an audit status summary window for displaying query results received from said engine interface based on said query criteria and including a date and time of query, query results window, a query results row count indicator, a means for cancelling query results, a means for printing said query results, and a means for providing query results details, wherein said means for cancelling query results cancels a query result selected from said query results window, said means for providing query results details provides details of a query result selected from said query results window including an audit identification, an audit name, a user identification, a SP identification, and said means for providing query results details further includes a general information form for providing audit status information, a discrepancy report form for providing audit discrepancy information, and a scope of audit form for providing scope of audit information.

17. The interface to a LNP network of claim 1, wherein said GUI screen display for viewing operational information notifications, said means for viewing cancellation acknowledge notifications, said means for viewing customer disconnect notifications, said means for viewing create request notifications, said means for viewing concurrence request notifications, said means for viewing SV status change notifications, said means for viewing final concurrence notifications, and said means for viewing said first use of NPA-NXX notifications, each comprise:

a screen display for displaying information, based on query criteria including fields for inputting a date and time range including a date and time start and a date and time end, and a region, a means for submitting said query criteria to said engine interface, and a query results window for displaying query results received from said engine interface based on said query criteria, means for printing said query results, and means for clearing input query criteria, wherein said means for viewing SV status change notifications further includes a notification results form for displaying SV status change notification results and a failed service provider (SP) form for displaying failed SP information.

18. A method for interfacing to a local number portability (LNP) network, comprising:

coupling a graphical user interface (GUI) to an engine interface via a communications link;

transmitting data, via said engine interface, from said LNP network to said GUI via said communications link and transmitting data received from said GUI to said LNP network;

providing screen displays to a user, via said GUI, for performing LNP network maintenance functions including at least one of maintaining a service provider (SP), maintaining a numbering plan area-telephone number exchange (NPA-NXX), and maintaining local routing number (LRN);

providing screen displays to a user, via said GUI, for performing LNP subscription version (SV) maintenance functions including at least one of creating as a gaining SV, creating as a losing SV, activating a SV, modifying a SV, cancelling a SV, disconnecting a SV, acknowledging cancellation of a SV, resolving a conflict with a SV, and querying a SV;

providing screen displays to a user, via said GUI, for performing reconciling with a number portability administration center (NPAC) functions including at least one of initiating a NPAC audit, and querying a NPAC audit; and providing screen displays to a user, via said GUI, for performing viewing of LNP notifications functions including at least one of viewing operational information notifications, viewing cancellation acknowledge notifications, viewing customer disconnect notifications, viewing create request notifications, viewing concurrence request notifications, viewing SV status change notifications, viewing final concurrence notifications, and viewing a first use of numbering plan area-telephone number exchange (NPA-NXX) notifications.

19. The method of claim 18, wherein said engine interface comprises a service order administration (SOA) engine interface that routes one of LNP transactions and LNP messages received from said GUI to destinations including regional SOA subsystems.

20. The method of claim 18, wherein said step of providing a screen display for maintaining a service provider comprises:

providing a maintain SP screen display for modifying or querying SP information, including,
providing fields for inputting query or modification information including a SP identification, region and contact information,
providing means for submitting said query or modification information to said engine interface,
providing means for displaying query results received from said engine interface in response to said query or modification information, and
providing means for clearing input query or modification information; and
providing a list SP screen display, including,
providing means for indicating a date and time of query or modification,
providing means for listing SP information, and
providing means for printing listed SP information.

21. The method of claim 18, wherein said step of providing a screen display for maintaining a NPA-NXX comprises:

providing a maintain NPA-NXX screen display for creating, deleting or querying a NPA-NXX, including,
providing fields for inputting query criteria including a query source, a query region, a SP identification, and a NPA-NXX range including a NPA-NXX start and a NPA-NXX end,
providing means for submitting said query criteria to said engine interface,
providing means for displaying query results received from said engine interface in response to said query criteria and including a date and time of query indicator,
providing means for means for printing said query results,
providing means for means for clearing input query criteria,
providing means for means for indicating a row count of said query results,
providing means for means for deleting a selected NPA-NXX from displayed query results, and
providing means for means for creating a NPA-NXX and generating a create NPA-NXX screen display upon a user selecting said means for creating a NPA-NXX,
said step of generating a create NPA-NXX screen display, includes,
providing fields for inputting NPA-NXX information including a NPA-NXX, an effective date of creation, and a NPA-NXX region,
providing means for submitting said NPA-NXX information to said engine interface,
providing means for clearing input NPA-NXX information, and
providing means for cancelling said creating of said NPA-NXX.

22. The method of claim 18, wherein said step of providing a screen display for maintaining a LRN comprises:

providing a maintain LRN screen display for creating, deleting, modifying or querying a LRN, including,
providing fields for inputting query criteria including a query source, a query region, a SP identification, and a LRN range including a LRN start and a LRN end,
providing means for submitting said query criteria to said engine interface,
providing means for displaying query results received from said engine interface in response to said query criteria and including a date and time of query indicator,
providing means for printing said query results,
providing means for clearing input query criteria,
providing means for indicating a row count of said query results,
providing means for deleting a selected LRN from displayed query results,
providing means for modifying a selected LRN from displayed query results,
providing means for creating a LRN and generating a create LRN screen display upon a user selecting said means for creating a LRN,
wherein said step of generating a create LRN screen display, includes,
providing fields for inputting LRN information including a LRN, and custom local area signaling services (CLASS) information, line information database (LIDB) information, caller identification with name (CNAM) information, and inter-switch voice mail (ISVM) information for a destination point code (DPC) and a subsystem number (SSN),
providing means for submitting said LRN information to said engine interface,
providing means for clearing input LRN information, and
providing means for cancelling said creating of said LRN.

23. The method of claim 18, wherein said step of providing a screen display for creating as a gaining SV comprises:

providing a create as gaining screen display for creating a gaining SV, including,
providing fields for inputting create as gaining information including a SV region, a telephone number (TN) range including a TN start and a TN end,
providing a create as gaining form including providing fields for inputting old SP information, a port to original indication, a customer name, a due date, a billing identification, a reserved TN indication, a work order number, a service order number, remarks, an incumbent local exchange carrier (ILEC) NPA-NXX, a network switch common language location identifier (CLLI) indication, and a LRN, providing an additional information form including providing fields for inputting custom local area signaling services (CLASS) information, line information database (LIDB) information, caller identification with name (CNAM) information, and inter-switch voice mail (ISVM) information for a destination point code (DPC) and a subsystem number (SSN), an end user location and type, and a means for pre-populating said DPC and SSN fields based on the LRN if manually entered, providing means for submitting said create as gaining information and information input in said create as gaining and additional forms to said engine interface, and providing means for clearing input create as gaining information and information input in said create as gaining and additional information forms.

24. The method of claim 18, wherein said step of providing a screen display for creating as a losing SV comprises:

providing a create as losing screen display for creating a losing SV, including, providing fields for inputting create as losing information including a SV region, a telephone number (TN) range including a TN start and a TN end, new SP information, a customer name, a due date, a LNP type, an old SP authorization indication, a status change cause, a work order number, a service order number, and remarks, providing means for submitting said create as losing information to said engine interface, and providing means for clearing input create as losing information.

25. The method of claim 18, wherein said step of providing a screen display for activating a SV comprises:

providing an activate SV screen display for activating a SV including providing fields for inputting activate information including a SV region and identification, and a telephone number (TN) range including a TN start and a TN end, providing means for submitting said activate information to said engine interface, and providing means for clearing input activate information.

26. The method of claim 18, wherein said step of providing a screen display for modifying a SV comprises:

providing a modify SV screen display for modifying a SV, including, providing fields for inputting modify information including a SV region and identification, a telephone number (TN) range including a TN start and a TN end, a subscription version status indication, and means for selecting a modify as new SP and a modify as old SP, wherein if modify as new SP is selected, said step of providing a modify SV screen display, includes, providing a modify as new form including modify as new SP information including providing fields for inputting a customer name, a due date, a billing identification, a reserved TN indication, a work order number, a service order number, remarks, an incumbent local exchange carrier (ILEC) NPA-NXX, a network switch common language location identifier (CLLI) indication, and a LRN, and providing an additional information form including providing fields for inputting custom local area signaling services (CLASS) information, line information database (LIDB) information, caller identification with name (CNAM) information, and inter-switch voice mail (ISVM) information for a destination point code (DPC) and a subsystem number (SSN), an end user location and type, and a means for pre-populating said DPC and SSN fields based on the LRN if manually entered, and wherein if modify as old SP is selected, said step of providing a modify SV screen display includes modify as old SP information including providing fields for inputting a customer name, an old SP due date, an old SP authorization indication, a work order number, a service order number, remarks, and a status change cause indication;

providing means for submitting said modify information, said modify as new SP information, said modify as old SP information, and information input in said additional form to said engine interface; and providing means for clearing input modify information, modify as new SP information, modify as old SP information, and information input in said additional form.

27. The method of claim 18, wherein said step of providing a screen display for cancelling a SV comprises:

providing a cancel SV screen display for cancelling a SV including providing fields for inputting cancel information including a SV region and identification, and a telephone number (TN) range including a TN start and a TN end, providing means for submitting said cancel information to said engine interface, and providing means for clearing input cancel information.

28. The method of claim 18, wherein said step of providing a screen display for disconnecting a SV comprises:

providing a disconnect SV screen display for disconnecting a SV including providing fields for inputting disconnect information including a SV region and identification, a telephone number (TN) range including a TN start and a TN end, a disconnect date, and an effective release date, providing means for submitting said disconnect information to said engine interface, and providing means for clearing input disconnect information.

29. The method of claim 18, wherein said step of providing a screen display for acknowledging cancellation of a SV comprises:

providing a cancel acknowledgment screen display for acknowledging cancellation of a SV including providing fields for inputting acknowledgment information including a SV region and identification, and a telephone number (TN) range including a TN start and a TN end, providing means for submitting said acknowledgment information to said engine interface, and providing means for clearing input acknowledgment information.

30. The method of claim 18, wherein said step of providing a screen display for resolving a conflict with a SV comprises:

providing a resolve conflict screen display for resolving a conflict with a SV including providing fields for inputting resolve conflict information including a SV region and identification, and a telephone number (TN) range including a TN start and a TN end, providing means for submitting said resolve conflict information to said engine interface, and providing means for clearing input resolve conflict information.

31. The method of claim 18, wherein said step of providing a screen display for querying a SV comprises:

providing a query SV screen display for querying a SV, including, providing a criteria form including providing fields for inputting query criteria including a query source selection, a telephone number (TN) range including a TN start and a TN end, a LRN a SV identification and region, a LNP type indication, a SV status indication, a old SP authorization indication, a new SP due date range including a new SP due date start and a new SP due date end, a old SP due date range including an old SP due date start and an old SP due date end, an activation date range including an activation date start and an activation date end, a customer name, a work order number, a service order number, a ready to activate indication, a sent to data access point (DAP) indication, a user identification, a means for submitting said query criteria to said engine interface, and a means for clearing input query criteria, providing a results form for displaying query results received from said engine interface based on said query criteria and including providing a date and time of query, query results window, a query results row count indicator, a means for refreshing said query results, a means for printing said query results, and a means for providing query results details, wherein said step of providing means for providing query results details provides details of a query result selected from said query results window and includes providing a general information form, a SV history information form, an additional information form, and a partial failure list form.

32. The method of claim 18, wherein said step of providing a screen display for initiating a NPAC audit comprises:

providing an initiate NPAC audit screen display for initiating a NPAC audit, including, providing fields for inputting audit information including a service provide (SP) to be audited, an audit name, a custom local area signaling services (CLASS) indication, a caller identification with name (CNAM) indication, a line information database (LIDB) indication, an inter-switch voice mail (ISVM) indication, local routing number (LRN) indication, and a all CLASS, CNAM, LIDB, ISVM, and LRN indication, a telephone number (TN) range including a TN start and a TN end, an activation date range including an activation date start and an activation date end, and a region, providing means for submitting said audit information to said engine interface, and providing means for clearing input audit information.

33. The method of claim 18, wherein said step of providing screen display for querying a NPAC audit comprises:

providing query audit screen display for querying a NPAC audit, including, providing fields for inputting query criteria including a user identification, a audit identification, an audit name, a region, and an audit start date range including an audit date start and an audit date end, a means for submitting said query criteria to said engine interface, and a means for clearing input query criteria, providing an audit status summary window for displaying query results received from said engine interface based on said query criteria and including a date and time of query, query results window, a query results row count indicator, a means for cancelling query results, a means for printing said query results, and a means for providing query results details, wherein said means for cancelling query results cancels a query result selected from said query results window, said means for providing query results details provides details of a query result selected from said query results window including an audit identification, an audit name, a user identification, a SP identification, and said step of providing means for providing query results details further includes providing a general information form for providing audit status information, a discrepancy report form for providing audit discrepancy information, and a scope of audit form for providing scope of audit information.

34. The method of claim 18, wherein said steps of providing a screen display for viewing operational information notifications, for viewing cancellation acknowledge notifications, said means for viewing customer disconnect notifications, for viewing create request notifications, said means for viewing concurrence request notifications, for viewing SV status change notifications, for viewing final concurrence notifications, and for viewing said first use of NPA-NXX notifications, each comprise:

providing a screen display for displaying information, based on query criteria including providing fields for inputting a date and time range including a date and time start and a date and time end, and a region, providing a means for submitting said query criteria to said engine interface, and providing a query results window for displaying query results received from said engine interface based on said query criteria, providing means for printing said query results, and providing means for clearing input query criteria, wherein said step of providing means for viewing SV status change notifications further includes providing a notification results form for displaying SV status change notification results and a failed service provider (SP) form for displaying failed SP information.

35. A computer readable medium storing computer instructions for interfacing to a local number portability (LNP) network, the computer readable medium comprising instructions for:

coupling a graphical user interface (GUI) to an engine interface via a communications link;

transmitting data, via said engine interface, from said LNP network to said GUI via said communications link and transmitting data received from said GUI to said LNP network;

providing screen displays to a user, via said GUI, for performing LNP network maintenance functions including at least one of maintaining a service provider (SP), maintaining a numbering plan area-telephone number exchange (NPA-NXX), and maintaining local routing number (LRN);

providing screen displays to a user, via said GUI, for performing LNP subscription version (SV) maintenance functions including at least one of creating as a gaining SV, creating as a losing SV, activating a SV, modifying a SV, cancelling a SV, disconnecting a SV, acknowledging cancellation of a SV, resolving a conflict with a SV, and querying a SV;

providing screen displays to a user, via said GUI, for performing reconciling with a number portability administration center (NPAC) functions including at least one of initiating a NPAC audit, and querying a NPAC audit; and providing screen displays to a user, via said GUI, for performing viewing of LNP notifications functions including at least one of viewing operational information notifications, viewing cancellation acknowledge notifications, viewing customer disconnect notifications, viewing create request notifications, viewing concurrence request notifications, viewing SV status change notifications, viewing final concurrence notifications, and viewing a first use of numbering plan area-telephone number exchange (NPA-NXX) notifications.

36. The computer readable medium of claim 35, wherein said engine interface comprises a service order administration (SOA) engine interface that routes one of LNP transactions and LNP messages received from said GUI to destinations including regional SOA subsystems.

37. The computer readable medium of claim 35, further storing computer instructions, for performing the step of providing a screen display for maintaining a service provider, comprising:

providing a maintain SP screen display for modifying or querying SP information, including,
providing fields for inputting query or modification information including a SP identification, region and contact information,
providing means for submitting said query or modification information to said engine interface,
providing means for displaying query results received from said engine interface in response to said query or modification information, and
providing means for clearing input query or modification information; and
providing a list SP screen display, including,
providing means for indicating a date and time of query or modification,
providing means for listing SP information, and
providing means for printing listed SP information.

38. The computer readable medium of claim 35, further storing computer instructions, for performing the step of providing a screen display for maintaining a NPA-NXX, comprising:

providing a maintain NPA-NXX screen display for creating, deleting or querying a NPA-NXX, including,
providing fields for inputting query criteria including a query source, a query region, a SP identification, and a NPA-NXX range including a NPA-NXX start and a NPA-NXX end,
providing means for submitting said query criteria to said engine interface,
providing means for displaying query results received from said engine interface in response to said query criteria and including a date and time of query indicator,
providing means for means for printing said query results,
providing means for means for clearing input query criteria,
providing means for means for indicating a row count of said query results,
providing means for means for deleting a selected NPA-NXX from displayed query results, and
providing means for means for creating a NPA-NXX and generating a create NPA-NXX screen display upon a user selecting said means for creating a NPA-NXX,
said step of generating a create NPA-NXX screen display, includes,
providing fields for inputting NPA-NXX information including a NPA-NXX, an effective date of creation, and a NPA-NXX region,
providing means for submitting said NPA-NXX information to said engine interface,
providing means for clearing input NPA-NXX information, and
providing means for cancelling said creating of said NPA-NXX.

39. The computer readable medium of claim 35, further storing computer instructions, for performing the step of providing a screen display for maintaining a LRN, comprising:

providing a maintain LRN screen display for creating, deleting, modifying or querying a LRN, including,
providing fields for inputting query criteria including a query source, a query region, a SP identification, and a LRN range including a LRN start and a LRN end,
providing means for submitting said query criteria to said engine interface,
providing means for displaying query results received from said engine interface in response to said query criteria and including a date and time of query indicator,
providing means for printing said query results,
providing means for clearing input query criteria,
providing means for indicating a row count of said query results,
providing means for deleting a selected LRN from displayed query results,
providing means for modifying a selected LRN from displayed query results,
providing means for creating a LRN and generating a create LRN screen display upon a user selecting said means for creating a LRN,
wherein said step of generating a create LRN screen display, includes,
providing fields for inputting LRN information including a LRN, and custom local area signaling services (CLASS) information, line information database (LIDB) information, caller identification with name (CNAM) information, and inter-switch voice mail (ISVM) information for a destination point code (DPC) and a subsystem number (SSN),
providing means for submitting said LRN information to said engine interface,
providing means for clearing input LRN information, and
providing means for cancelling said creating of said LRN.

40. The computer readable medium of claim 35, further storing computer instructions, for performing the step of providing a screen display for creating as a gaining SV, comprising:

providing a create as gaining screen display for creating a gaining SV, including, providing fields for inputting create as gaining information including a SV region, a telephone number (TN) range including a TN start and a TN end, providing a create as gaining form including providing fields for inputting old SP information, a port to original indication, a customer name, a due date, a billing identification, a reserved TN indication, a work order number, a service order number, remarks, an incumbent local exchange carrier (ILEC) NPA-NXX, a network switch common language location identifier (CLLI) indication, and a LRN, providing an additional information form including providing fields for inputting custom local area signaling services (CLASS) information, line information database (LIDB) information, caller identification with name (CNAM) information, and inter-switch voice mail (ISVM) information for a destination point code (DPC) and a subsystem number (SSN), an end user location and type, and a means for pre-populating said DPC and SSN fields based on the LRN if manually entered, providing means for submitting said create as gaining information and information input in said create as gaining and additional forms to said engine interface, and providing means for clearing input create as gaining information and information input in said create as gaining and additional information forms.

41. The computer readable medium of claim 35, further storing computer instructions, for performing the step of providing a screen display for creating as a losing SV, comprising:

providing a create as losing screen display for creating a losing SV, including, providing fields for inputting create as losing information including a SV region, a telephone number (TN) range including a TN start and a TN end, new SP information, a customer name, a due date, a LNP type, an old SP authorization indication, a status change cause, a work order number, a service order number, and remarks, providing means for submitting said create as losing information to said engine interface, and providing means for clearing input create as losing information.

42. The computer readable medium of claim 35, further storing computer instructions, for performing the step of providing a screen display for activating a SV, comprising:

providing an activate SV screen display for activating a SV including providing fields for inputting activate information including a SV region and identification, and a telephone number (TN) range including a TN start and a TN end, providing means for submitting said activate information to said engine interface, and providing means for clearing input activate information.

43. The computer readable medium of claim 35, further storing computer instructions, for performing the step of providing a screen display for modifying a SV, comprising:

providing a modify SV screen display for modifying a SV, including, providing fields for inputting modify information including a SV region and identification, a telephone number (TN) range including a TN start and a TN end, a subscription version status indication, and means for selecting a modify as new SP and a modify as old SP, wherein if modify as new SP is selected, said step of providing a modify SV screen display, includes, providing a modify as new form including modify as new SP information including providing fields for inputting a customer name, a due date, a billing identification, a reserved TN indication, a work order number, a service order number, remarks, an incumbent local exchange carrier (ILEC) NPA-NXX, a network switch common language location identifier (CLLI) indication, and a LRN, and providing an additional information form including providing fields for inputting custom local area signaling services (CLASS) information, line information database (LIDB) information, caller identification with name (CNAM) information, and inter-switch voice mail (ISVM) information for a destination point code (DPC) and a subsystem number (SSN), an end user location and type, and a means for pre-populating said DPC and SSN fields based on the LRN if manually entered, and wherein if modify as old SP is selected, said step of providing a modify SV screen display includes modify as old SP information including providing fields for inputting a customer name, an old SP due date, an old SP authorization indication, a work order number, a service order number, remarks, and a status change cause indication;

providing means for submitting said modify information, said modify as new SP information, said modify as old SP information, and information input in said additional form to said engine interface; and providing means for clearing input modify information, modify as new SP information, modify as old SP information, and information input in said additional form.

44. The computer readable medium of claim 35, further storing computer instructions, for performing the step of providing a screen display for cancelling a SV comprising:

providing a cancel SV screen display for cancelling a SV including providing fields for inputting cancel information including a SV region and identification, and a telephone number (TN) range including a TN start and a TN end, providing means for submitting said cancel information to said engine interface, and providing means for clearing input cancel information.

45. The computer readable medium of claim 35, further storing computer instructions, for performing the step of providing a screen display for disconnecting a SV, comprising:

providing a disconnect SV screen display for disconnecting a SV including providing fields for inputting disconnect information including a SV region and identification, a telephone number (TN) range including a TN start and a TN end, a disconnect date, and an effective release date, providing means for submitting said disconnect information to said engine interface, and providing means for clearing input disconnect information.

46. The computer readable medium of claim 35, further storing computer instructions, for performing the step of providing a screen display for acknowledging cancellation of a SV, comprising:

providing a cancel acknowledgment screen display for acknowledging cancellation of a SV including providing fields for inputting acknowledgment information including a SV region and identification, and a telephone number (TN) range including a TN start and a TN end, providing means for submitting said acknowledgment information to said engine interface, and providing means for clearing input acknowledgment information.

47. The computer readable medium of claim 35, further storing computer instructions, for performing the step of providing a screen display for resolving a conflict with a SV, comprising:

providing a resolve conflict screen display for resolving a conflict with a SV including providing fields for inputting resolve conflict information including a SV region and identification, and a telephone number (TN) range including a TN start and a TN end, providing means for submitting said resolve conflict information to said engine interface, and providing means for clearing input resolve conflict information.

48. The computer readable medium of claim 35, further storing computer instructions, for performing the step of providing a screen display for querying a SV, comprising:

providing a query SV screen display for querying a SV, including, providing a criteria form including providing fields for inputting query criteria including a query source selection, a telephone number (TN) range including a TN start and a TN end, a LRN, a SV identification and region, a LNP type indication, a SV status indication, a old SP authorization indication, a new SP due date range including a new SP due date start and a new SP due date end, a old SP due date range including an old SP due date start and an old SP due date end, an activation date range including an activation date start and an activation date end, a customer name, a work order number, a service order number, a ready to activate indication, a sent to data access point (DAP) indication, a user identification, a means for submitting said query criteria to said engine interface, and a means for clearing input query criteria, providing a results form for displaying query results received from said engine interface based on said query criteria and including providing a date and time of query, query results window, a query results row count indicator, a means for refreshing said query results, a means for printing said query results, and a means for providing query results details, wherein said step of providing means for providing query results details provides details of a query result selected from said query results window and includes providing a general information form, a SV history information form, an additional information form, and a partial failure list form.

49. The computer readable medium of claim 35, further storing computer instructions, for performing the step of providing a screen display for initiating a NPAC audit, comprising:

providing an initiate NPAC audit screen display for initiating a NPAC audit, including, providing fields for inputting audit information including a service provide (SP) to be audited, an audit name, a custom local area signaling services (CLASS) indication, a caller identification with name (CNAM) indication, a line information database (LIDB) indication, an inter-switch voice mail (ISVM) indication, local routing number (LRN) indication, and a all CLASS, CNAM, LIDB, ISVM, and LRN indication, a telephone number (TN) range including a TN start and a TN end, an activation date range including an activation date start and an activation date end, and a region, providing means for submitting said audit information to said engine interface, and providing means for clearing input audit information.

50. The computer readable medium of claim 35, further storing computer instructions, for performing the step of providing screen display for querying a NPAC audit, comprising:

providing query audit screen display for querying a NPAC audit, including, providing fields for inputting query criteria including a user identification, a audit identification, an audit name, a region, and an audit start date range including an audit date start and an audit date end, a means for submitting said query criteria to said engine interface, and a means for clearing input query criteria, providing an audit status summary window for displaying query results received from said engine interface based on said query criteria and including a date and time of query, query results window, a query results row count indicator, a means for cancelling query results, a means for printing said query results, and a means for providing query results details, wherein said means for cancelling query results cancels a query result selected from said query results window, said means for providing query results details provides details of a query result selected from said query results window including an audit identification, an audit name, a user identification, a SP identification, and said step of providing means for providing query results details further includes providing a general information form for providing audit status information, a discrepancy report form for providing audit discrepancy information, and a scope of audit form for providing scope of audit information.

51. The computer readable medium of claim 35, further storing computer instructions, for performing the steps of providing a screen display for viewing operational information notifications, for viewing cancellation acknowledge notifications, said means for viewing customer disconnect notifications, for viewing create request notifications, said means for viewing concurrence request notifications, for viewing SV status change notifications, for viewing final concurrence notifications, and for viewing said first use of NPA-NXX notifications, each comprising:

providing a screen display for displaying information, based on query criteria including providing fields for inputting a date and time range including a date and time start and a date and time end, and a region, providing a means for submitting said query criteria to said engine interface, and providing a query results window for displaying query results received from said engine interface based on said query criteria, providing means for printing said query results, and providing means for clearing input query criteria, wherein said step of providing means for viewing SV status change notifications further includes providing a notification results form for displaying SV status change notification results and a failed service provider (SP) form for displaying failed SP information.

52. A graphical user interface (GUI) coupled to an engine interface of a local number portability (LNP) network via a communications link, the engine interface being configured to transmit data from the LNP network to the GUI via the communications link and transmit data received from the GUI to the LNP network, the GUI comprising:

screen displays configured to permit a user to perform LNP network maintenance functions including at least one of maintaining a service provider (SP), maintaining a numbering plan area-telephone number exchange (NPA-NXX), and maintaining local routing number (LRN);

screen displays configured to permit a user to perform LNP subscription version (SV) maintenance functions including at least one of creating as a gaining SV, creating as a losing SV, activating a SV, modifying a SV, cancelling a SV, disconnecting a SV acknowledging cancellation of a SV, resolving a conflict with a SV, and querying a SV;

screen displays configured to permit a user to perform reconciling with a number portability administration center (NPAC) functions including at least one of initiating a NPAC audit and querying a NPAC audit; and screen displays configured to permit a user to perform viewing of LNP notifications functions including at least one of viewing operational information notifications, viewing cancellation acknowledge notifications, viewing customer disconnect notifications, viewing create request notifications, viewing concurrence request notifications, viewing SV status change notifications, viewing final concurrence notifications, and viewing a first use of numbering plan area-telephone number exchange (NPA-NXX) notifications.

* * * * *